United States Patent
Mizuyama et al.

(10) Patent No.: US 6,813,043 B1
(45) Date of Patent: Nov. 2, 2004

(54) IMAGE PROCESSING DEVICE, IMAGE FORMING DEVICE INCORPORATING THE SAME, AND STORAGE MEDIUM FOR STORING PROGRAM USED THEREBY

(75) Inventors: Yoshio Mizuyama, Yamatokoriyama (JP); Michiyuki Suzuki, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1007 days.

(21) Appl. No.: 09/626,399

(22) Filed: Jul. 26, 2000

(30) Foreign Application Priority Data

Jul. 26, 1999 (JP) .......................................... 11-211144

(51) Int. Cl.[7] .............................. H04N 1/52; H04N 1/58
(52) U.S. Cl. ..................... 358/3.03; 358/3.26; 358/521; 358/534
(58) Field of Search ................................ 358/1.9, 3.26, 358/520, 518, 534, 502, 3.19, 3.13, 3.03, 535, 536, 521; 347/15, 43, 5, 19, 240; 382/252, 162, 167

(56) References Cited

U.S. PATENT DOCUMENTS

| | | | |
|---|---|---|---|
| 5,739,917 A | | 4/1998 | Shu et al. ..................... 358/2.1 |
| 6,084,689 A | * | 7/2000 | Mo ............................. 358/1.9 |
| 6,160,634 A | * | 12/2000 | Terashita .................... 358/1.9 |
| 6,574,362 B1 | * | 6/2003 | Kita ........................... 382/162 |

FOREIGN PATENT DOCUMENTS

| | | | |
|---|---|---|---|
| EP | 0 732 843 A2 | 9/1996 | ............ H04N/1/52 |
| EP | 0 820 187 A2 | 1/1998 | ............ H04N/1/52 |
| JP | 10-81026 | 3/1998 | ............ H04N/1/60 |

OTHER PUBLICATIONS

*Multi–Level Colour Halftoning Algorithms*, V. Ostromoukhov, et al., Recent Progress In Digital Halftoning II, Mar. 1999, pp. 166–172, XP002178192.

European Search Report—References first cited for European patent application No. 00115912.8 corresponding to above–identified application.

* cited by examiner

*Primary Examiner*—Scott Rogers
(74) *Attorney, Agent, or Firm*—Edwards & Angell, LLP; David G. Conlin

(57) ABSTRACT

Corrected values C1, M1, and Y1 corrected in a quasi-grayscale processing section of an image forming device by an error diffusion technique performed for each channel are evaluated in threshold value sections provided for individual channels, so as to determine whether or not they are greater than threshold values. If an overlapping CMY dot formation detector section detects that the density is higher than the threshold value in all of the three channels, a minimum density channel identifying section instructs a first quantized value substitution section and varies the outputs from the threshold value sections, so that the output in the channel with the lowest density has a value that does not represent dot formation. As a result, overlapping dot formation for the three channels is interrupted. Consequently, an image processing device capable of restraining occurrence of dark blotches and decrease in saturation can be offered without losing dot balance between channels even when a quasi-grayscale process is executed for each channel.

26 Claims, 44 Drawing Sheets

| C | M | Y | SPECIFIED VALUE |
|---|---|---|---|
| 0 | 0 | 0 | 128 |
| 0 | 0 | 1 | 160 |
| 0 | 0 | 2 | 96 |
| ⋮ | ⋮ | ⋮ | ⋮ |
| 0 | 0 | 255 | 128 |
| 0 | 1 | 0 | 144 |
| 0 | 1 | 1 | 128 |
| 0 | 1 | 2 | 112 |
| ⋮ | ⋮ | ⋮ | ⋮ |
| 255 | 255 | 255 | 128 |

FIG. 16

|    | 3 | 3 | 3 | 3 | 3 | 3 | 3 | 3 |
|----|---|---|---|---|---|---|---|---|
|    | 3 | 3 | 2 | 2 | 2 | 2 | 3 | 3 |
|    | 3 | 2 | 1 | 1 | 1 | 1 | 2 | 3 |
| Nb | 3 | 2 | 1 | 0 | 0 | 1 | 2 | 3 |
|    | 3 | 2 | 1 | 0 | 0 | 1 | 2 | 3 |
|    | 3 | 2 | 1 | 1 | 1 | 1 | 2 | 3 |
|    | 3 | 3 | 2 | 2 | 2 | 2 | 3 | 3 |
|    | 3 | 3 | 3 | 3 | 3 | 3 | 3 | 3 |

Na

IMAGE PROCESSING DEVICE, IMAGE FORMING DEVICE INCORPORATING THE SAME, AND STORAGE MEDIUM FOR STORING PROGRAM USED THEREBY

FIELD OF THE INVENTION

The present invention relates to image processing devices for processing image data such that quasi-grayscale processes carried out for individual channels do not result in blotched images, image forming devices incorporating the same, and storage media for storing programs for the image processing devices to carry out the processes.

Color ink printers, color ink copying machines, color laser printers, color laser copying machines, and other image forming devices that incorporate color printer devices often receive input image data, such as multitone RGB data, that represents a different number of tones from the number of tones that the color printer devices can actually print; even when the input image data represents the same number of tones as that actually printable by the devices, it often still represents a different set of color densities from the set of color densities that the color printer devices can actually print. Therefore, in these image forming devices, the data is converted to multiple values, e.g., binarized, for each ink or toner channel so as to determine whether a dot will be formed in ink or toner of that color; thus, the image forming devices can approximately output the image represented by the input data, by distributing dots of those color densities that are available with the color printer devices. The data may be converted to multiple values by a dither or error diffusion (error dispersion) technique. If error diffusion is employed for example, original image data and errors expressed in multiple values are dispersed to surrounding pixels.

However, if a quasi-grayscale process is carried out separately for each channel, the quasi-grayscale processes are likely to cause a dot to be undesirably printed on top of another. This results in the formation of black spots, tarnishing the image with dark blotches and rendering the image appear less saturated.

Specifically, for example, when data representing a high saturation, such as an image of a lemon, is provided for input, dots are not formed faithfully to the input data due to the quasi-grayscale processes carried out for various channels. As a result, unwanted black spots are formed as shown in FIG. 48 for example even though the input data contains no black spots. FIG. 48 shows the output image at a magnification of 60, depicting different colors using a hatching scheme. To the user, the black spots appear as dark blotches against skin color and highly bright or saturated color in background. The formation of black spots reduces saturated components and causes the image to appear less saturated.

To solve these problems, for example, Japanese Laid-Open Patent Application No. 10-81026/1998 (Tokukaihei 10-81026; published on Mar. 31, 1998) discloses, subsequent to the formation of dots for the M channel by a dither technique, the formation of dots in the C channel for hues closely related to the M channel while correcting errors having developed from the formation of the M channel by adding the errors times weight factors to the C channel.

However, in such an arrangement, the sequence of channels in which the channels are processed is predetermined; less dots are likely to be formed in channels placed later in the sequence, causing dot imbalance to develop between the channels.

SUMMARY OF THE INVENTION

The present invention has objects to offer an image processing device for processing image data which causes no dot imbalance between channels and which does not allow quasi-grayscale processes carried out for individual channels to cause a blotched image, image forming devices incorporating such an image processing device, and a storage medium for storing programs for the image processing device to carry out the processes.

To achieve the above objects, an image processing device in accordance with the present invention includes:

a data output section for providing output data representative of an image constituted by pixels formed by a dot, overlapping dots, or no formation of dots at all in predetermined channels including channels for a plurality of hues;

a first comparison section for comparing a density in each of the hue channels with a predetermined threshold value for each pixel constituting a color input image; and a dark blotch prevention section for adjusting the output data so as to reduce the density in at least one of the channels with densities higher than the threshold values if the density is higher than the threshold value at least in a predetermined number of channels for a target pixel in the comparison.

In the arrangement, data representing a target pixel and having been subjected to a quasi-grayscale process for each channel is inputted. Then, the first comparison section evaluates whether or not the input density exceeds a threshold value for each hue channel. If the density exceeds the threshold value at least in a predetermined number of channels, the dark blotch prevention section adjusts output data so as to reduce the density in at least one of those channels with threshold-value-exceeding densities. Therefore, the pixel formed according to the output data has brightness, saturation, and hue that are different from a black spot for the reduction in the densities. As a result, even when data having subjected to a quasi-grayscale process for each channel is inputted, the output data represents restrained occurrence of dark blotches due to unnecessary formation of overlapping dots.

Further, in the arrangement, the output data is adjusted after the density is evaluated in each hue channel; therefore, a better dot balance is achieved unlike in an arrangement disclosed in Japanese Laid-Open Patent Application No. 10-81026/1998 (Tokukaihei 10-81026; published on Mar. 31, 1998) where the densities are evaluated sequentially in one channel at a time.

In addition to the arrangement, preferably, the predetermined channels include cyan, magenta, and yellow channels, and the dark blotch prevention section (first quantized value substitution section 34) adjusts the output data so as to reduce the density in one of the three channels, for example, the channel with the lowest density, if the density is higher than the threshold value in all of the three channels of cyan, magenta, and yellow.

In the arrangement, the density is reduced in one of the channels when a black spot is supposed to be formed, i.e., dots are supposedly formed overlapping one another for the three channels. Therefore, the image processing device can provide output data with restrained occurrence of dark blotches and less decrease in saturation due to the quasi-grayscale processes.

As an alternative to the arrangement in which overlapping three dot formation is detected, the image processing device may further includes a brightness evaluation section for comparing brightness of the target pixel with a predetermined brightness threshold value, the predetermined channels includes cyan, magenta, and yellow channels, and the dark blotch prevention section, if both the density is higher than the threshold value in two or more of the three channels of cyan, magenta, and yellow, and the brightness is higher than the threshold value, selects one of the channels with densities higher than the threshold values and adjusts the output data so as to reduce the densities in the remaining channels.

In the arrangement, if the target pixel has a high brightness, only one of the channels is selected, and the density is reduced in the other channels. As a result, overlapping dot formation is interrupted when the target pixel has a brightness and the decrease in brightness due to overlapping dot formation is readily identified. As a result, the image processing device can provide output data, while restraining the occurrence of dark blotches and the decrease in saturation and brightness caused by the quasi-grayscale processes.

In order to achieve the above objects, an image processing device in accordance with the present invention includes: any one of the foregoing image processing device; and a dot formation section that can form dots for the channels overlapping one another on a printing material according to the output data from the image processing device.

In the arrangement, the dot formation section is controlled by means of the output data from the image processing device of any one of the foregoing arrangements; therefore, the image forming device can form images without losing dot balance, while restraining the occurrence of dark blotches due to unnecessary dot overlapping.

For a fuller understanding of the nature and advantages of the invention, reference should be made to the ensuing detailed description taken in conjunction with the accompanying drawings.

BRIEF DESCRIPTION OF THE DRAWINGS

FIG. 16 is an explanatory drawing showing values stored as a LUT in the saturation evaluation section.

DESCRIPTION OF THE EMBODIMENTS

[Embodiment 1]

Referring to FIG. 1 to FIG. 7, the following description will discuss an embodiment in accordance with the present invention. The image forming device of the embodiment is a device including color printer section, such as a color ink printer, color ink copying machine, color laser printer, or color laser copying machine, and is capable of forming an image on paper and other printing materials according to input image data.

Figure 2:
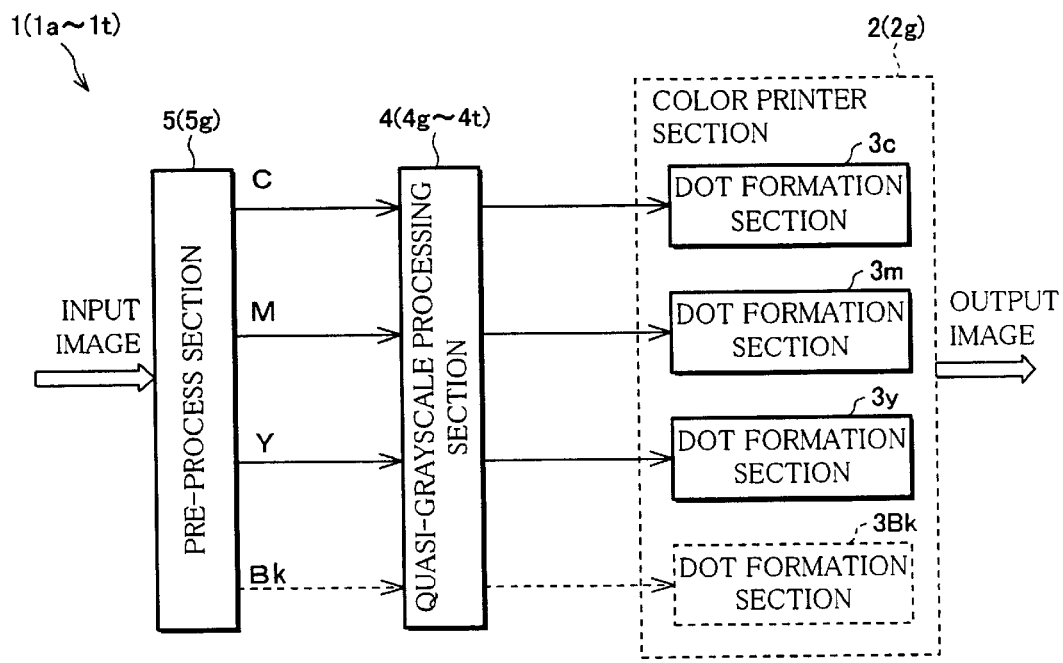
FIG. 2 is a block diagram showing a major part of the image forming device.

Specifically, for example, as shown in FIG. 2, the image forming device 1 includes in its color printer section (color image forming device) 2 a plurality of dot formation sections (dot forming means) 3 capable of forming dots with predetermined hues, and can form a color pixel by producing overlapping dots on the printing material. Further, the image forming device 1 is furnished with a quasi-grayscale processing section (image processing device or quasi-grayscale processing means) 4 for carrying out a quasi-grayscale process on data (multitone data) representing a density for each hue for each pixel of the image data and for outputting multi-valued data which controls dot formation by each dot formation section 3, and a pre-process section 5 for converting the image data with respect to color and for outputting multitone data for each channel to the quasi-grayscale processing section 4.

In the present embodiment, there are provided three dot formation sections $3c$, $3m$, and $3y$ for respective hues including cyan (C), magenta (M), and yellow (Y) as an example of the dot formation sections 3. The dot formation sections $3c$, $3m$, and $3y$ control whether or not a dot is to be formed. Accordingly, the pre-process section 5 converts, for example, image data expressed in a multitone RGB or other colorimetric reference system into multitone data (for example, 256 tones) expressed in three CMY channels, whereas the quasi-grayscale processing section 4 outputs binarized data for each of the CMY channels according to the multitone data for those channels.

Figure 3:
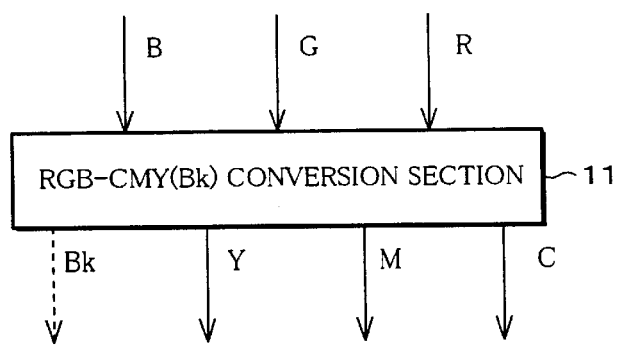
FIG. 3 is a block diagram showing an arrangement of a pre-process section in the image forming device as an example.

The pre-process section 5 includes an RGB-CMY conversion section 11 for, when the input image data to the image forming device 1 is multitone RGB data, converting the multitone RGB data into multitone CMY data as shown in FIG. 3, for example. The RGB-CMY conversion section 11 performs the conversion through a lookup table (LUT) combined with interpolation or by a minimum square or neural network technique.

Figure 4:
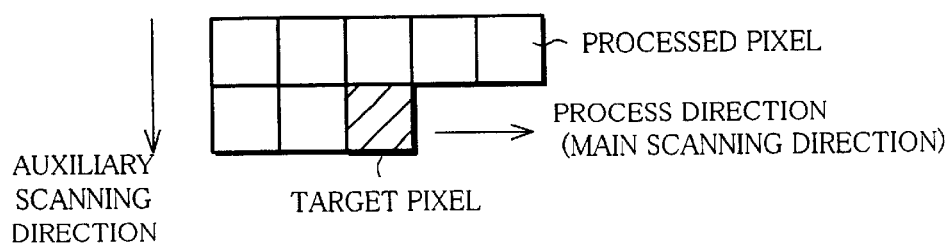
FIG. 4 is an explanatory drawing showing a scanning method for a quasi-grayscale process to illustrate an operation of the quasi-grayscale processing section.

Meanwhile, as shown in FIG. 4, the quasi-grayscale processing section 4 of the present embodiment converts multitone data into multiple values for each channel for each target pixel using an error diffusion technique as it scans a two-dimensional image. Specifically, a target pixel is moved in a main scanning direction (for example, horizontal direction). As the scan in the main scanning direction, i.e., along a certain main scanning line, is completed, the scanning operation is performed on another main scanning line that is adjacent to the forgoing main scanning line with respect to an auxiliary scanning direction (for example, vertical direction) that is different from the foregoing main scanning direction. Thus, the quasi-grayscale processing section 4 performs a quasi-grayscale process on all the pixels constituting the image. This arrangement does not require an entire image to be stored to perform a quasi-grayscale process on the image, and therefore is suitably used particularly in ink jet and other line printers.

Figure 5:
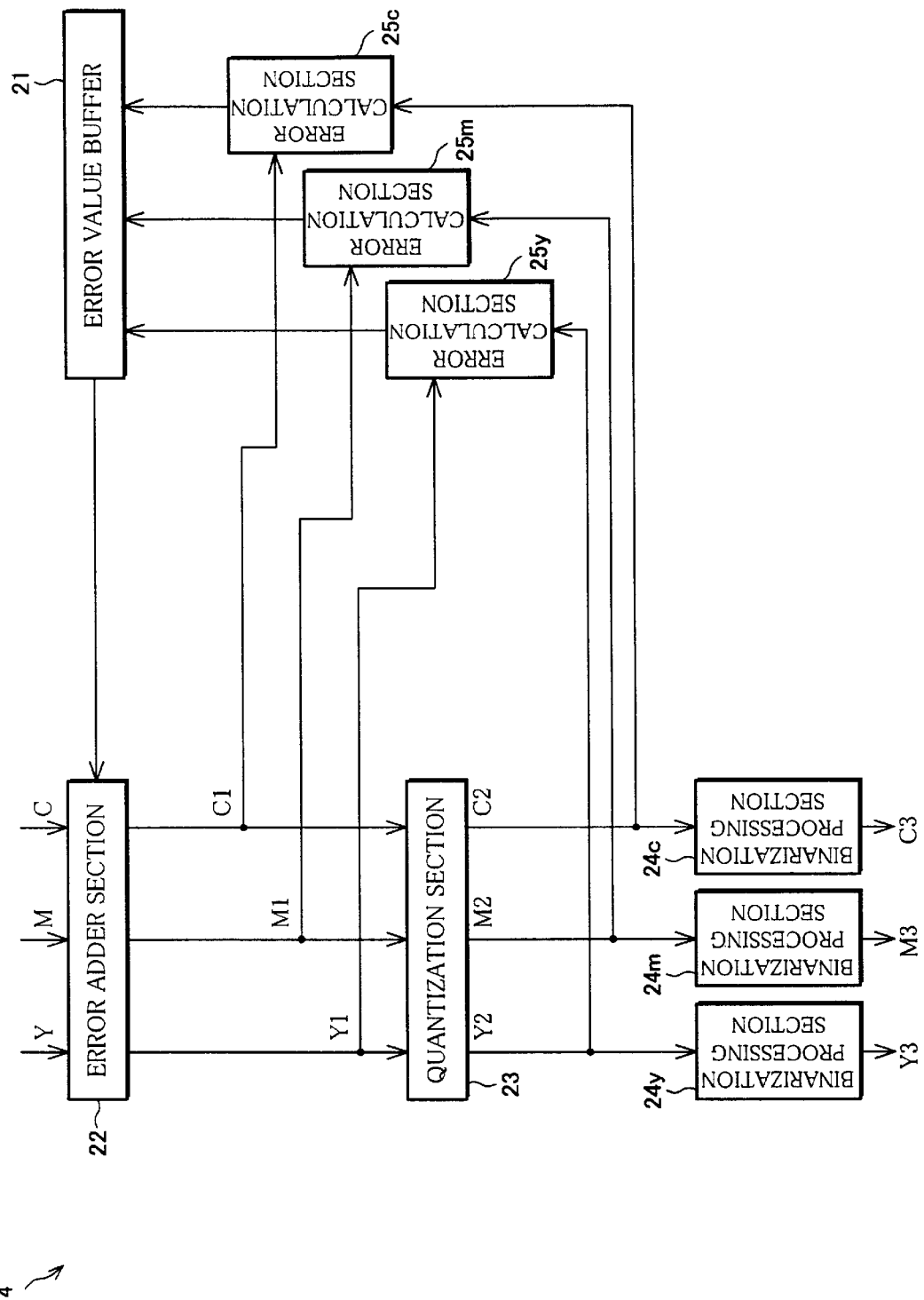
FIG. 5 is a block diagram showing a major part of the quasi-grayscale processing section.

The quasi-grayscale processing section 4 here includes, for example, as shown in FIG. 5:

an error value buffer 21 for storing accumulated value of errors of a pixel which has been subjected to a quasi-grayscale process for each channel;

an error adder section (error adder means) 22 for adding a diffused error accumulated value of each channel transferred from the error value buffer 21 to multitone CMY data representative of a target pixel;

a quantization section 23 for quantizing corrected values C1, M1, and Y1 transferred from the error adder section 22;

binarization processing sections (data output means) 24c, 24m, and 24y for producing multi-value data C3, M3, and Y3 according to quantized values C2, M2, and Y2 produced by the quantization section 23; and error calculation sections 25c, 25m, and 25y for comparing the quantized values C2, M2, and Y2 with the corrected values C1, M1, and Y1 for each channel and storing errors of the three pairs of values in the error value buffer 21. The quantization of corrected values C1, M1, and Y1 will be discussed later in detail. In the present embodiment, as an example, each of the quantized values C2, M2, and Y2 is either "0" or "255", and transferred by a 8-bit wide transfer line. The binarization processing sections 24c, 24m, and 24y produce multi-value data C3, M3, and Y3 that is either "1" to represent formation of a dot and "0" to represent non-formation of a dot by, for example, selecting an MSB (Most Significant Bit) of the transfer line, and output the results through a 1-bit transfer line.

The diffused error accumulated value is calculated, for example, by adding errors of the processed pixel among those pixels located in proximity of a target pixel with a weight factor. Typically, when error is diffused over a small area, for example, when the diffused error accumulated value is calculated using only those pixels directly adjoining to the target pixel, the calculation is easily carried out, and sharpness is seemingly high, whereas a "worm noise" develops due to irregular dot connections, and image quality degrades. By contrast, when error is diffused over a great area, for example, when the calculation involves errors of those pixels not adjoining to the target pixel as well as those directly adjoining to the target pixel, dots are more readily dispersed uniformly in space, sharpness is seemingly reduced, the error value buffer 21 is required to have an increased capacity, and the calculation is resource-consuming. For these reasons, a suitable error diffusion area and weight factors are carefully selected which impart good balance between them.

Figure 1:
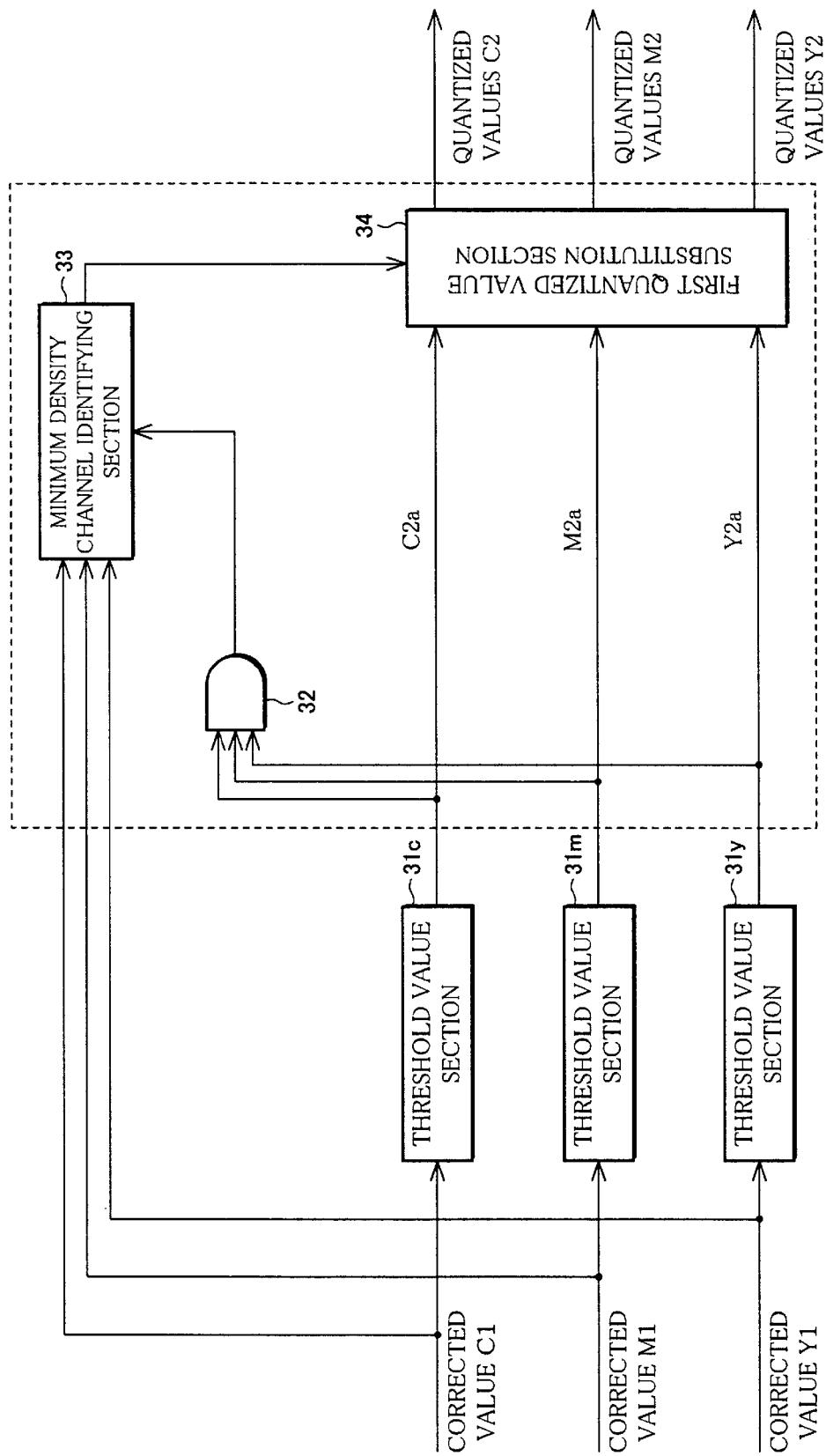
FIG. 1 is a block diagram showing a major part of a quantization section disposed in a quasi-grayscale processing section of an image forming device in relation to an embodiment in accordance with the present invention.

Here, as shown in FIG. 1, the quantization section 23 of the present embodiment includes threshold value sections (first comparison means) 31c, 31m, and 31y for comparing the corrected values C1, M1, and Y1 with respectively predetermined threshold values and binarizing those values to predetermined values, as well as such an arrangement to prevent occurrence of black spots due to redundant, overlapping dot formation.

Specifically, the quantization section 23 includes:

an overlapping CMY dot formation detector section 32 for detecting whether the outputs C2a, M2a, and Y2a from the threshold value sections 31c, 31m, and 31y instruct overlapping formation of three dots;

minimum density channel identifying section 33 for, if overlapping formation of dots is detected, identifying a channel with a minimum density by comparing the corrected data C1, M1, and Y1 and instructing prevention of dot formation in the identified channel; and a first quantized value substitution section (dark blotch prevention means) 34 for adjusting the outputs C2a, M2a, and Y2a according to an instruction.

In the present embodiment, as an example, the corrected values C1, M1, and Y1 are set in a range from 0 to 255. The threshold values for the threshold value sections 31c, 31m, and 31y are all set to 127. The outputs C2a, M2a, and Y2a are equal to either 255 representative of dot formation when the respective threshold values are exceeded or 0 representative of non-dot formation when the respective threshold value is not reached. The overlapping CMY dot formation detector section 32 is constituted as an AND circuit for performing the logical AND on the MSBs of the outputs C2a, M2a, and Y2a. The first quantized value substitution section 34 substitutes a predetermined value (for example, "0") prohibiting dot formation for one or some of the outputs C2a, M2a, and Y2a from a channel(channels) for which the minimum density channel identifying section 33 has instructed the prevention of dot formation.

Figure 6:
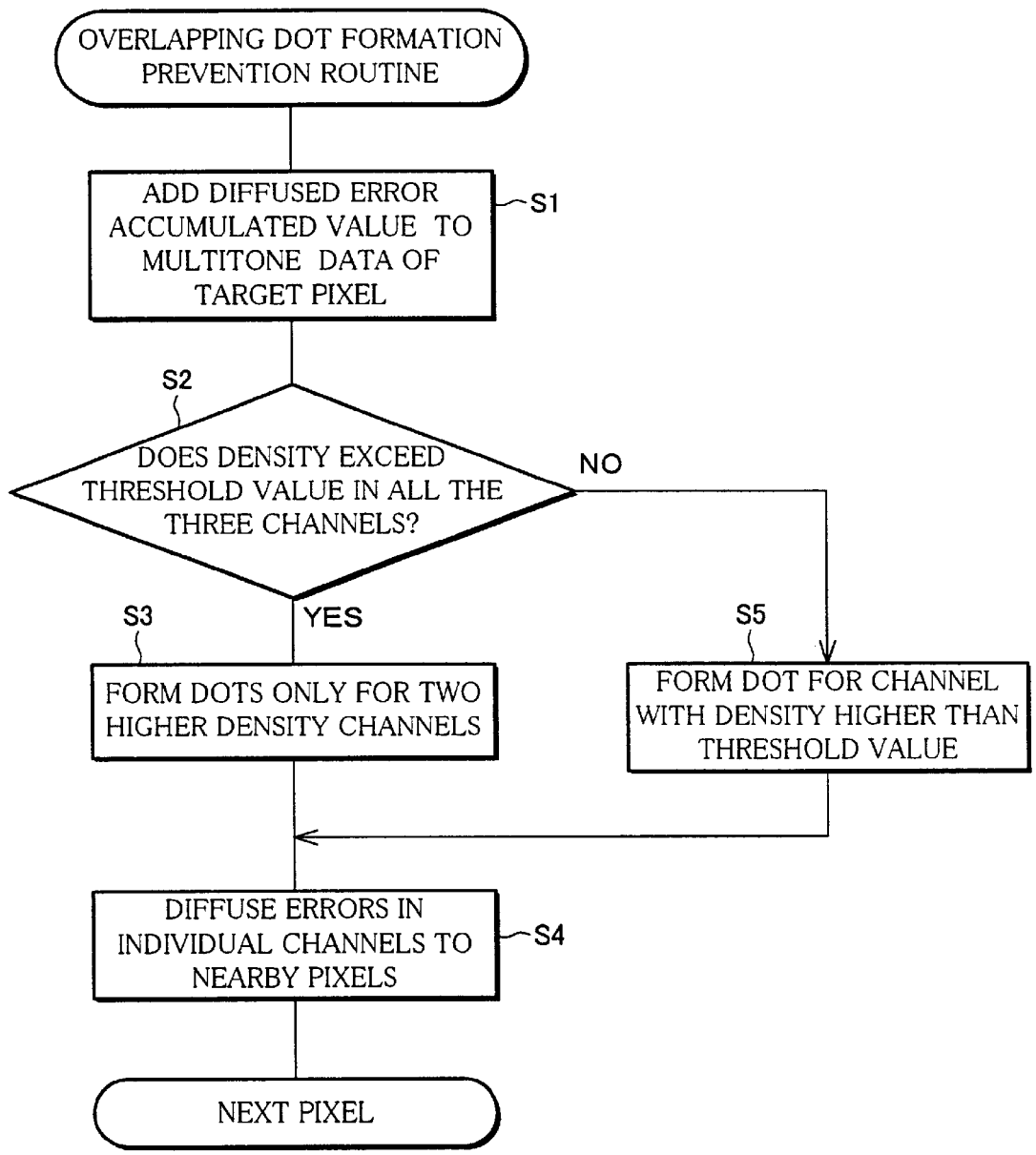
FIG. 6 is a flow chart showing an operation of the quasi-grayscale processing section.

Referring to a flow chart constituting FIG. 6, the following description will discuss an image formation operation by the image forming device 1 arranged as in the foregoing. As a target pixel is selected, the error adder section 22 shown in FIG. 5 adds a diffused error accumulated value to the multitone CMY data of the target pixel by referring to the error value buffer 21, so as to calculate the corrected values C1, M1, and Y1 (Step 1; hereinafter, will be abbreviated as S1). Then, the threshold value sections 31c, 31m, and 31y determine whether or not the corrected values C1, M1, and Y1 representative of densities exceed the threshold value for dot formation, before the overlapping CMY dot formation detector section 32 determines whether or not the densities exceed the threshold value in all the three channels according to the outputs C2a, M2a, and Y2a from the threshold value sections 31c, 31m, and 31y (S2).

When it is determined that all the three dots are to be formed ("YES" path selected in S2), the minimum density channel identifying section 33 compares the densities represented by the corrected values C1, M1, and Y1 and send an instruction to the first quantized value substitution section 34 so that no dot is formed in the channel with the lowest density. Therefore, the output (quantized values C2, M2, and Y2) from the quantization section 23 is equal to a value instructing dot formation for the two channels where the corrected value C1, M1, or Y1 represents a higher density, and equal to a value instructing non-dot formation for the channel where the corrected value C1, M1, or Y1 represents the lowest density. Further, the binarization processing sections 24c, 24m, and 24y generate the multi-value data C3, M3, and Y3 according to the quantized values C2, M2, and Y2 and transmit the sets of data to the dot formation sections 3c, 3m, and 3y of FIG. 2 as instructions. This arrangement allows dots to be formed only for the two higher density channels and no dot to be formed for the remaining one channel at the target pixel (S3).

In S4, the error calculation sections 25c, 25m, and 25y shown in FIG. 5 calculate differences between the quantized values C2, M2, and Y2 and the corrected values C1, M1, and Y1 so as to diffuse errors to unprocessed nearby pixels, and the diffused error accumulated values stored in the error value buffer 21 are subjected to an addition/subtraction process for correction according to the differences.

By contrast to the foregoing, when the threshold value for dot formation is not reached in all the three CMY channels ("NO" path selected in S2), since the overlapping CMY dot formation detector section 32 does not send an instruction for the minimum density channel identifying section 33 to do the evaluation, the first quantized value substitution section 34 simply passes on the outputs C2a, M2a, and Y2a from the threshold value sections 31c, 31m, and 31y. This allows dots to be formed only for a channel with a density higher than the dot formation threshold value and no dot to be formed for a channel with a density lower than the threshold value at the target pixel (S5).

An example is taken here to make a further explanation, where the multitone CMY data at the target pixel is 150, 130, and 190 respectively, and the error value buffer 21 stores values representative of diffused error accumulated values up to the previous pixel of 5, 10, and 15. Under these conditions, the corrected values C1, M1, and Y1 obtained in S1 equal 155, 140, and 205 respectively. These all represent densities higher than the threshold value (127 in this example) for the threshold value sections 31c, 31m, and 31y. Therefore, the overlapping CMY dot formation detector section 32 takes "YES" path in S2, and the minimum density channel identifying section 33 determines in S3 that the M channel with a value of 140 is the channel with the lowest density. As a result, the first quantized value substitution section 34 substitutes "0" in the quantized value M2a for the M channel, and the binarization processing section 24m outputs "0" representative of non-dot formation. Further, the first quantized value substitution section 34 simply passes on the quantized values C2a and Y2a for the remaining C and Y channels at their original values of 255 with no substitution. Therefore, the binarization processing sections 24c and 24y both output "1", a value representative of dot formation. When this is the case, in S4, the error calculation sections 25c, 25m, and 25y compare the quantized values C2, M2, and Y2 (255, 0, and 255) with the corrected values C1, M1, and Y1 (155, 140, and 205) so that the differences, −100, +140, and −50, for the three channels are diffused to nearby pixels and stored in the error value buffer 21 shown in FIG. 5.

The steps from S1 through 5S are repeated for each target pixel. Hence, all the pixels represented by the image data supplied to the image forming device 1 are printed by the color printer section 2 after undergoing quasi-grayscale processes.

In the foregoing arrangement, a quasi-grayscale process is performed for each channel using an error diffusion technique; consequently, if dot formation is instructed for all the three CMY channels, dots are formed for two of the three channels with higher densities, and dot formation is interrupted for the remaining channel, which prevents formation of a black spot due to overlapping dot formation for the three channels. The quasi-grayscale process which prevents the formation of redundant black spots in the foregoing manner can reduce the error diffused to nearby pixels to a minimum, remove dark blotches from the image displayed on the image forming device 1, and improve on the saturation of the output image by increasing saturated components.

Figure 7:
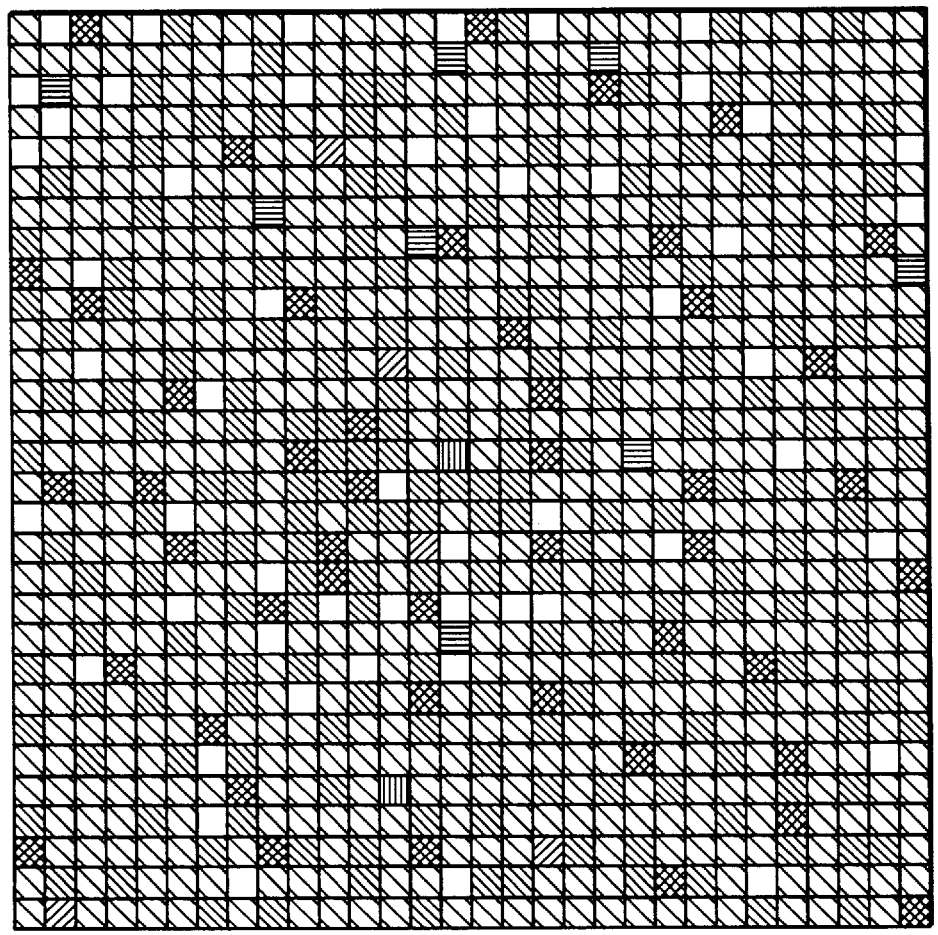
FIG. 7 is an explanatory drawing showing an image output printed by the image forming device.

Here, data of a partial image of a lemon is taken as an example in which there are originally no black spots. In a conventional arrangement, that is, an arrangement where the outputs C2a, M2a, and Y2a from the threshold value sections 31c, 31m, and 31y are simply passed on as the quantized values C2, M2, and Y2, as the image data is inputted, a quasi-grayscale process causes three CMY dots to be formed on top of one another at the same position and results in black spots as shown in FIG. 4B. By contrast, according to the arrangement of the present embodiment, as the same image data is inputted, the quasi-grayscale processing section 4 prevents overlapping dot formation for the three channels. The result is shown in FIG. 7 from which undesirable black spots are eliminated. Taking another example of high saturation image data involving an apple, a lemon, and a sweet pepper, Table 1 below compares the conventional arrangement and the arrangement according to the present embodiment in terms of the number of dots of each color. Note that the image data is a result of such a selection that no Bk dots are formed even if a black channel is provided as will be detailed in the second embodiment. Accordingly, Table 1 below lists changes of dots in number for both the present embodiment and the second embodiment. The present embodiment only relates to a part of the Table 1 which does not involve Bk dots.

TABLE 1

| No. of Dots (×100) | Saturation | Error Diffusion per Channel (Conventional Techniques) | Error Diffusion with no overlapping dots (Present Embodiments) | Difference in No. of Dots per color | Total Difference in No. of Saturated/non-saturated Dots |
|---|---|---|---|---|---|
| C | Saturated | 4635 | 3235 | −1400 | +3780 |
| M | Saturated | 15160 | 13966 | −1194 | |
| Y | Saturated | 83325 | 76159 | −7166 | |
| R (=M + Y) | Saturated | 49082 | 55324 | +6242 | |
| G (=Y + C) | Saturated | 13496 | 19929 | +6433 | |
| B (=C + M) | Saturated | 1586 | 2451 | +865 | |
| K (=C + M + Y) | No | 6044 | 0 | −6044 | −3780 |
| K (Bk) | No | 0 | 0 | ±0 | |
| w (no dots) | No | 26672 | 28936 | +2264 | |

As clearly understood from Table 1 above, the number of black spots resulting from the formation of overlapping CMY dots was reduced from conventional 6044 to 0, whereas the number of color-saturated dots increased by 3780. These numbers verifies that the arrangement in accordance with the present embodiment imparts less dark blotches and higher saturation to the output image.

Further, in the foregoing arrangement, the overlapping CMY dot formation detector section 32 solely determines according to the quantized values C2a, M2a, and Y2a for all the channels whether or not the quantized values C2a, M2a, and Y2a need to be adjusted. Therefore, the channels have a good dot balance, unlike, for example, the conventional arrangement disclosed by Japanese Laid-Open Patent Application No. 10-81026/1998 (Tokukaihei 10-81026; published Mar. 31, 1998) where the need for dot formation is evaluated one channel at a time in the order of Bk, C, M, and Y.

[Embodiment 2]

Although the first embodiment successfully prevented unnecessary formation of black spots resulting from a quasi-grayscale process, necessary formation of black dots when input image data is text data or other kinds of data that included black spots was possibly also interrupted.

Figure 8:
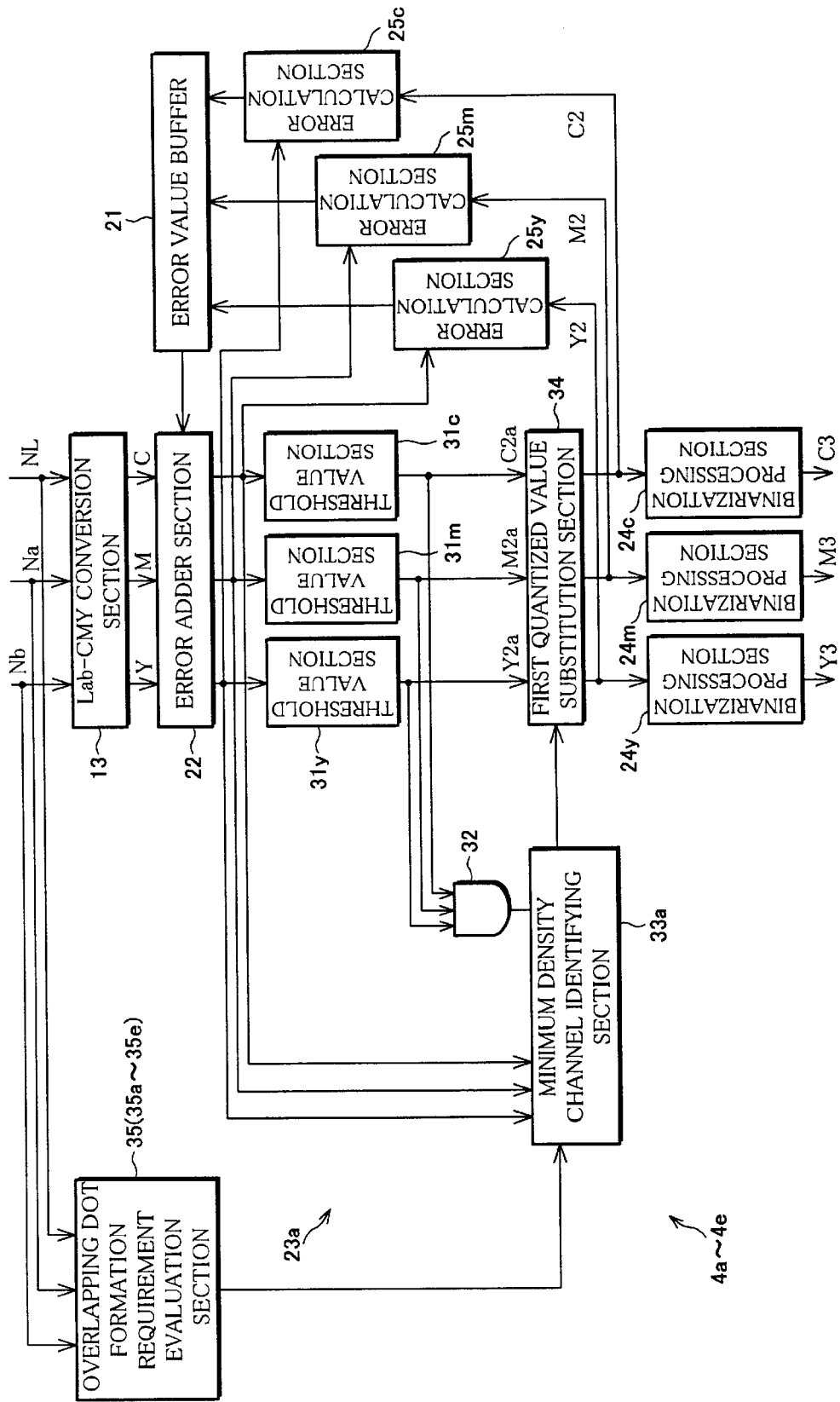
FIG. 8 is a block diagram showing a major part of a quasi-grayscale processing section in relation to another embodiment in accordance with the present invention.

To solve the problem, as shown in FIG. 8 for example, a quasi-grayscale processing section 4a of the present embodiment includes an overlapping dot formation requirement evaluation section 35 for determining whether black spots are to be formed, and if formation of black spots is necessary, halting the process of preventing overlapping dot formation performed by the minimum density channel identifying section 33 and the first quantized value substitution section 34.

Figure 9:
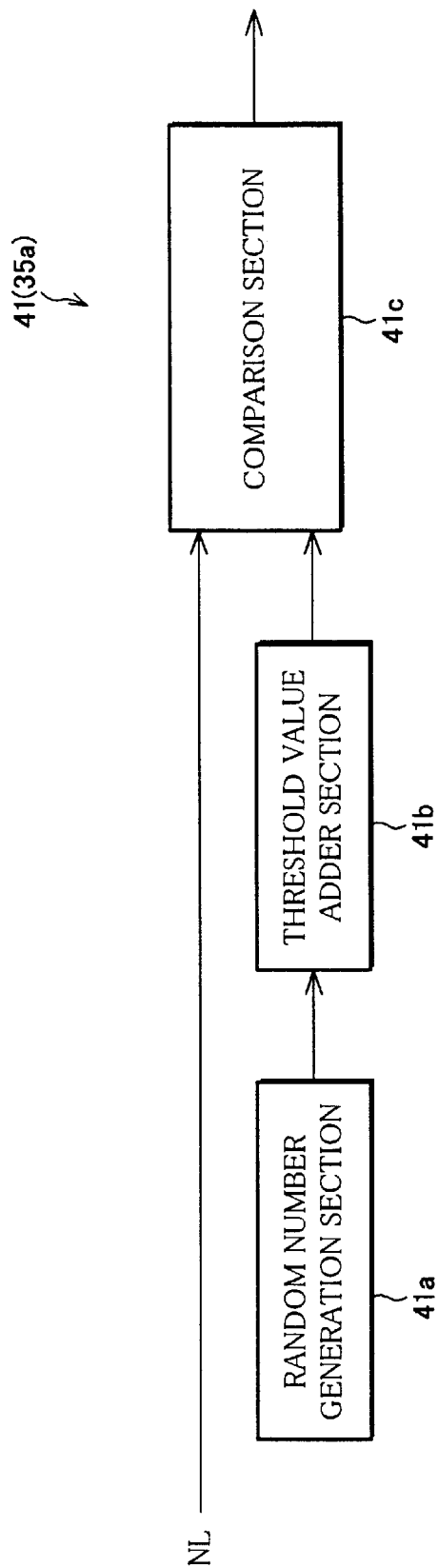
FIG. 9 is a block diagram showing, as an example, an arrangement of a brightness evaluation section serving as an overlapping dot formation requirement evaluation section in the quasi-grayscale processing section.

Specifically, the overlapping dot formation requirement evaluation section (brightness evaluation means) 35a of the present embodiment is a circuit for determining whether or not black spots need to be formed according to the brightness of a target pixel, and includes: a random number generation section 41a for outputting a random number, a; a threshold value adder section 41b for adding the predetermined threshold value to the random number a; and a comparison section 41c for comparing a normalized brightness signal NL with an output from the threshold value adder section 41b and determining whether or not the target pixel has a high brightness, as shown in FIG. 9. In the present embodiment, the random number generation section 41a, being constituted by a LUT, can output practically random value α, for example, by outputting a value specified according to a set of multitone CMY data as shown in FIG. 10.

Figures 10, 11:
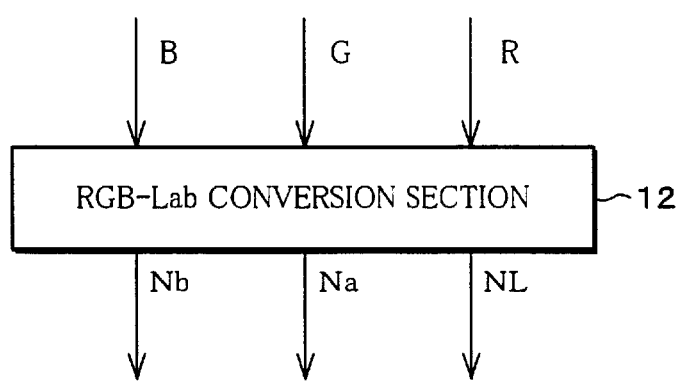
FIG. 10 is an explanatory drawing showing values stored as a LUT in the brightness evaluation section as an example.
FIG. 11 is a block diagram showing another arrangement of the pre-process section as an example.

The normalized brightness signal NL has a value equal to the normalized brightness of the target pixel, and is generated, for example, by an RGB-Lab conversion section 12 disposed in the pre-process section 5 as shown in FIG. 11. Specifically, if the 1976 CIE L*a*b* colorimetric reference system is employed as an example of a calorimetric reference system, the brightness of color, L*, of a printed material placed below a light source of D50 as stipulated by CIE (Commission Internationale de l'Eclairage) is in a range from 0 to 100; therefore, the RGB-Lab conversion section 12 of the present embodiment expresses brightness L* normalized in 8 bits.

Figure 12:
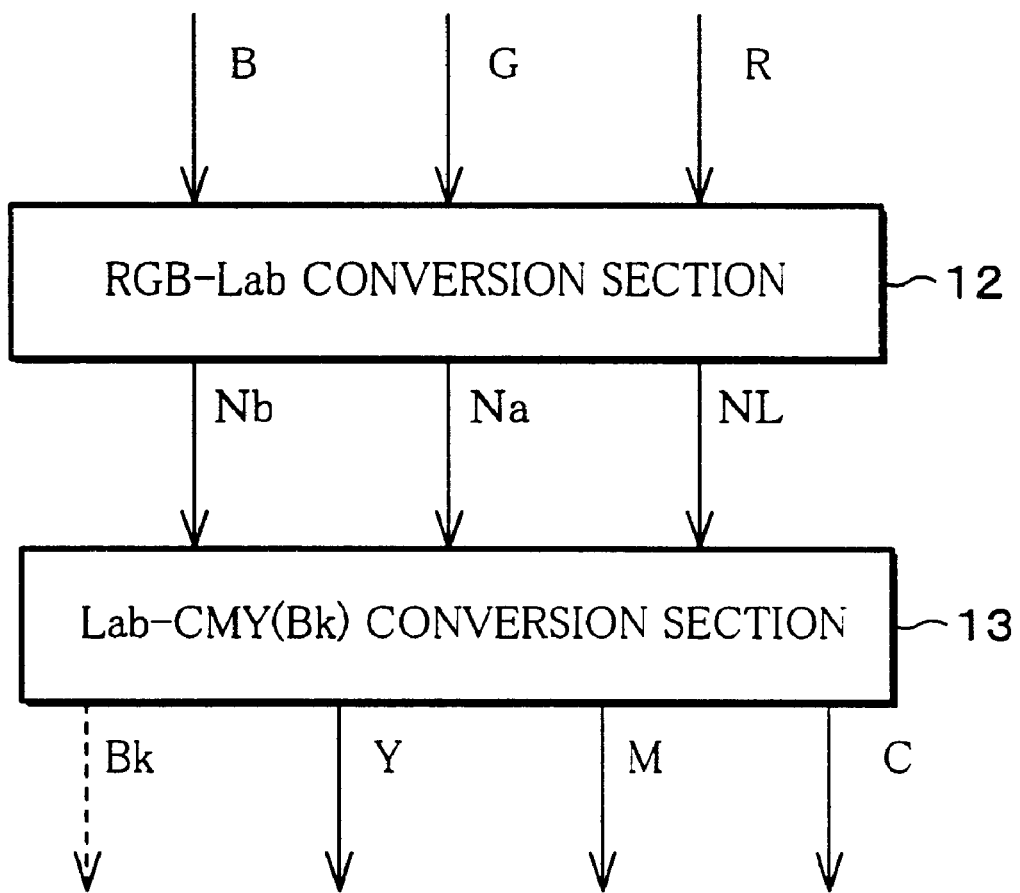
FIG. 12 is a block diagram showing a further arrangement of the pre-process section as an example.

Similarly to the RGB-CMY conversion section 11 of FIG. 3, the RGB-Lab conversion section 12 is rendered possible through a lookup table (LUT) combined with interpolation or by a minimum square or neural network technique. If signals in accordance with a calorimetric reference system is used as in the present embodiment, the RGB-CMY conversion section 11 and the RGB-LAB conversion section 12 may be both used; alternatively, a Lab-CMY conversion section 13 may be provided in place of the RGB-CMY conversion section 11 as shown in FIG. 12 to convert the signal outputs Nb, Na, and NL supplied by the RGB-LAB conversion section 12 in accordance with the colorimetric reference system to multitone CMY data. In the 1976 CIE L*a*b* colorimetric reference system, a* and b* are numbers denoting saturation and hue with a* ranging from −85 to +85 and b* ranging −75 to +125, and the RGB-LAB conversion section 12 outputs Na and Nb that are a* and b* normalized in 8 bits.

Figure 13:
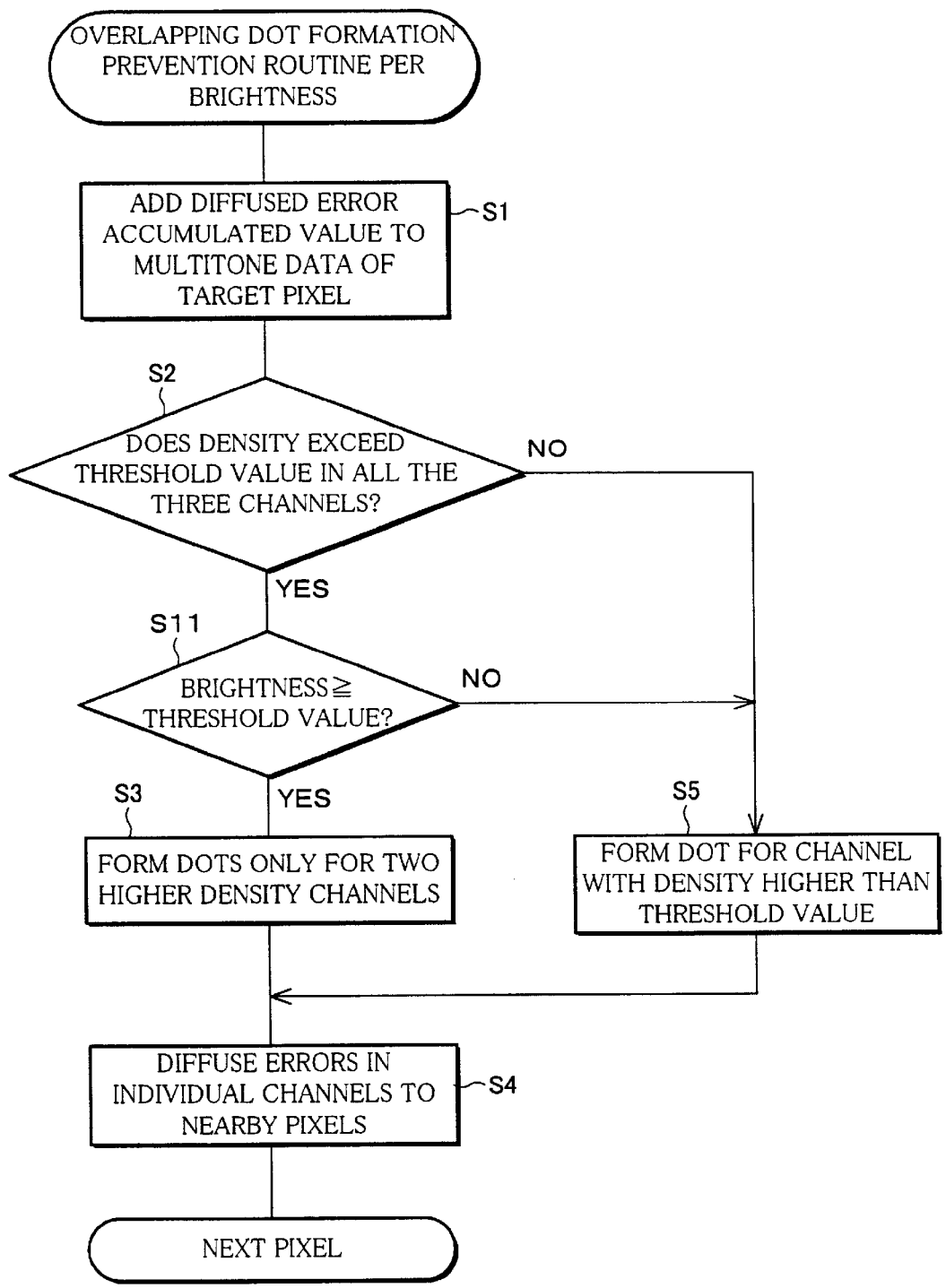
FIG. 13 is a flow chart showing an operation of the quasi-grayscale processing section.

As shown in FIG. 13, an image forming device 1a arranged in the foregoing manner executes substantially the same steps as that depicted in FIG. 6 so as to perform a quasi-grayscale process on the multitone CMY data and output multi-value data C3, M3, and Y3. However, in the present embodiment, S11 is interposed between S2 and S3 as shown in FIG. 13. If the comparison section 41c determines that the brightness value NL of the target pixel does not reach the brightness threshold value output from the threshold value adder section 41b, the overlapping dot formation requirement evaluation section 35a sends an instruction to the minimum density channel identifying section 33a to halt the substitute instruction supplied to the first quantized value substitution section 34. As a result, the quantization section 23a of FIG. 8 outputs the outputs C2a, M2a, and Y2a from the threshold value sections 31c, 31m, and 31y as the quantized values C2, M2, and Y2. This arrangement, if the brightness value does not reach the brightness threshold value ("NO" path selected in S11), causes S5 to be executed in the same manner as in a case where those dots for the three CMY channels are not formed overlapping one another, i.e., a dot is formed for a channel with a density higher than the threshold value.

According to the arrangement, the overlapping dot formation requirement evaluation section 35a determines whether or not an overlapping dot formation prevention step is needed according to the brightness of the target pixel prior to the execution of a quasi-grayscale 2 process. As a result, a pixel with a low brightness is regarded as having a black-like color and being a point where a black spot may be formed, allowing dots to be formed overlapping one another. Thus, a black spot can be formed by those dots formed overlapping one another for the CMY channels where there is a lack in the black component. Conversely, a black spot should not be formed at a pixel with a high brightness even if such an instruction is issued that dots be formed on top of another subsequent to quantization. Such a pixel is regarded as being a point where a quasi-grayscale process resulted in an instruction to unnecessarily form overlapping dots, and the overlapping dot formation is prevented. Consequently, originally black spots are allowed to be formed, while preventing only undesirable formation of black spots resulting from quasi-grayscale processes.

In the present embodiment, the random number generation section 41a has so far varied the threshold value for brightness in proximity of a predetermined value; this is however not the only possibility. For example, the comparison section 41c may compare the brightness of the target pixel with a fixed brightness threshold value, which still produces similar results. However, when the brightness threshold value is constant, there is a likelihood of an undesirable boundary developing around an output image. Therefore, it is preferred to vary the brightness threshold value as detailed in the present embodiment.

The optimal value and variation (range of the random number α) of the brightness threshold value (predetermined value) are determined, for example, in reference to print results, since they change due to the input image, the properties of the color printer section 2, and other various factors. The optimal value and variation may be predetermined or specified by the user through specifying means provided.

[Embodiment 3]

In the second embodiment, the discussion focused on the overlapping dot formation requirement evaluation section 35 evaluating the need to form overlapping dots according to the brightness of a target pixel. In the present embodiment, the discussion will shift to the overlapping dot formation requirement evaluation section 35 evaluating the same need according to the saturation of a target pixel, in reference to FIG. 14 to FIG. 18.

Figure 14:
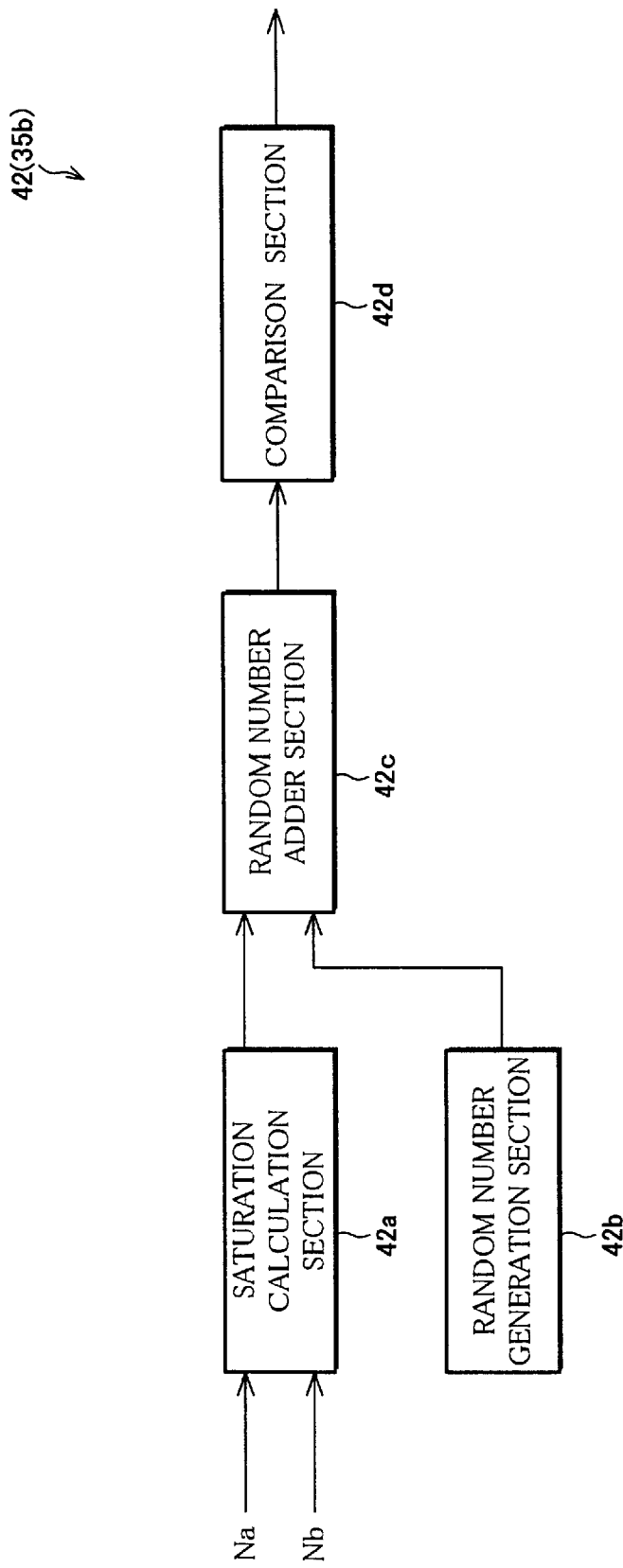
FIG. 14 is a block diagram showing, as an example, an arrangement of an saturation evaluation section serving as an overlapping dot formation requirement evaluation section in relation to still another embodiment in accordance with the present invention.

The overlapping dot formation requirement evaluation section (saturation evaluation means) 35b of the present embodiment, as shown in FIG. 14, includes: a saturation calculation section 42a for calculating the saturation of a target pixel based on signals Na and Nb in accordance with a calorimetric reference system; a random number generation section 42b for generating a random number β; a random number adder section 42c for adding the random number β to the squares of saturations; and a comparison section 42d for comparing an output from the random number adder section 42c with a predetermined saturation threshold value.

According to the arrangement, the random number adder section 42c can output Chorm that is equal to the sum of the squares of saturations and the random number β, which is given by Equation (1):

$$\text{Chorm} = (Na-a0)^2 + (Nb-b0)^2 + \beta \quad (1)$$

where a0 and b0 are equal to normalized values for a*=0 and b*=0 in accordance with the calorimetric reference system.

Figure 15:
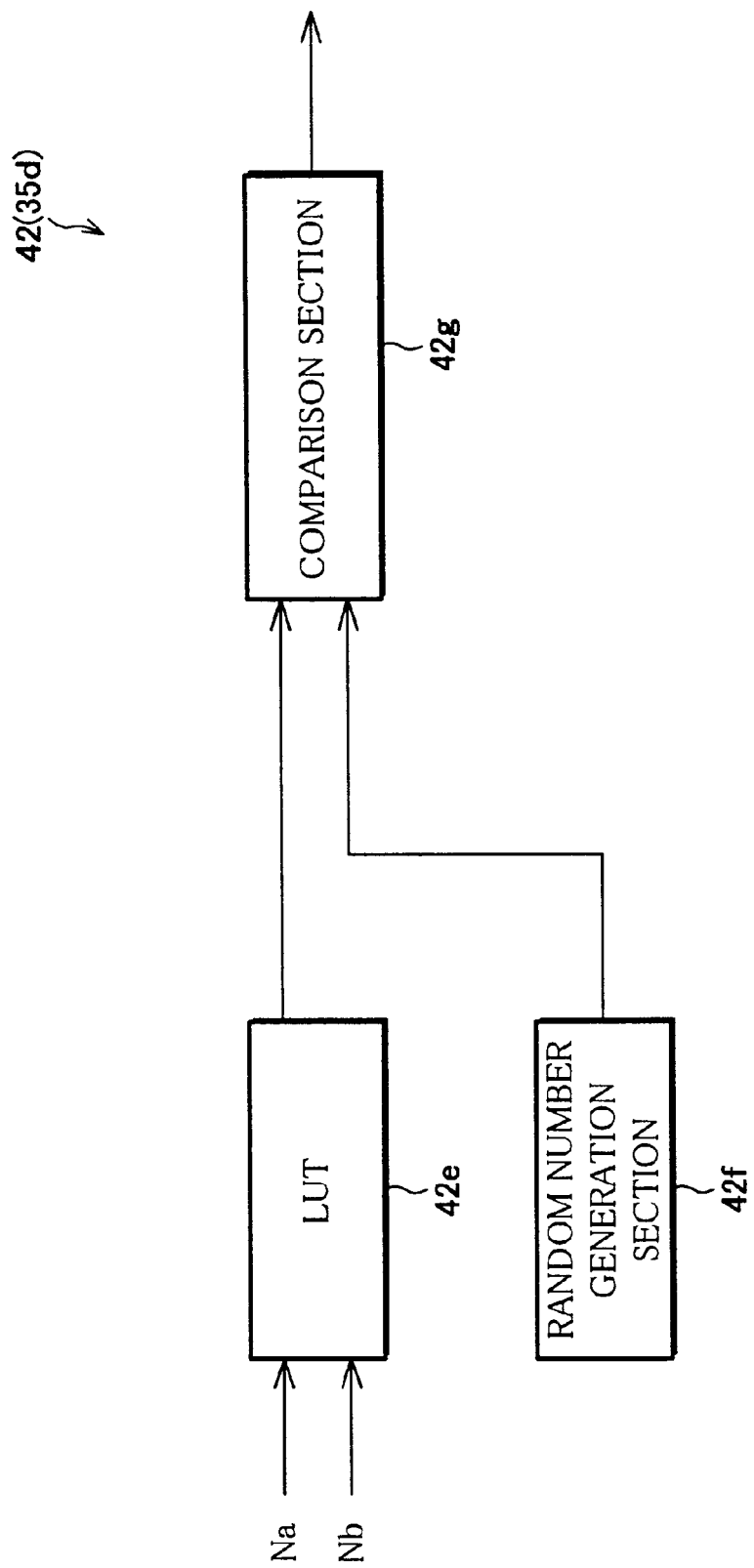
FIG. 15 is a block diagram showing another arrangement of the saturation evaluation section.

In FIG. 14 a saturation was obtained through a formula; alternatively, the arrangement may be such that a LUT is used to obtain a saturation as shown in FIG. 15. In this arrangement, the members 42a to 42d are replaced by a LUT 42e in which output values are stored that represent saturations depending on the combination of values for the signals Na and Nb in accordance with a colorimetric reference system, a random number generation section 42f for generating a random number γ, and a comparison section 42g for comparing the outputs from the LUT 42e and the random number generation section 42f. The LUT 42e in accordance with the arrangement stores numbers 0 to 3 corresponding to the combination of Na and Nb normalized in 3 bits as shown in FIG. 16. Meanwhile, the random number generation section 42f generates values from 0 to 3 at random, the comparison section 42g then compares the outputs from the LUT 42e and the random number generation section 42f; if the LUT data value is greater than the random number γ, it is determined that the target pixel has a high saturation. This arrangement is advantageous over the arrangement to obtain a saturation through calculation as shown in FIG. 14 in that circuits are easy to design and also that the specification of a saturation threshold value can be flexible by adjusting the value stored in the LUT 42e.

Figure 17:
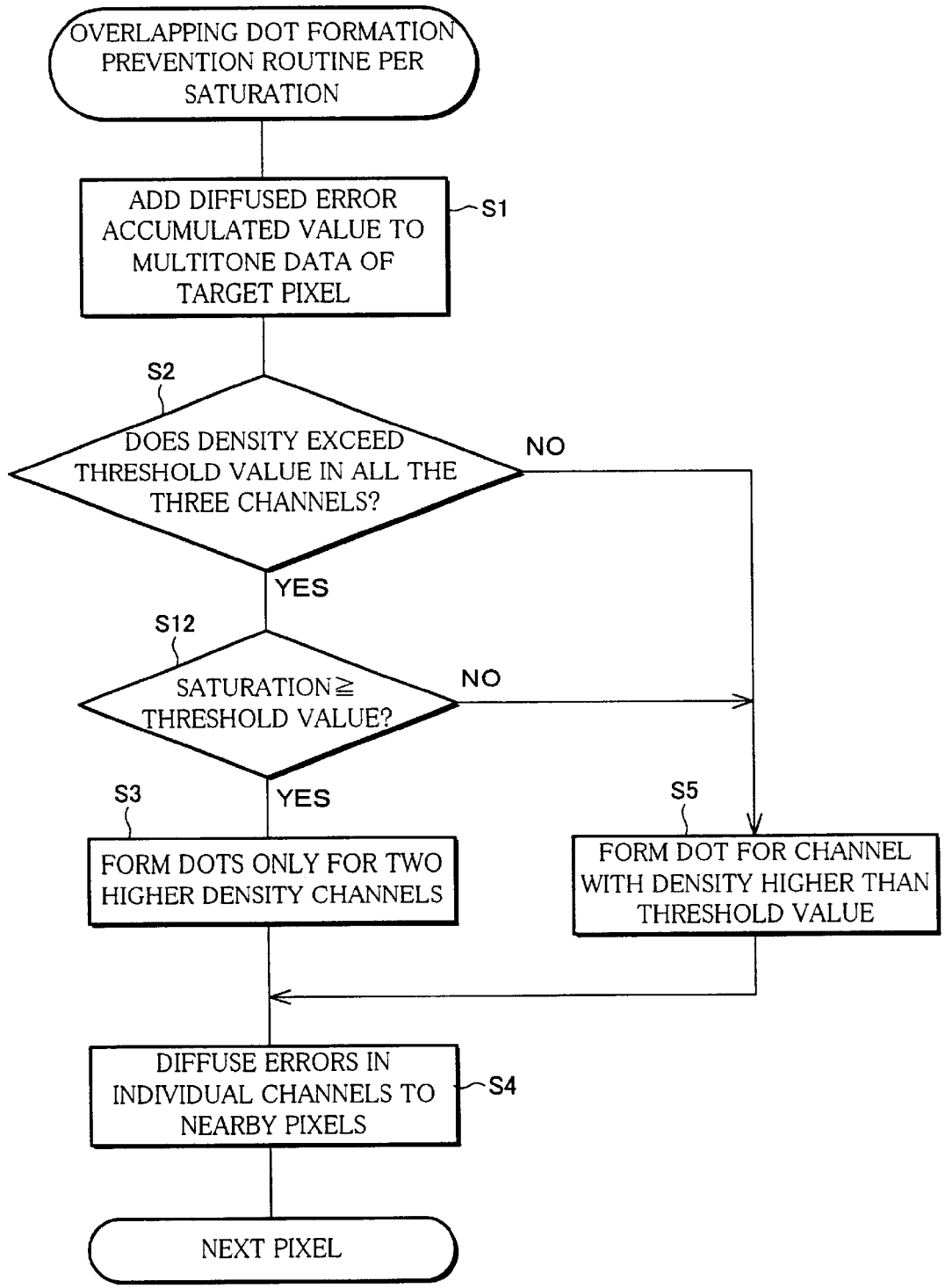
FIG. 17 is a flow chart showing an operation of a quasi-grayscale processing section including the overlapping dot formation requirement evaluation section.

An image forming device 1b including an overlapping dot formation requirement evaluation section 35b, regardless of the arrangement of the overlapping dot formation requirement evaluation section 35b, performs a quasi-grayscale process on multitone CMY data by substantially the same steps as those shown in FIG. 13 so as to output multi-value data C3, M3, and Y3 as shown in FIG. 17. It should be noted in the present embodiment, however, that S12 replaces S11 of FIG. 13 and also that if the saturation of the target pixel that is yet to be subjected to a quasi-grayscale process does not reach the saturation threshold value ("NO" path selected in S12), the overlapping dot formation requirement evaluation section 35b sends such an instruction to the minimum density channel identifying section 33a to prevent a substitute instruction to be transmitted to the first quantized value substitution section 34. As a result, the first quantized value substitution section 34 of FIG. 8 passes on the outputs C2a, M2a, and Y2a from the threshold value sections 31c, 31m, and 31y as the quantized values C2, M2, and Y2. Hence, if the saturation is below the saturation threshold value ("NO" path selected in S12), S5 is carried out so as to form a dot for a channel with a density higher than the threshold value in the same manner as in a case where no overlapping dot formation is detected for the three CMY channels.

According to the above arrangement, the overlapping dot formation requirement evaluation section 35b determines whether or not an overlapping dot formation prevention process needs to be performed according to the saturation of the target pixel that is yet to be subjected to a quasi-grayscale process. This enables black spots to be formed by overlapping dot formation at a pixel with a low saturation (substantially a zero saturation). Therefore, a black spot can be formed by those dots formed overlapping one another for the CMY channels where there is a lack in the black component. Conversely, a black spot should not be formed at a pixel with a high saturation, such as red, even if such an instruction is issued that dots be formed overlapping one another subsequent to correction and quantization. Such a pixel is regarded as being a point where a quasi-grayscale process resulted in an instruction to unnecessarily form overlapping dots, and the overlapping dot formation is interrupted. Consequently, originally black spots are allowed to be formed, while preventing only undesirable formation of black spots resulting from a quasi-grayscale process, reducing dark blotches in a high saturation area.

Similarly to the second embodiment, the saturation threshold value may be fixed in the case of an overlapping dot formation requirement evaluation section 35b using saturation too. As detailed in the present embodiment so far, a boundary can be prevented from developing around an output image by varying the saturation threshold value at random. The reference value and variation of the saturation threshold value are determined considering print results. Alternatively, the value and variation may be predetermined or specified by the user.

[Embodiment 4]

Figure 18:
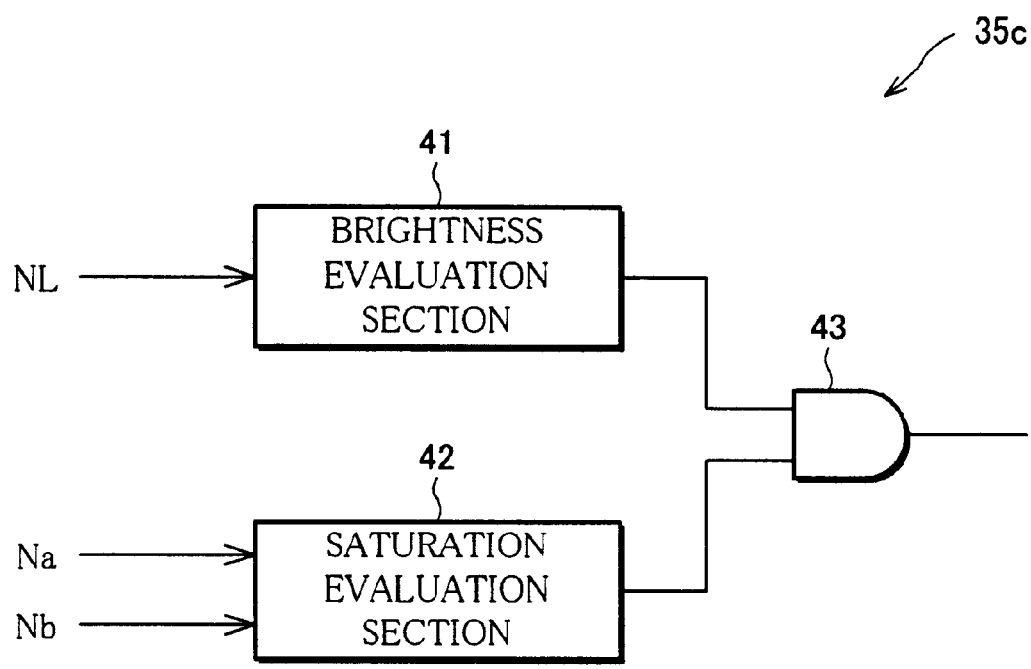
FIG. 18 is a block diagram showing, as an example, another arrangement of the overlapping dot formation requirement evaluation section in relation to another embodiment in accordance with the present invention.
Figure 19:
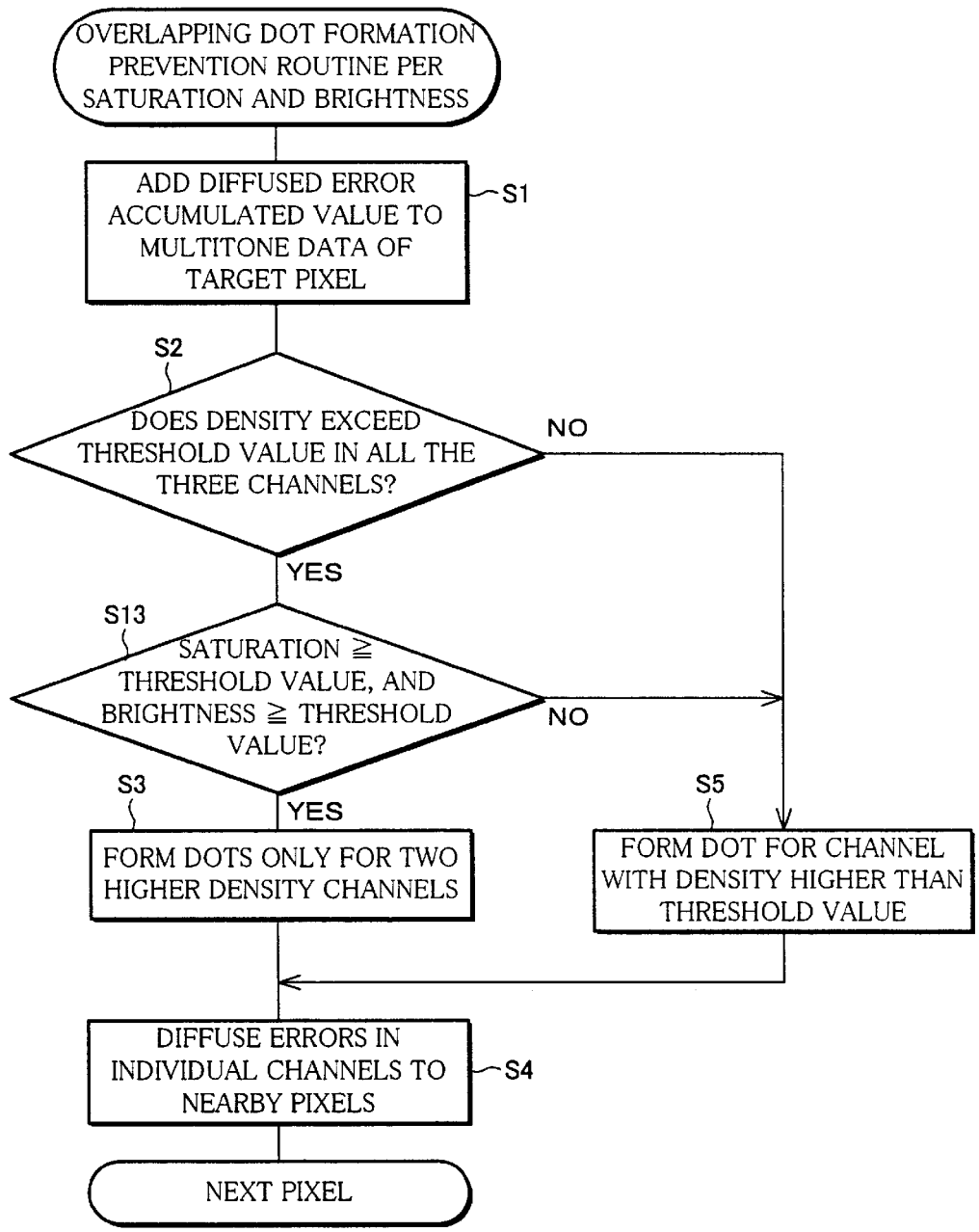
FIG. 19 is a flow chart showing an operation of a quasi-grayscale processing section including the overlapping dot formation requirement evaluation section.

In the present embodiment, referring to FIG. 18 and FIG. 19, the discussion will focus on an overlapping dot formation requirement evaluation section 35c evaluating the need to perform an overlapping dot formation process according to both brightness and saturation.

The overlapping dot formation requirement evaluation section 35c of the present embodiment includes: a brightness evaluation section (brightness evaluation means) 41 having the same arrangement as the overlapping dot formation requirement evaluation section 35a in the second embodiment; a saturation evaluation section (saturation evaluation means) 42 having the same arrangement as the overlapping dot formation requirement evaluation section 35b in the third embodiment; and a signal output section 43 for generating an output signal according to outputs from the both sections as shown in FIG. 18. When a target pixel has a high brightness and a high saturation, the first quantized value substitution section 34, of FIG. 8 prevents overlapping formation of three dots. In the present embodiment, when the brightness evaluation section 41 determines that the target pixel has a high brightness, or when the saturation evaluation section 42 determines that the target pixel has a high saturation, "1" is outputted. When a signal transmitted from the overlapping dot formation requirement evaluation section 35c is "1", the minimum density channel identifying section 33a adjusts quantized values C2, M2, and Y2 so as to interrupt overlapping dot formation. For these reasons, an AND circuit is used as the signal output section 43.

In the arrangement, as shown in FIG. 19, the multitone CMY data is subjected to a quasi-grayscale process by substantially the same steps with those shown in FIG. 17 so as to output the multi-value data C3, M3, and Y3. It should be noted in the present embodiment, however, that S13 replaces S12 of FIG. 17 and also that if the saturation and the brightness of the target pixel that is yet to be subjected to a quasi-grayscale process is equal to or exceeds the saturation threshold value and the brightness threshold value respectively ("YES" path selected in S13), the overlapping dot formation requirement evaluation section 35c sends such an instruction to the minimum density channel identifying section 33a to output a substitute instruction to the first quantized value substitution section 34 when an overlapping formation of three dots is detected. Conversely, if either one of the saturation and the brightness of the target pixel that is yet to be subjected to a quasi-grayscale process is under their respective saturation values ("NO" path selected in S13), the overlapping dot formation requirement evaluation section 35c sends such an instruction to the minimum density channel identifying section 33a to prevent a substitute instruction to be transmitted to the first quantized value substitution section 34. As a result, S5 is carried out to form a dot for a channel with a density higher than the threshold value in the same manner as in a case where no overlapping dot formation is detected for the three CMY channels.

According to the above arrangement, the overlapping dot formation requirement evaluation section 35c evaluates the need to perform an overlapping dot formation prevention process according to the saturation and the brightness of the target pixel that is yet to be subjected to a quasi-grayscale process. As a result, black spots are formed in an area with a low saturation (zero-saturation area) and in an area with a low brightness (dark area). Therefore, a black spot can be formed by those dots formed overlapping one another for the CMY channels where there is a lack in the black component.

Conversely, in an area with a high saturation and a high brightness, an instruction to form overlapping dots is regarded as being a wrong instruction resulting from a quasi-grayscale process, and the overlapping dot formation is interrupted. In the foregoing, overlapping dot formation was interrupted in an area where both saturation and brightness are high; alternatively, overlapping dot formation may be interrupted in an area where either saturation or brightness is high. Either way, it is better ensured that only those black spots undesirably formed by a quasi-grayscale process can be removed than in a case where the evaluation is based either on the brightness or on the saturation alone.

[Embodiment 5]

In the second to fourth embodiments, the need to perform an overlapping dot formation prevention process was evaluated based on the target pixel that is yet to be subjected to a quasi-grayscale process. In the present embodiment, the evaluation is done based on whether or not the target pixel belongs to a text area, as an example of evaluation procedures based on a plurality of pixels.

Figure 20:
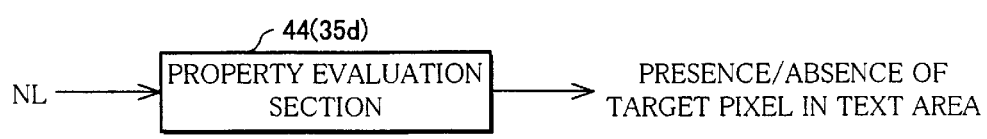
FIG. 20 is a block diagram showing, as an example, an arrangement of an overlapping dot formation requirement evaluation section for evaluation by means of a text area, in relation to another embodiment in accordance with the present invention.

An overlapping dot formation requirement evaluation section 35d of the present embodiment, as shown in FIG. 20, includes a property evaluation section (area evaluation means) 44 for evaluating properties of an area to which a target pixel belongs. There are various methods to determine whether or not a target pixel belongs to a text area according to input image data. As an example of such a method, in the property evaluation section 44, first and second property parameters representative of properties of a local block made up of a target pixel and a plurality of pixels in its proximity are extracted and then inputted to an evaluation circuit using a neuro-circuit network to identify an area to which a target pixel belongs. The first property parameter is a difference between a maximum signal level (brightness level) and a minimum signal level in the local block. The second property parameter is the sum of differences in signal level between two pixels which are adjacent to each other in a main scanning direction in the local block or the sum of differences in signal level between two pixels which are adjacent to each other in an auxiliary scanning direction in the local block, whichever is smaller. In the foregoing, the evaluation was based on the two property parameters, as an example; however, other methods are also applicable that produce similar results, as long as they can determine whether or not a target pixel belongs to a text area.

Figure 21:
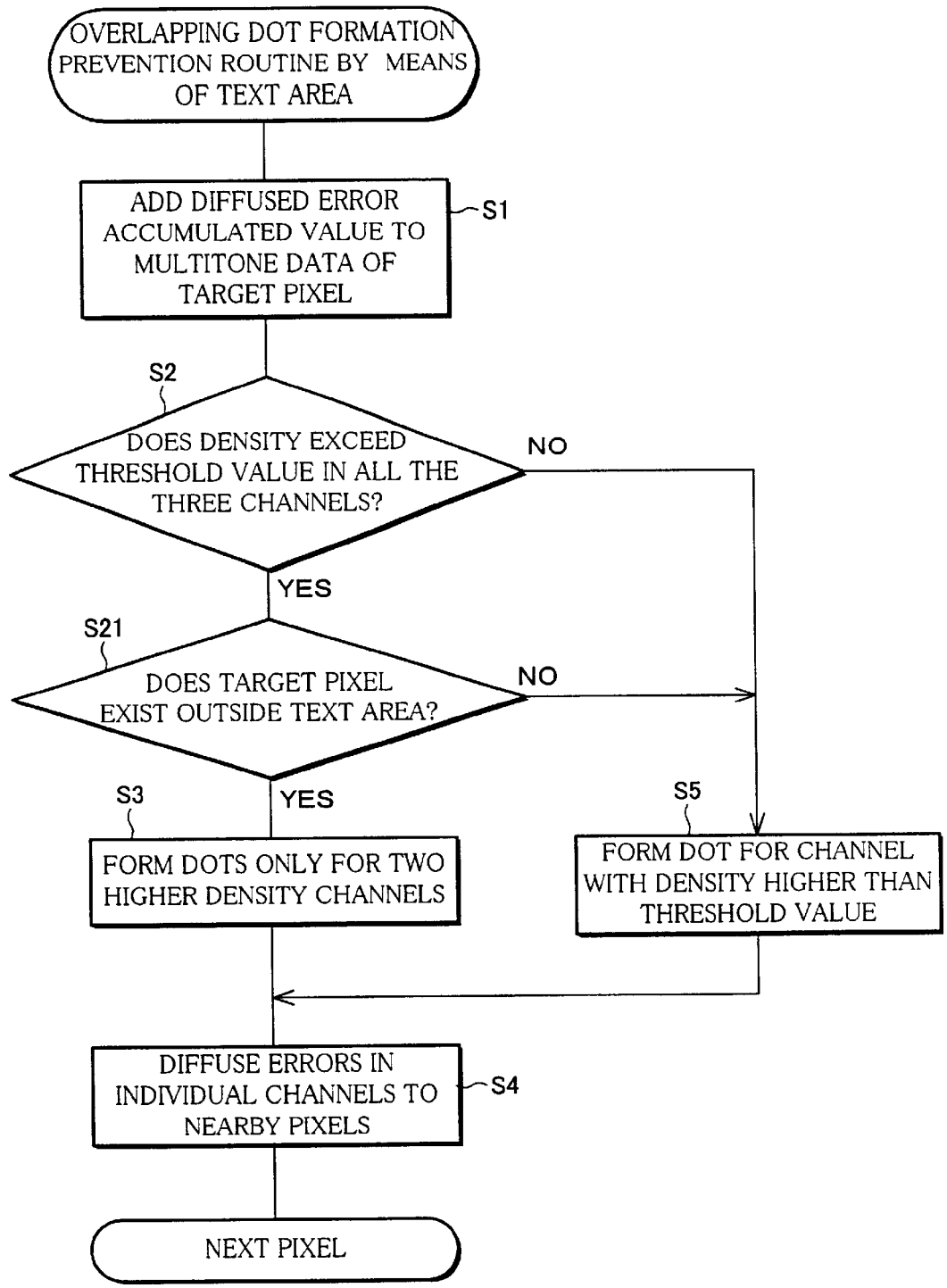
FIG. 21 is a flow chart showing an operation of a quasi-grayscale processing section including the overlapping dot formation requirement evaluation section.

In the foregoing arrangement, as shown in FIG. 21, multitone CMY data is subjected to a quasi-grayscale process by substantially the same steps with those shown in FIG. 19 so as to output multi-value data C3, M3, and Y3. It should be noted in the present embodiment, however, that S21 replaces S13 of FIG. 19 and also that if a target pixel exists in a text area ("NO" path selected in S21), the overlapping dot formation requirement evaluation section 35d sends such an instruction to the minimum density channel identifying section 33a to prevent a substitute instruction to be transmitted to the first quantized value substitution section 34. As a result, S5 is carried out to form a dot for a channel with a density higher than the threshold value in the same manner as in a case where no overlapping dot formation is detected for the three CMY channels.

According to the arrangement, the overlapping dot formation requirement evaluation section 35d evaluates the need to perform an overlapping dot formation prevention process according to whether or not a target pixel exists in a text area. As a result, black spots are formed in a text area, which prevents blurring of printed letters and characters. Conversely, overlapping dot formation is interrupted in graphics and other non-text areas. As a result, only those black spots undesirably formed by a quasi-grayscale process can be eliminated without blurring letters or characters.

[Embodiment 6]

In the fifth embodiment, the need to perform an overlapping dot formation prevention process was evaluated solely according to whether or not a target pixel existed in a text area. Meanwhile, in the present embodiment, an image forming device 1e will be explained that incorporates, as well as this arrangement, the arrangement as detailed in the aforementioned third embodiment involving the saturation of a target pixel, so as to evaluate the need to perform an overlapping dot formation prevention process and prevent dark blotches from tarnishing color-saturated letters and characters.

Figure 22:
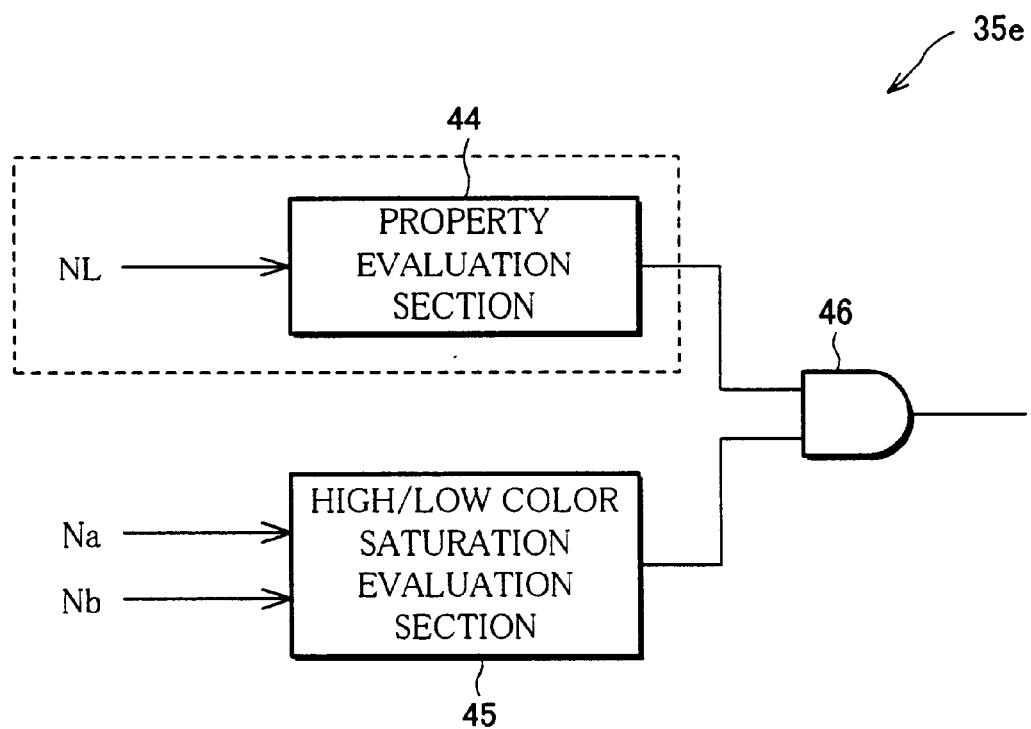
FIG. 22 is a block diagram showing, as an example, still another arrangement of an overlapping dot formation requirement evaluation section in relation to still another embodiment in accordance with the present invention.

As shown in FIG. 22, the overlapping dot formation requirement evaluation section (area evaluation means) 35e of the present embodiment includes: a property evaluation section 44 similar to the one shown in FIG. 20; a high/low color saturation evaluation section 45 for determining whether a target pixel has a high saturation or a low saturation; and a signal output section 46 for generating an output signal according to the evaluation by the evaluation sections 44 and 45. The overlapping dot formation requirement evaluation section 35e prevents substitute instruction to be transmitted to the first quantized value substitution section 34 shown in FIG. 8 if a target pixel belongs to low color saturation letters or characters. In the present embodiment, if the property evaluation section 44 determines that a target pixel belongs to a text area, "1" is outputted. The color saturation evaluation section 45 is arranged in substantially the same manner as the overlapping dot formation requirement evaluation section 35c shown in FIG. 15 or FIG. 16, but in the present embodiment, adopts a different output logic, outputting "1" when it is determined that a target pixel has no color saturation. The minimum density channel identifying section 33a of the present embodiment does not output a substitute instruction if the output from the signal output section 46 is "1." For these reasons, an AND circuit is used as the signal output section 46.

Figure 23:
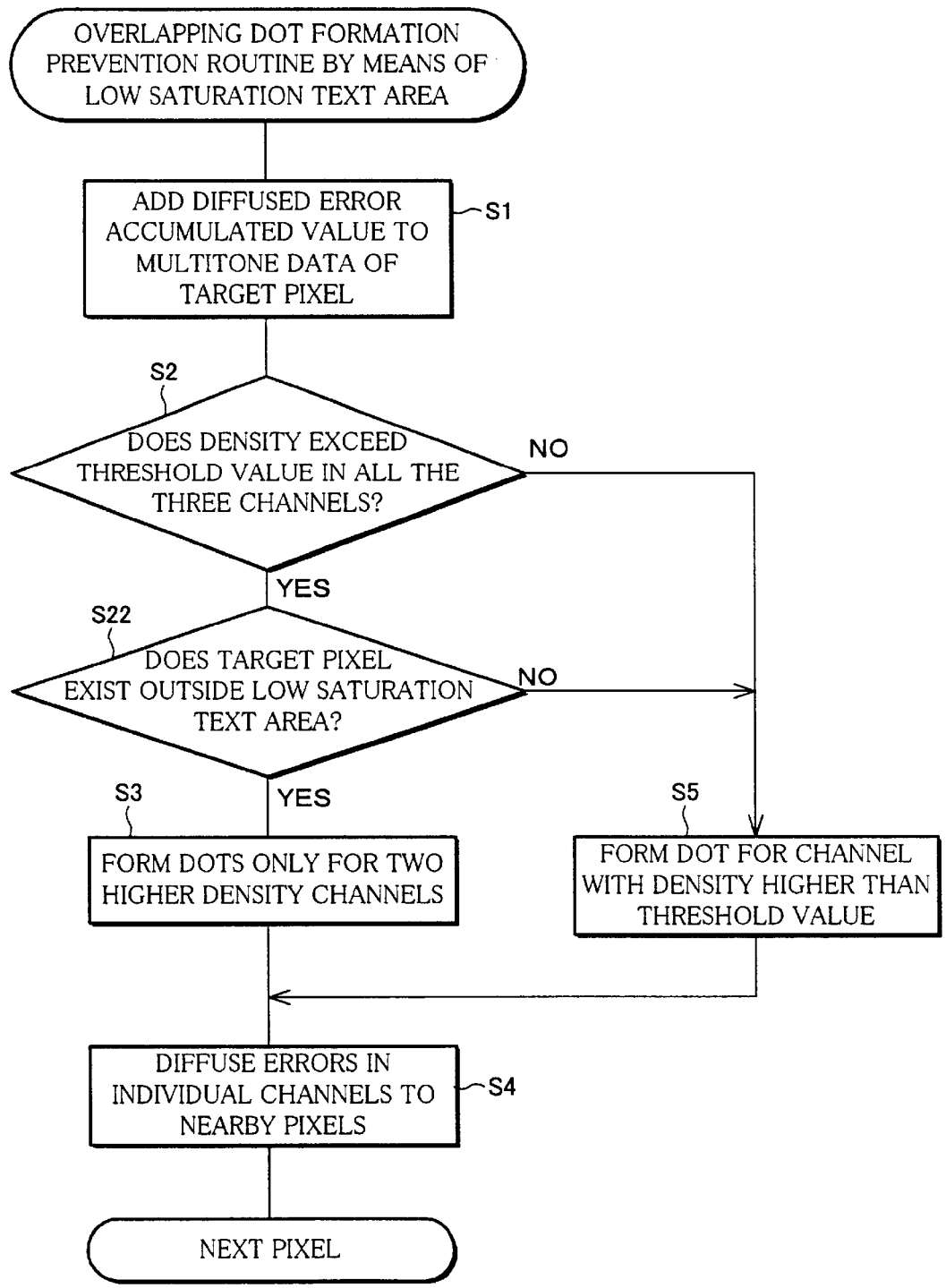
FIG. 23 is a flow chart showing an operation of a quasi-grayscale processing section including the overlapping dot formation requirement evaluation section.

In the arrangement, as shown in FIG. 23, multitone CMY data is subjected to a quasi-grayscale process by substantially the same steps as those shown in FIG. 21 so as to output multi-value data C3, M3, and Y3. It should be noted in the present embodiment, however, that S22 replaces S21 of FIG. 21 and also that if a target pixel exists in an unsaturated text area ("NO" path selected in S22), the overlapping dot formation requirement evaluation section 35e sends such an instruction to the minimum density channel identifying section 33a to prevent a substitute instruction to be transmitted to the first quantized value substitution section 34. As a result, S5 is carried out to form a dot for a channel with a density higher than the threshold value in the same manner as in a case where no overlapping dot formation is detected for the three CMY channels. Conversely, if the target pixel does not exist in a text area, or does exist in a text area, but, has a high color saturation ("YES" path selected in S22), the overlapping dot formation requirement evaluation section 35e sends such an instruction to the minimum density channel identifying section 33a to output a substitute instruction to the first quantized value substitution section 34 upon detection of an overlapping formation of three dots.

According to the foregoing arrangement, the overlapping dot formation requirement evaluation section 35e evaluates the need to perform an overlapping dot formation prevention process according to whether or not the target pixel constitutes an unsaturated letter or character. As a result, overlapping dot formation is interrupted in a highly saturated text area as well as in non-text areas, which prevents highly color-saturated letters and characters from being tarnished with dark blotches.

[Embodiment 7]

In the second to sixth embodiments, the need to perform an overlapping dot formation prevention process was evaluated according to the data on a pixel (image) before calculation for corrected values C1, M1, and Y1. Meanwhile, in the present embodiment, the evaluation is based on the corrected values C1, M1, and Y1 as another example of evaluation procedures.

Figure 24:
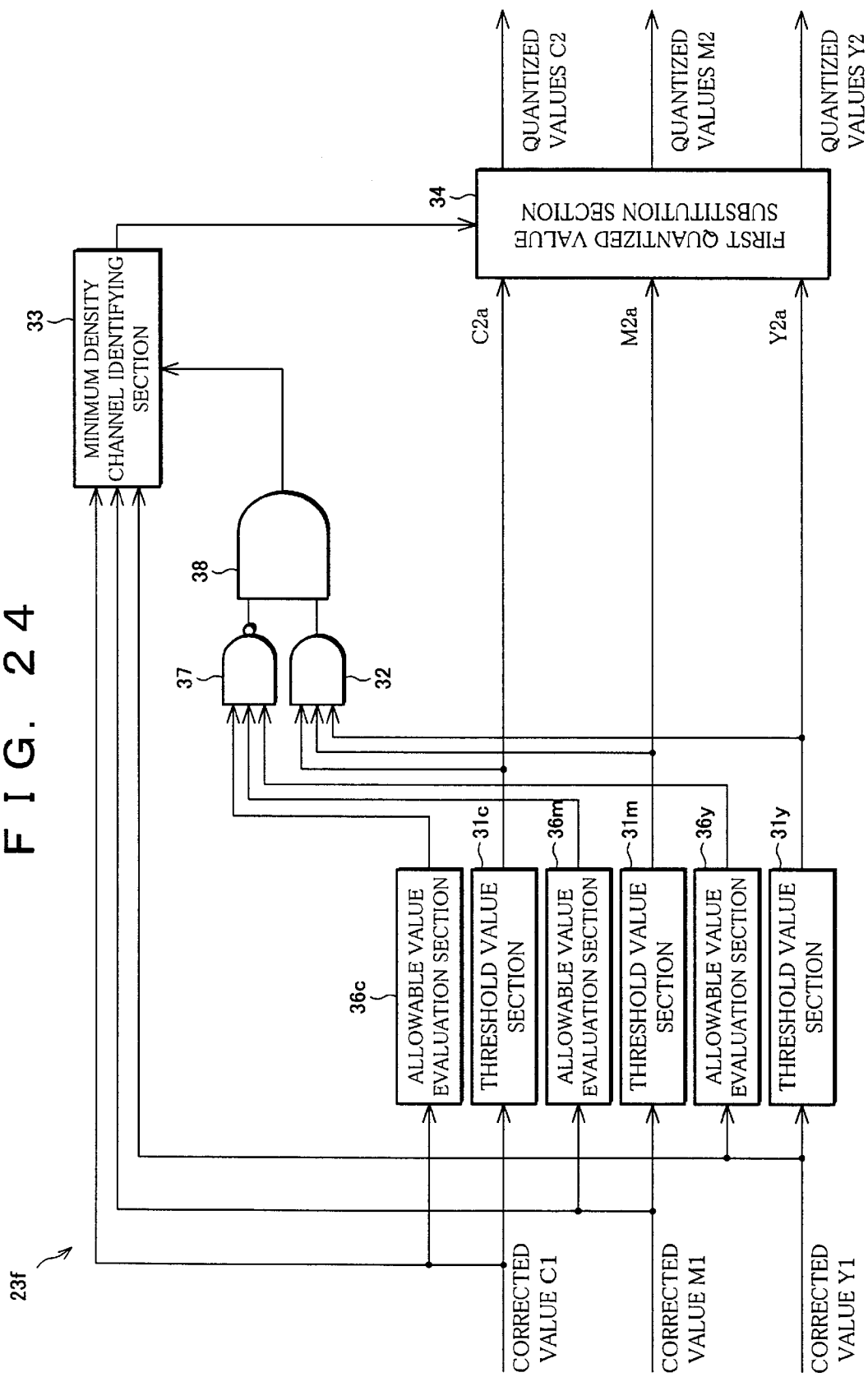
FIG. 24 is a block diagram showing an arrangement of a major part of a quantization section disposed in a quasi-grayscale processing section in relation to another embodiment in accordance with the present invention.

A quantization section 23f of the present embodiment, as shown in FIG. 24, incorporates the arrangement of the quantization section 23 shown in FIG. 1 and additionally includes: allowable value evaluation sections (the second comparator means) 36c, 36m, and 36y for comparing corrected values C1, M1, and Y1 and predetermined allowable values; a NAND circuit 37 for computing NOT the AND of outputs from the allowable value evaluation sections 36c, 36m, and 36y; and an AND circuit 38 for outputting the AND between the overlapping CMY dot formation detector section 32 and the NAND circuit 37 to the minimum density channel identifying section 33. The allowable values are set to, for example, 224, or alternatively to other values greater than the threshold values for the threshold value sections 31c, 31m, and 31y.

Hence, when the allowable value evaluation sections 36c, 36m, and 36y determine that those densities for the channels are all greater than the respective allowable values, even if an overlapping dot formation is detected by the overlapping CMY dot formation detector section 32, the output from the AND circuit 37 to the minimum density channel identifying section 33 is equal to the value when no overlapping dot formation is detected. Conversely, if the allowable value evaluation sections 36c, 36m, and 36y determine that any one of the densities is smaller than its corresponding allowable value, the AND circuit 38 sends such an instruction to the minimum density channel identifying section 33 to output a substitute instruction to the first quantized value substitution section 34 if the overlapping CMY dot formation detector section 32 detects overlapping dot formation, and prevents the minimum density channel identifying section 33 from transmitting a substitute instruction if the overlapping CMY dot formation detector section 32 detects no overlapping dot formation.

The optimal values of the allowable values are determined considering print results as are the aforementioned saturation and brightness threshold values, and may be predetermined or specified by the user. Further, the allowable values may be set either to an identical value or to individual values.

Figure 25:
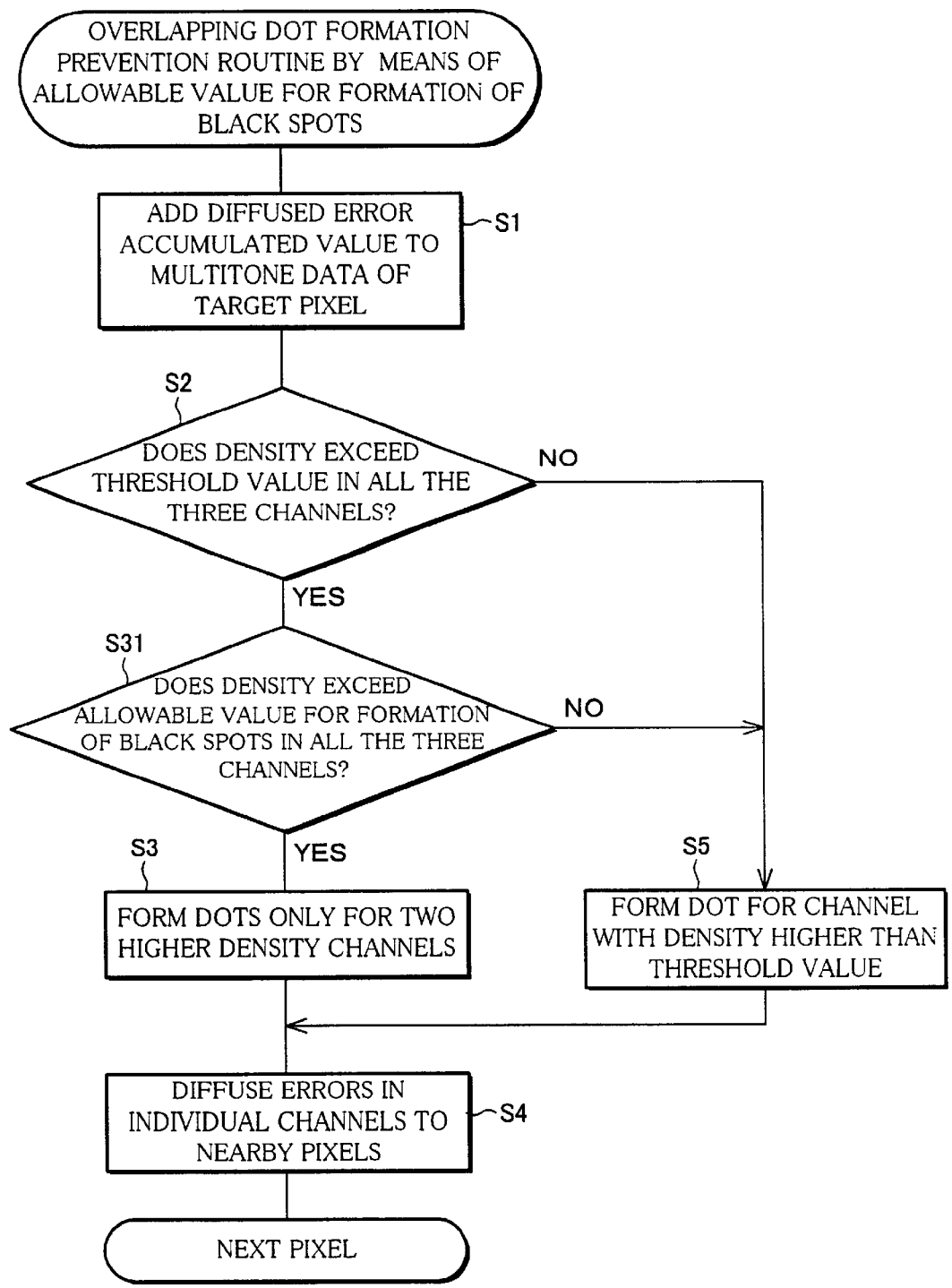
FIG. 25 is a flow chart showing an operation of the quasi-grayscale processing section.

In the arrangement, as shown in FIG. 25, multitone CMY data is subjected to a quasi-grayscale process by substantially the same steps as those shown in FIG. 6 to output multi-value data C3, M3, and Y3. It should be noted in the present embodiment, however, that S31 is interposed between S2 and S3 and also that if densities are higher than the threshold values for dot formation in all the three CMY channels and if a density is lower than an allowable value for formation of black spots in any one of the three CMY channels ("YES" paths in both S2 and S3), S3 and its subsequent steps prevent dot formation of a minimum density.

Conversely, even when all the three CMY channels have densities greater than the threshold values for dot formation, if all the three CMY channels have densities greater than the allowable values for black spots formation ("NO" path selected in S31), the minimum density channel identifying section 33 is prevented from sending a substitute instruction. As a result, S5 is carried out to form a dot for a channel with a density higher than the threshold value in the same manner as in a case where no overlapping dots are formed for the three CMY channels.

According to the above arrangement, if the corrected values C1, M1, and Y1 exceed allowable values for black spots formation in all the channels, the quantization section 23f sends an instruction to form three overlapping CMY dots to the color printer section 2 shown in FIG. 1. Therefore, even if error increases by reducing the number of CMY dots formed overlapping one another, when all the channels have densities exceeding the allowable values, the overlapping CMY dot formation corrects errors substantially. As a result, errors exceeding a predetermined value are prevented from occurring, enabling the image forming device 1f to output an image more faithfully to the input image.

In the present embodiment so far, the substitution by the first quantized value substitution section 34 was interrupted when densities exceed allowable values in all the channels; alternatively, the substitution may be interrupted when a density exceeds an allowable value in any one of the channels, still producing similar results.

[Embodiment 8]

In the first to seventh embodiments, a presumption has been made such that the image forming device is capable of forming dots in three CMY hues. Alternatively, the image forming device may form dots of other kinds. The present invention is applicable where dots are formed in light cyan and other hues and also in black color, for example. The following description will discuss, referring to FIG. 26 to FIG. 29, such conditions applied to the first embodiment. However, the same discussion holds true with any of the image forming devices in accordance with the first to seventh embodiments.

Figure 26:
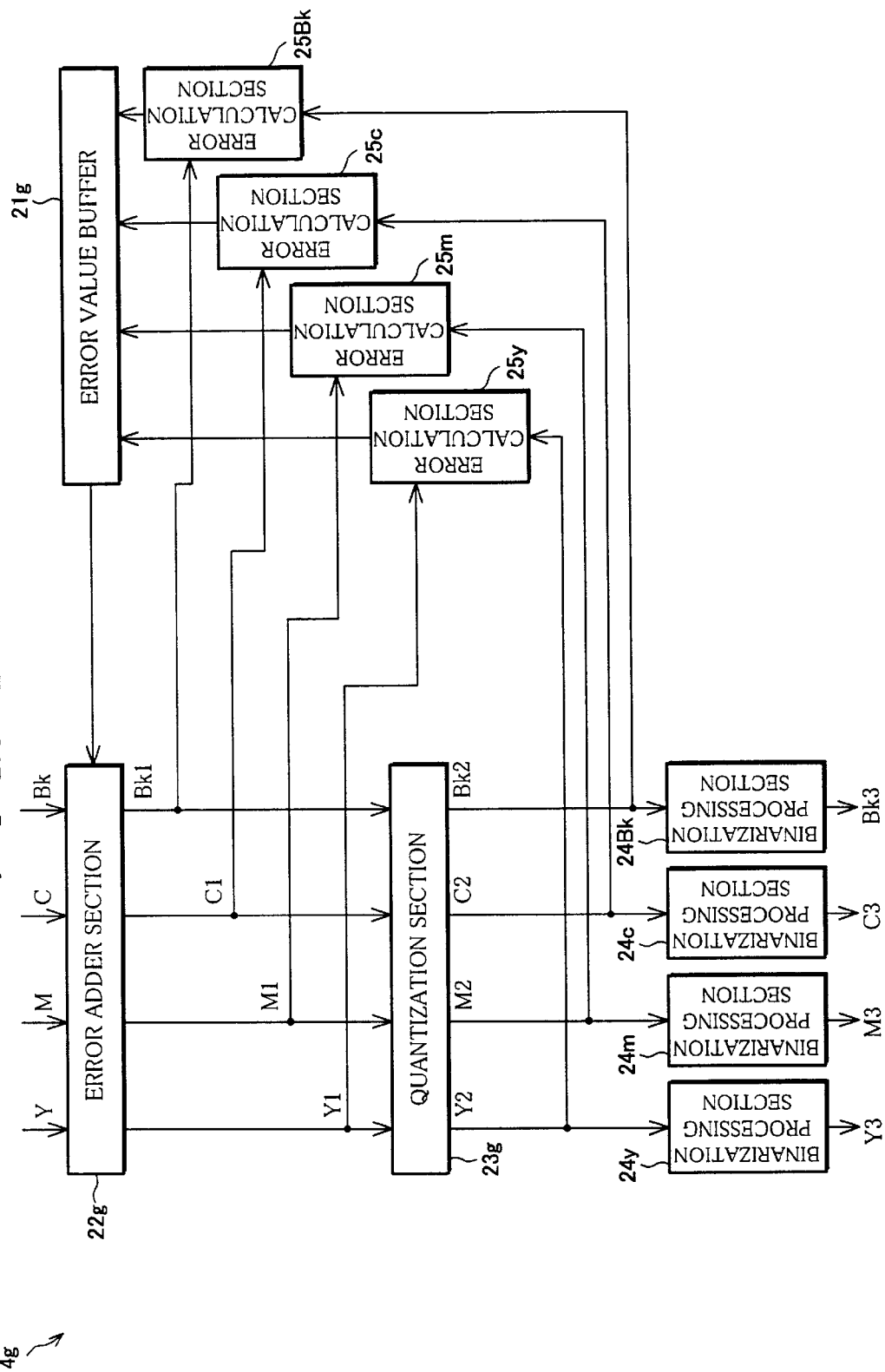
FIG. 26 is a block diagram showing an arrangement of a major part of quasi-grayscale processing section for use in an image forming device that can form Bk dots in relation to another embodiment in accordance with the present invention.

An image forming device 1g of the present embodiment incorporates the arrangement as detailed in the first embodiment, and additionally includes a dot formation section 3Bk capable of forming dots as shown in broken lines in FIG. 2 and FIG. 3. A pre-process section 5g, for example, receives input image data after a saturated black generation process and outputs multitone CMY Bk data for four channels including a Bk channel. A quasi-grayscale processing section 4g includes, as shown in FIG. 26, a binarization processing section 24Bk and an error calculation section 25Bk for outputting multi-value data Bk3 for the Bk channel similarly to the CMY channels. The remaining members 21 to 23 are also arranged so as to be capable of processing the Bk channel.

Figure 27:
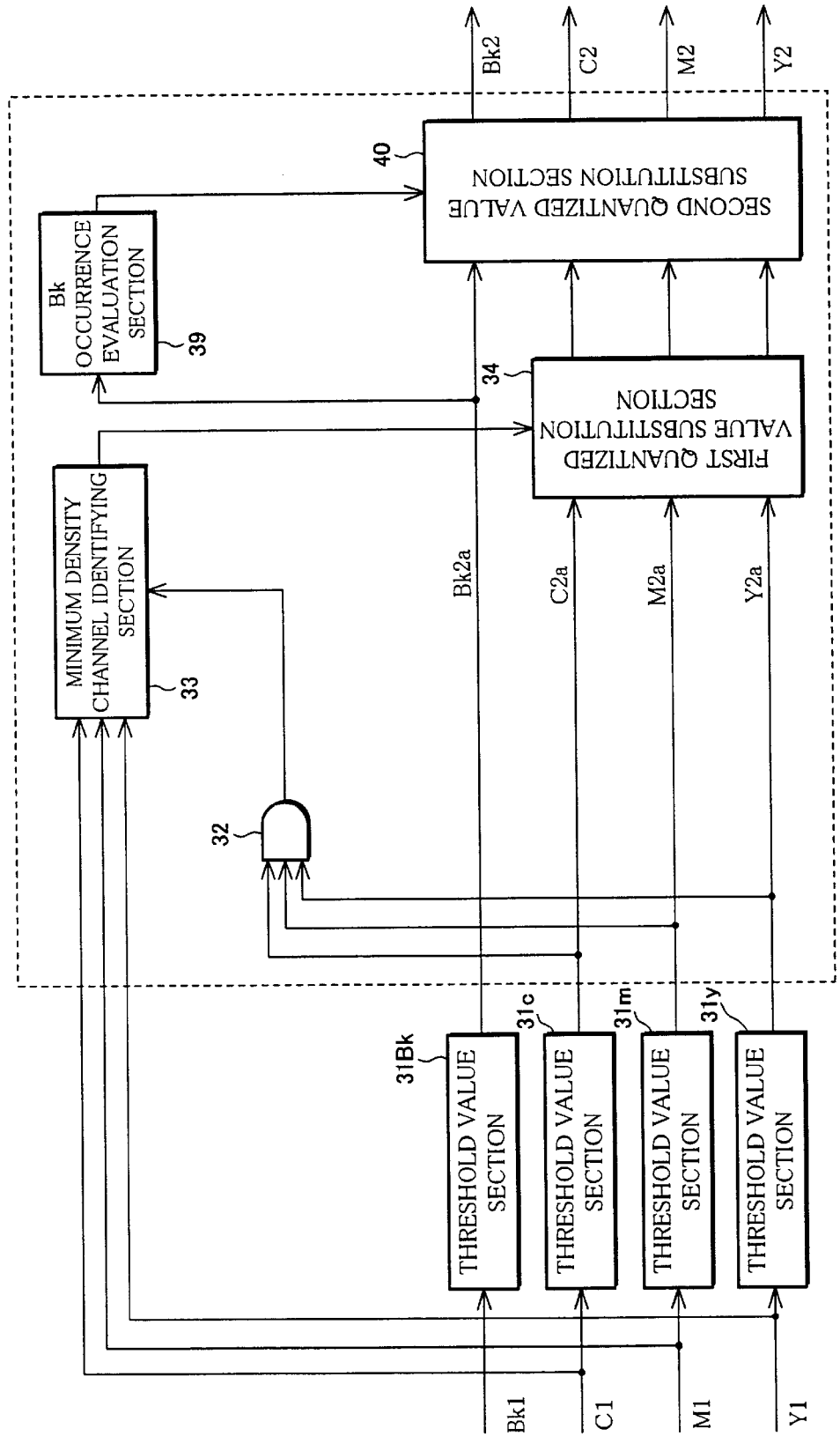
FIG. 27 is a block diagram showing a quantization section in the quasi-grayscale processing section.

Specifically, the quantization section 23g of the present embodiment, as shown in FIG. 27, includes the arrangement of FIG. 1 and additionally includes a threshold value section 31*bk* for comparing a corrected value Bk1 with a predetermined threshold value and outputting a quantized value Bk2*a* to the Bk channel. The quantization section 23*g* further includes: a Bk occurrence evaluation section 39 for determining whether or not the output Bk2*a* from threshold value section 31*bk* carries an instruction to form a Bk dot; and a second quantized value substitution section (output data adjusting means) 40 for, if the instruction is such that a Bk dot be formed, adjusting the quantized values C2, M2, and Y2 for the remaining CMY channels to a predetermined value (for example, "0") that stipulates no dot formation.

Figure 28:
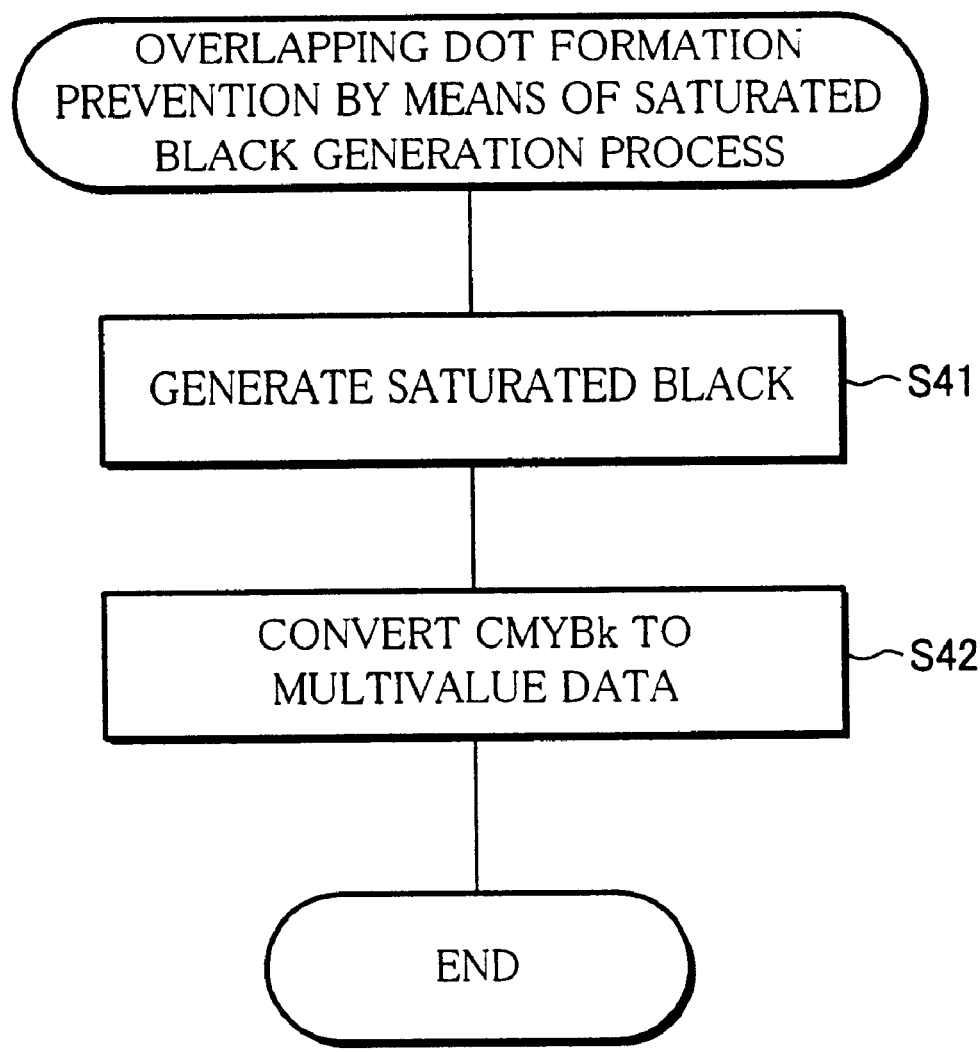
FIG. 28 is a flow chart showing a saturated black generation process of the image forming device.

In the foregoing arrangement, upon receiving image data, the pre-process section 5*g* performs a process (saturated black generation process) substituting saturated black for gray components of the image data in S41 shown in FIG. 28, and outputs multitone CMYBk data for four channels including the Bk channel in S42. A saturated black generation process typically used is, for example, a process to remove common gray components from the color density signals $[D_R, D_G, D_B]^t$ of image data (UCR: under color removal). Hence, balance is adjusted between zero-saturation colors and saturated colors.

Figure 29:
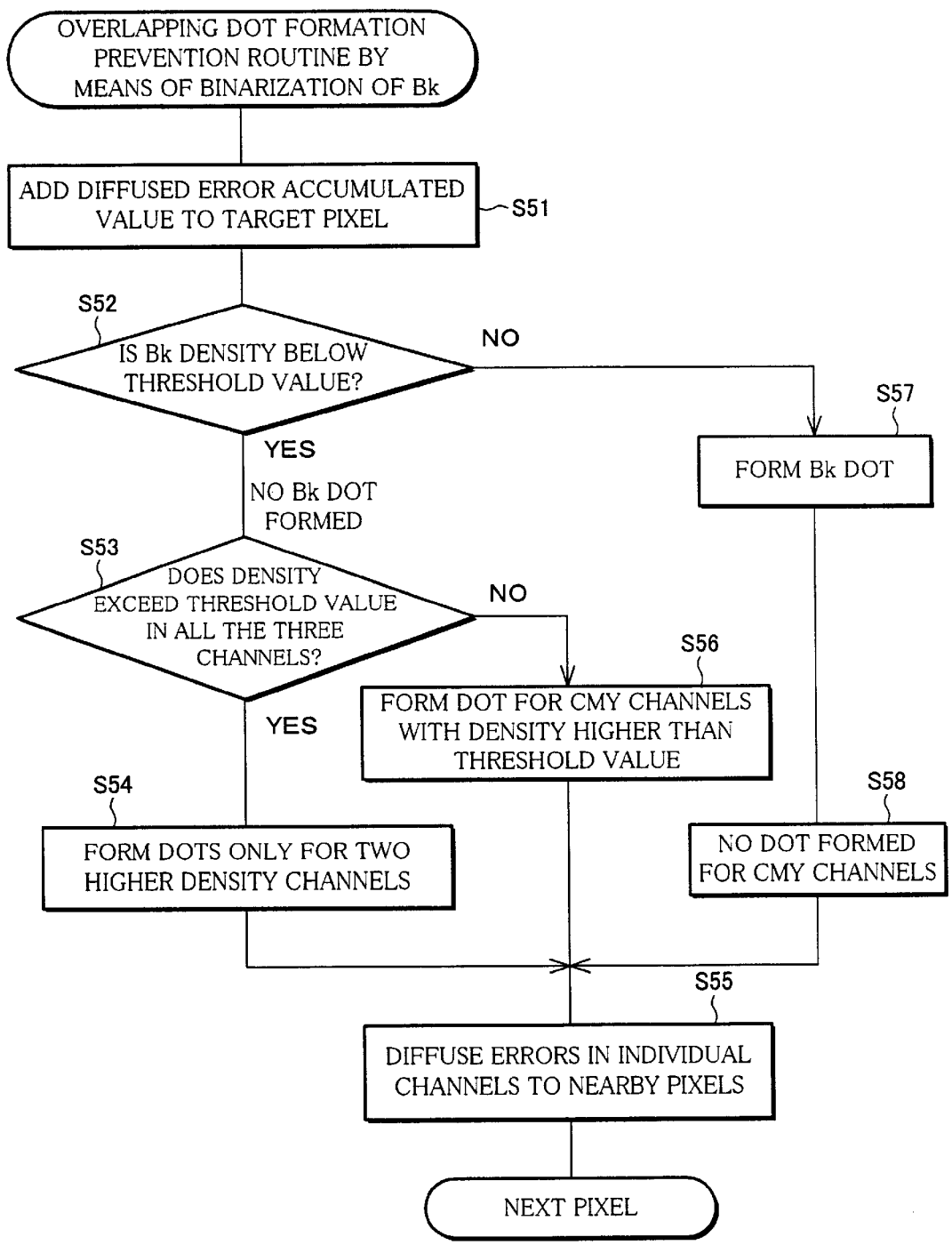
FIG. 29 is a flow chart showing an operation of the quasi-grayscale processing section.

As the pre-process section 5*g* outputs the multitone CMYBk data, the quasi-grayscale processing section 4*g* performs a quasi-grayscale process in S51 to S55 shown in FIG. 29 to output four-channel multi-value data C3, M3, Y3, and Bk3. Specifically, in S51, the error adder section 22*g* of FIG. 26 adds the diffusion error accumulated value of a target pixel as a result of the quasi-grayscale process so far to each of the channels C, M, Y, and Bk by referring to the error value buffer 21*g*, so as to generate corrected values C1, M1, Y1, and Bk1, similarly to S1 of FIG. 6. In S52, the Bk occurrence evaluation section 39 of FIG. 27 determines whether or not the corrected value Bk1 represents dot formation, i.e., whether or not the corrected value Bk1 has a density exceeding a predetermined threshold value, according to the output Bk2*a* from the threshold value section 31*bk*.

If the output Bk2*a* does not represent Bk dot formation, ("YES" path selected in S52), the Bk occurrence evaluation section 39 does not instruct the second quantized value substitution section 40 to replace a quantized value; the second quantized value substitution section 40 passes on the outputs C2*b*, M2*b*, and Y2*b* from the first quantized value substitution section 34 and the output Bk2*a* from the threshold value section 31*bk* as quantized values C2, M2, Y2, and Bk2. When this is the case, the quantization section 23*g*, carrying out S53, S54, and S56 which are similar to S2, S3, and S5 shown in FIG. 6, adjusts the outputs C2, M2, and Y2 from the quantization section 23*g* so as to send instructions to form dots for the two channels with higher densities when the quantized values C2*a*, M2*a*, and Y2*a* represent instructions to form overlapping CMY dots.

Conversely, if the output Bk2*a* represents an instruction for Bk dot formation ("NO" path selected in S52), the Bk occurrence evaluation section 39 instructs the second quantized value substitution section 40 to replace a quantized value. When this is the case, regardless of the outputs C2*b*, M2*b*, and Y2*b* from the first quantized value substitution section 34, the second quantized value substitution section 40 outputs quantized values C2, M2, and Y2 of predetermined values (for example, "0") which represent no dot formation (S58). In this case, the second quantized value substitution section 40 passes on the output Bk2*a* of the threshold value section 31*bk* as the quantized value Bk2 for the Bk channel. Hence, the instruction from the quasi-grayscale processing section 4*g* to the color printer section 2*g* includes nothing but Bk dot formation (S57).

As the quantization section 23*g* outputs the quantized values C2, M2, and Y2 regardless whether or not a Bk dot is to be formed, the error calculation sections 25*c*, 25*m*, 25*y*, and 25*bk* calculate errors in the corrected values C1, M1, Y1, and Bk1 and the quantized values C2, M2, Y2, and Bk2 similarly to S4 of FIG. 6 to diffuse errors to nearby pixels (S55).

S51 to S58 are repeated for every target pixel so that the image forming device 1*g* can print an image according to an input image data that has been subjected to a quasi-grayscale process.

Figure 48:
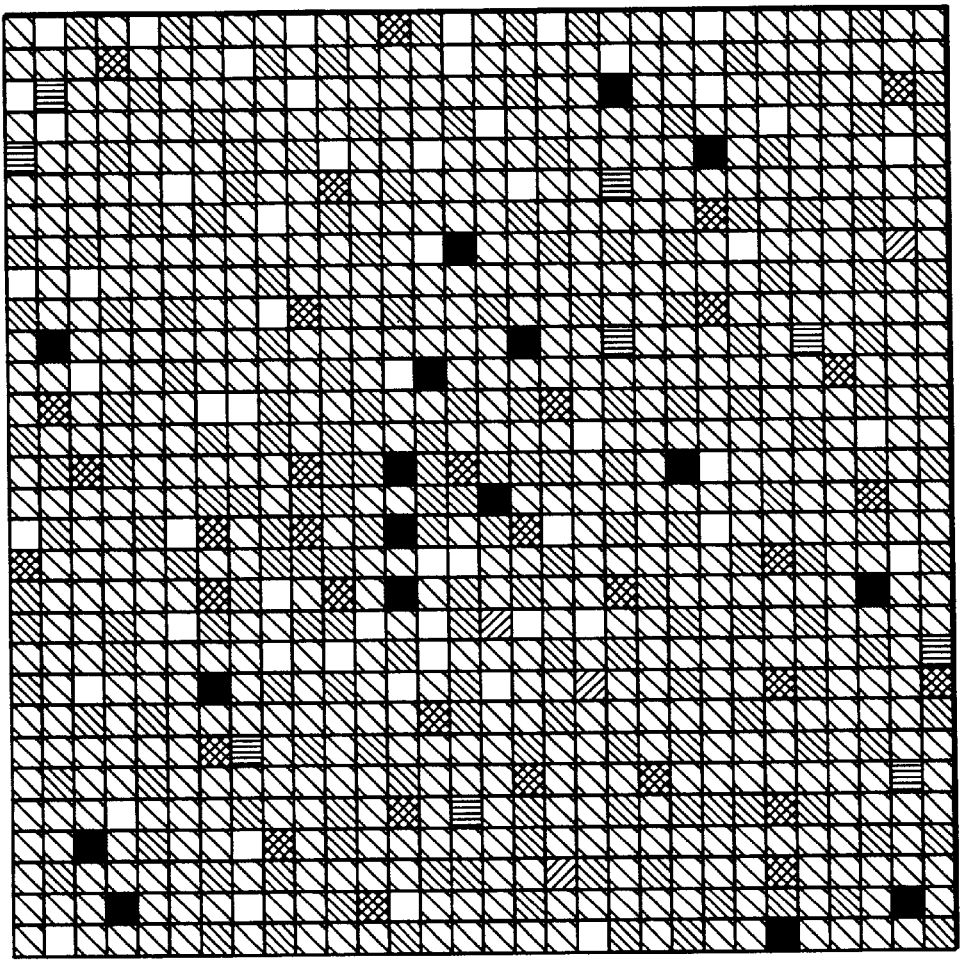
FIG. 48 is an explanatory drawing showing an image output printed by an image forming device of conventional technology.

According to the foregoing arrangement, in an area where the Bk channel does not instruct Bk dot formation, as shown in FIG. 7, FIG. 48, and Table 1, similarly to the first embodiment, dark blotches are eliminated from an output image, saturation is improved, and the channels have a good dot balance.

If the Bk channel instructs Bk dot formation, when a Bk dot is formed overlapping a dot of another color-saturated channel, despite that a dot is already formed for the color-saturated channel, the dot appears being rid of saturated components on an output image. When this is the case, since the quantization section has sent an instruction to form a dot for the color-saturated channel, an error diffusion process is carried out assuming that the dot will appear including saturated components on an output image. Therefore, it is likely that the quantization section 23*g* fails to correct for a decrease of saturated components and causes the output image to have a reduced saturation.

Nevertheless, in the image forming device 1*g* of the present embodiment, if an instruction is issued to form a Bk dot for the Bk channel, the Bk occurrence evaluation section 39 and the second quantized value substitution section 40 interrupts instructions for dot formation for the CMY channels; therefore, the saturated components do not decrease. As a result, although the color printer section 2*g* is able to form a Bk dot, and image quality, such as uniform black spots, improves compared to a case where only CMY dots are formed, an output image has a higher saturation. Further, since there occurs no redundant, overlapping dot formation, consumption of ink and toner can be reduced.

In the foregoing, although the Bk channel was created by a saturated black generation method, there are alternative methods to create a Bk channel. Further, in an arrangement for the color printer section 2*g* to form dots using ink, pigments and dyes are used to form dots. However, considering properties of dyes and pigments, sometimes it is better to form Bk dots overlapping dots for cyan or other channels for quick drying even when only a Bk dot is to be formed. In such a case, a value representing dot formation should be substituted for multi-value cyan data C3, for example, by controlling multi-value data and a quantized value when multi-value data Bk3 represents dot formation.

[Embodiment 9]

Figure 30:
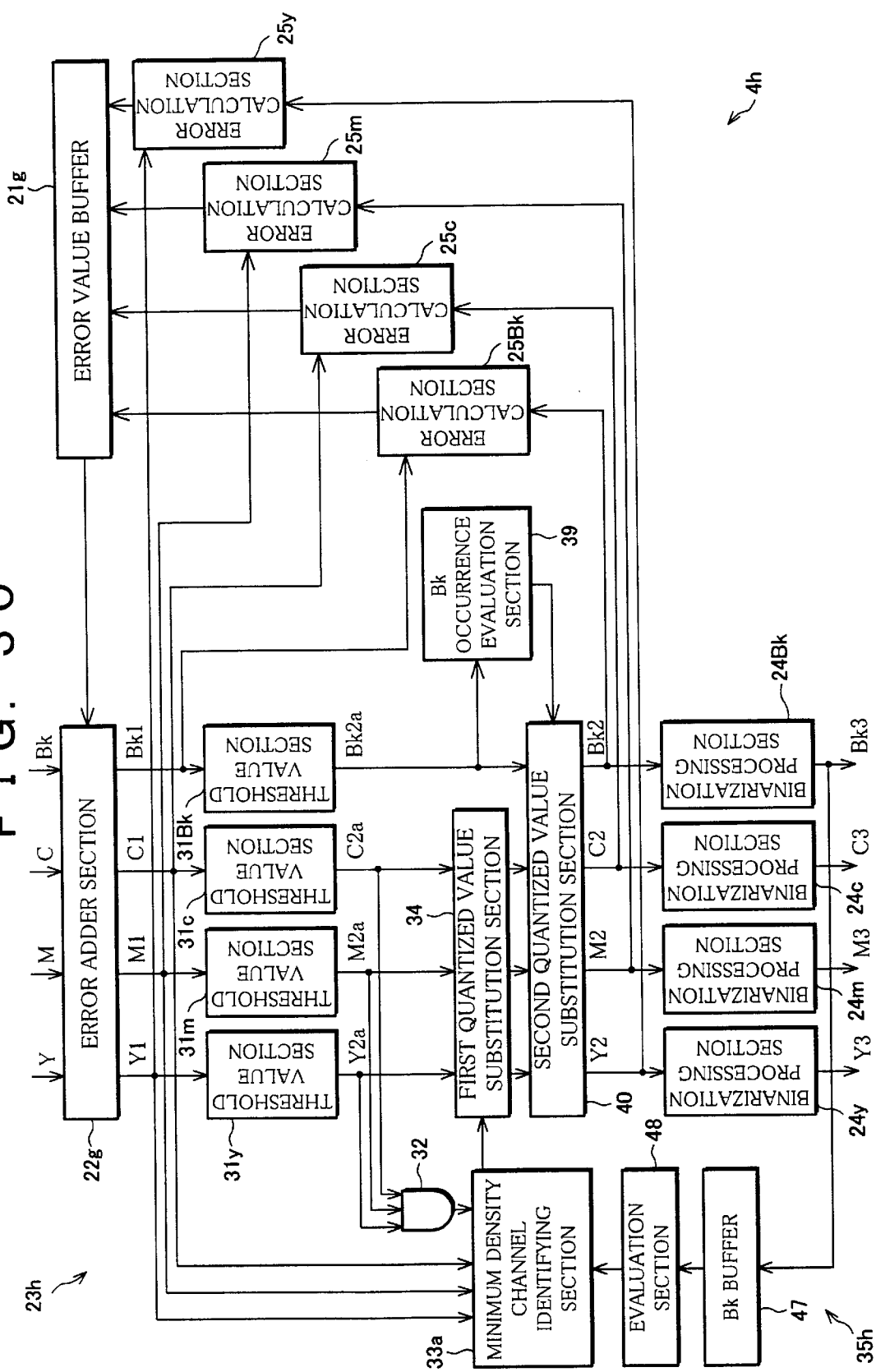
FIG. 30 is a block diagram showing a quasi-grayscale processing section including a Bk buffer in relation to another embodiment in accordance with the present invention.

In an image forming device that is capable of forming Bk dots, an overlapping dot formation requirement evaluation section may evaluate based on whether or not a Bk dot is formed in proximity, as an alternative evaluation method. In the present embodiment, as shown in FIG. 30, an overlapping dot formation requirement evaluation section 35*h* in a quasi-grayscale processing section 4*h* includes: a Bk buffer 47 for storing an output Bk3 from a binarization processing section 24Bk regarding pixels located in proximity to a target pixel, for example, pixels adjoining to a target pixel, among those pixels already subjected to a quasi-grayscale process; and a evaluation section 48 for preventing a substitute instruction to be transmitted from a minimum density channel identifying section 33a to a first quantized value substitution section 34 by referring to the Bk buffer 47 when a Bk dot has been formed in proximity to a target pixel. The Bk buffer 47 and the evaluation section 48 correspond to the evaluation means recited in claims.

Figure 31:
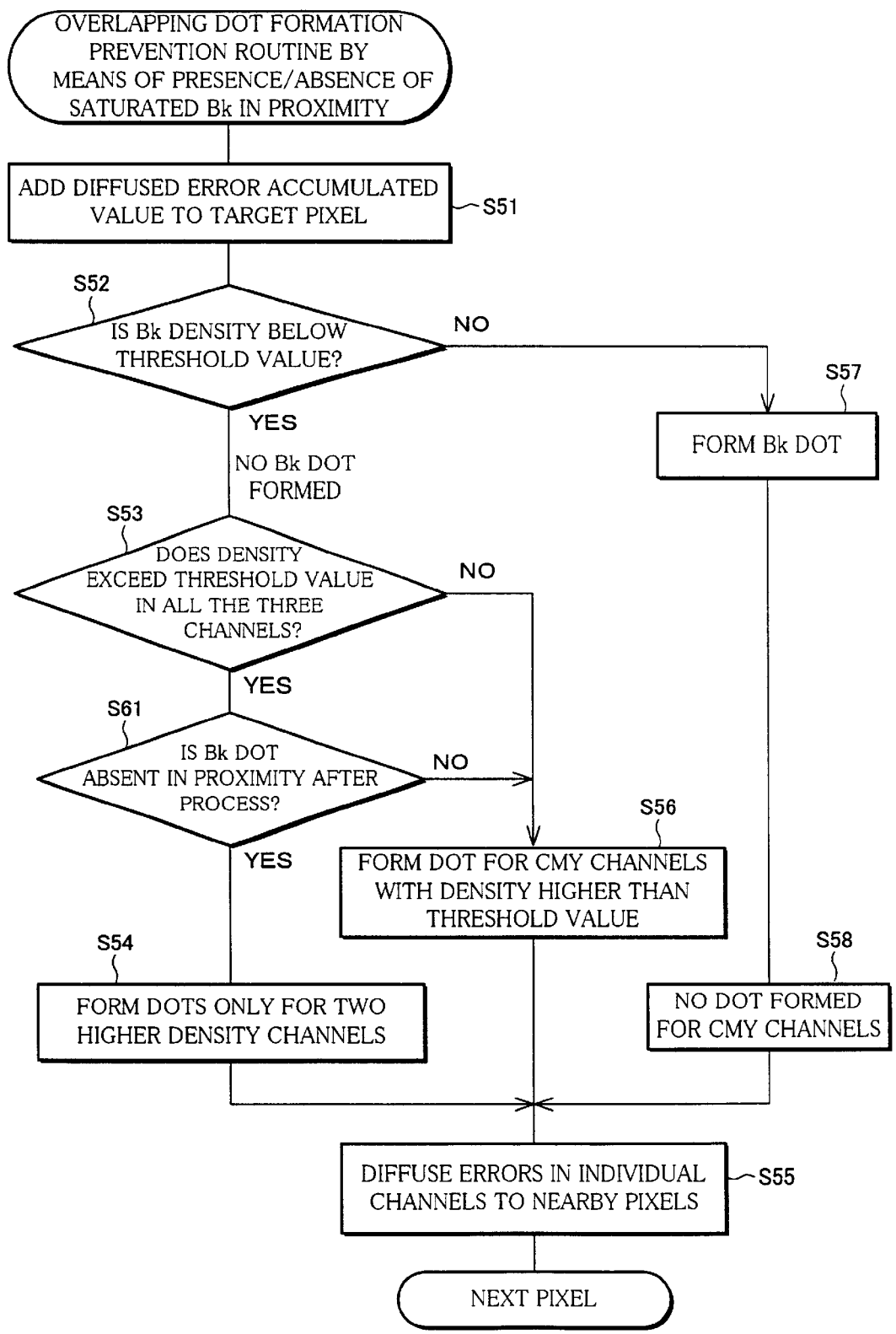
FIG. 31 is a flow chart showing an operation of the quasi-grayscale processing section.

According to the arrangement, as shown in FIG. 31, multitone CMY data is subjected to a quasi-grayscale process by substantially the same steps as those shown in FIG. 29 to output multi-value data C3, M3, Y3, and Bk3. It should be noted in the present embodiment, however, that S61 is interposed between S52 and S53 and also that if a Bk dot is formed in proximity to a target pixel ("NO" path selected in S22), the overlapping dot formation requirement evaluation section 35h sends an instruction to the minimum density channel identifying section 33a so as to prevent a substitute instruction from being transmitted to the first quantized value substitution section 34. As a result, S56 is carried out to form a dot for a channel with a density higher than the threshold value in the same manner as in a case where no overlapping dot formation is detected for the three CMY channels.

According to the arrangement, the overlapping dot formation requirement evaluation section 37h evaluates the need to perform an overlapping dot formation prevention process according to whether or not a target pixel is in proximity to a Bk dot. Therefore, a dot is formed on top of another dot as necessary in proximity to a Bk dot, i.e., around a place where a black spot is supposedly printed. Conversely, supposedly, a black spot should not be formed in an area located a distance away from a Bk dot; however, in that area, an instruction is regarded as being issued unnecessarily to form overlapping dots as a result of a quasi-grayscale process, and the overlapping dot formation is interrupted. As a result, only those black spots undesirably formed by a quasi-grayscale process can be removed.

In the embodiment above, adjoining pixels were taken as an example of proximity to a target pixel; alternatively, the Bk buffer 47 may store multi-value data Bk3 of a pixel not directly adjacent to a target pixel. When this is the case, the evaluation section 48 may evaluate the need to perform an overlapping dot formation prevention process based on a calculation involving a weight factor according to the distance from a target pixel. Hence, the need to perform an overlapping dot formation prevention process can be evaluated more accurately. However, if the pixel area involved in evaluation expands, the Bk buffer 47 needs to have an increased storage capacity. Therefore, the size of a pixel area involved is specified to cover pixels so that a good balance is obtained between these two factors (for example, pixels directly adjoining to a target pixel).

[Embodiment 10]

When three dots are formed overlapping one another for the CMY channels as detailed in the second to seventh and ninth embodiments, and in addition, the color printer section is capable of forming a Bk dot as detailed in the eighth and ninth embodiments, the overlapping dot formation process may be replaced by a Bk dot formation process.

Figure 32:
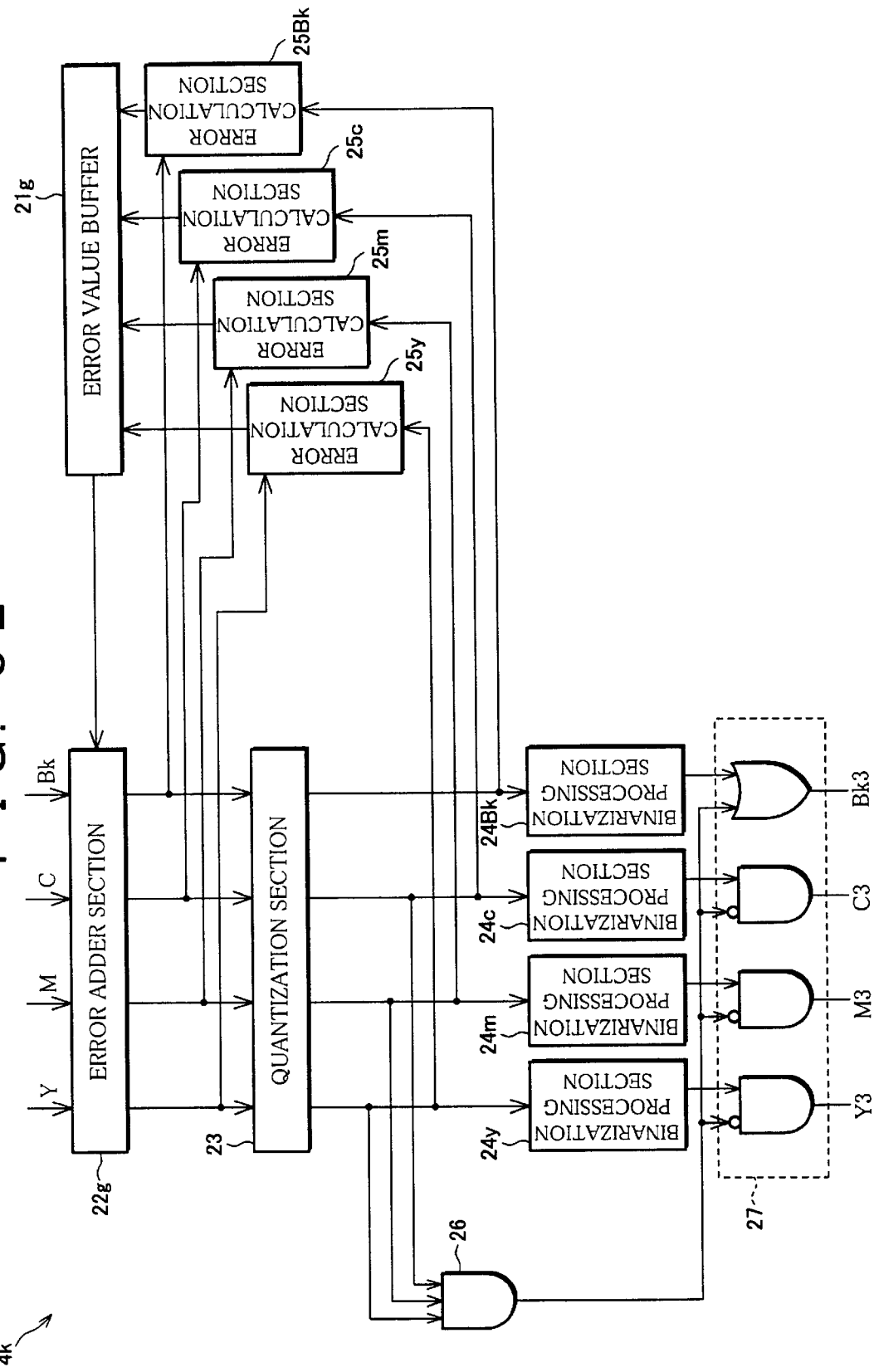
FIG. 32 is a block diagram showing a quasi-grayscale processing section including a Bk dot substitution section in relation to another embodiment in accordance with the present invention.

Specifically, a quasi-grayscale processing section 4k of the present embodiment, as shown in FIG. 32, includes: an overlapping CMY dot formation detector section 26 for evaluating the overlapping dot formation for three CMY channels according to the outputs C2, M2, and Y2 from a quantization section 23; and a Bk dot substitution section (dot substitution means) 27 controlling the outputs C3, M3, Y3, and Bk3 from binarization processing sections 24c, 24m, 24y, and 24Bk in response to an instruction from the overlapping CMY dot formation detector section 26. Thereby, if the quantization section 23 instructs to form overlapping dots, an overlapping dot formation instruction for the three CMY channels can be replaced by a Bk dot formation instruction.

In the present embodiment, as mentioned in the foregoing, for example, the quantized values C2, M2, and Y2 are binary and set to either "0" or "255", whilst the multi-value data C3, M3, Y3, and Bk3 are set to either "0" representing non-dot formation or "1" representing dot formation. Therefore, for example, the overlapping CMY dot formation detector section 26 is constituted as an AND circuit for outputting AND of MSBs of the quantized values C2, M2, and Y2. The Bk dot substitution section 27 is constituted by three logic circuits for computing AND of corresponding multi-value data among the multi-value data C3, M3, and Y3 between NOT of the AND circuit output, and an OR circuit for computing a logical OR between the output from the AND circuit and the multi-value data Bk3.

Figure 33:
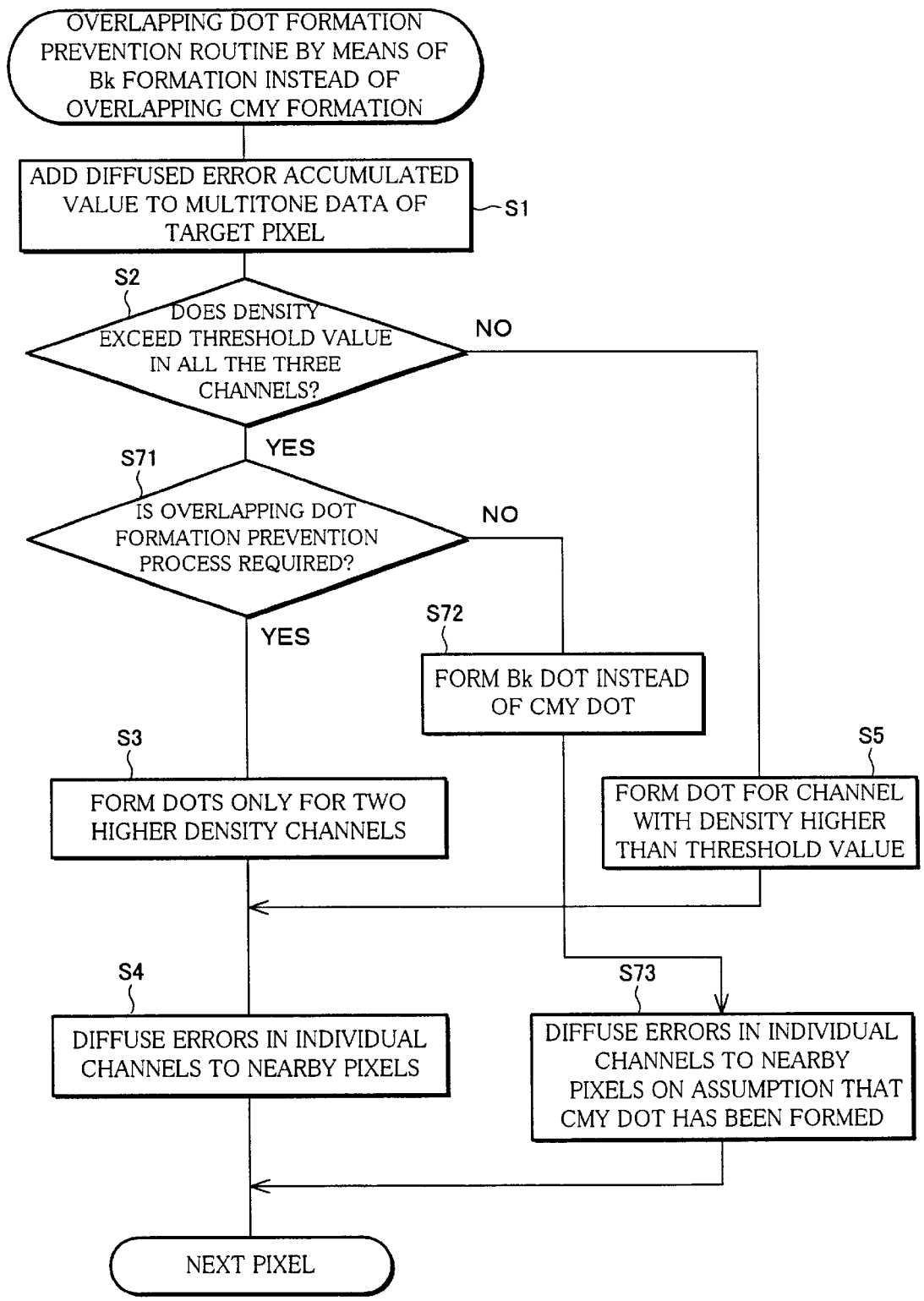
FIG. 33 is a flow chart showing an operation of the quasi-grayscale processing section.

In the arrangement, as shown in FIG. 33, multitone CMY data is subjected to a quasi-grayscale process by substantially the same steps as those shown in FIG. 6 to output multi-value data C3, M3, Y3, and Bk3. It should be noted in the present embodiment, however, that S71 is interposed between S2 and S3 and also that if it is determined that no overlapping dot formation prevention process is required and the quantization section 23 has issued an instruction for overlapping dot formation ("NO" path selected in S71), the overlapping CMY dot formation detector section 26 sends an instruction for the Bk dot substitution section 27 to substitute a Bk dot. Hence, the quasi-grayscale processing section 4k sends an instruction to the color printer section 2g so as to form only a Bk dot, and only that Bk dot is actually formed (S72). Further, in the present embodiment, since the error calculation sections 25c, 25m, 25y, and 25Bk calculates errors based on the quantized values C2, M2, Y2, and Bk2, the quasi-grayscale processing section 4k diffuses errors to nearby pixels assuming that the CMY dots have been formed (S73), and then a quasi-grayscale process is performed on a next pixel. S71 corresponds to the steps to evaluate the need to perform an overlapping dot formation prevention process, more specifically, S11 to S13, S21, S22, S31, S61 in the second to seventh and ninth embodiment. If "NO" path is taken in these steps, the overlapping dot formation step (S5, S56) is replaced by S72 and S73.

In the arrangement, the Bk dot substitution section 27 substitutes Bk dot formation with the overlapping dot formation for the three CMY channels. Therefore, unlike a case where dots are formed overlapping one another for the three channels, a spot is formed in a uniform black color. As a result, the image forming device 1k can output a clearer image. Further, since there occurs no redundant, overlapping dot formation, consumption of ink and toner can be reduced.

In addition, since errors do not result from nonuniform color, errors that are not under control of the quasi-grayscale processing section 4k can be reduced. As a result, it is ensured that the quasi-grayscale processing section 4k corrects errors and the image forming device 1k outputs an image faithfully to an input image.

In the arrangement of FIG. 32, the error calculation sections 25c, 25m, 25y, and 25Bk calculate errors that occur prior to a Bk dot substitution, that is, the outputs C2, M2, Y2, and Bk2 from the quantization section 23 and errors in the corrected values C1, M1, Y1, and Bk1. Alternatively, errors occurring after a Bk dot substitution, that is, errors in the output from the Bk dot substitution section 27 and in the corrected values C1, M1, Y1, and Bk1, may be calculated to produce substantially the same results.

[Embodiment 11]

In the first to tenth embodiments, an overlapping dot formation prevention process was performed when dots are to be formed on top of one another at the same position for the three CMY channels. By contrast, in the following embodiment, an overlapping dot formation prevention process is performed when at least two dots are formed in high brightness on top of each other at the same position for the respective channels, as an alternative method to prevent the occurrence of dark blotches and decrease in saturation due to a quasi-grayscale process. This arrangement is capable of preventing undesired overlapping dot formation due to a quasi-grayscale process, and therefore preventing a resulting image from being tarnished with dark blotches and appearing less saturated.

Figure 34:
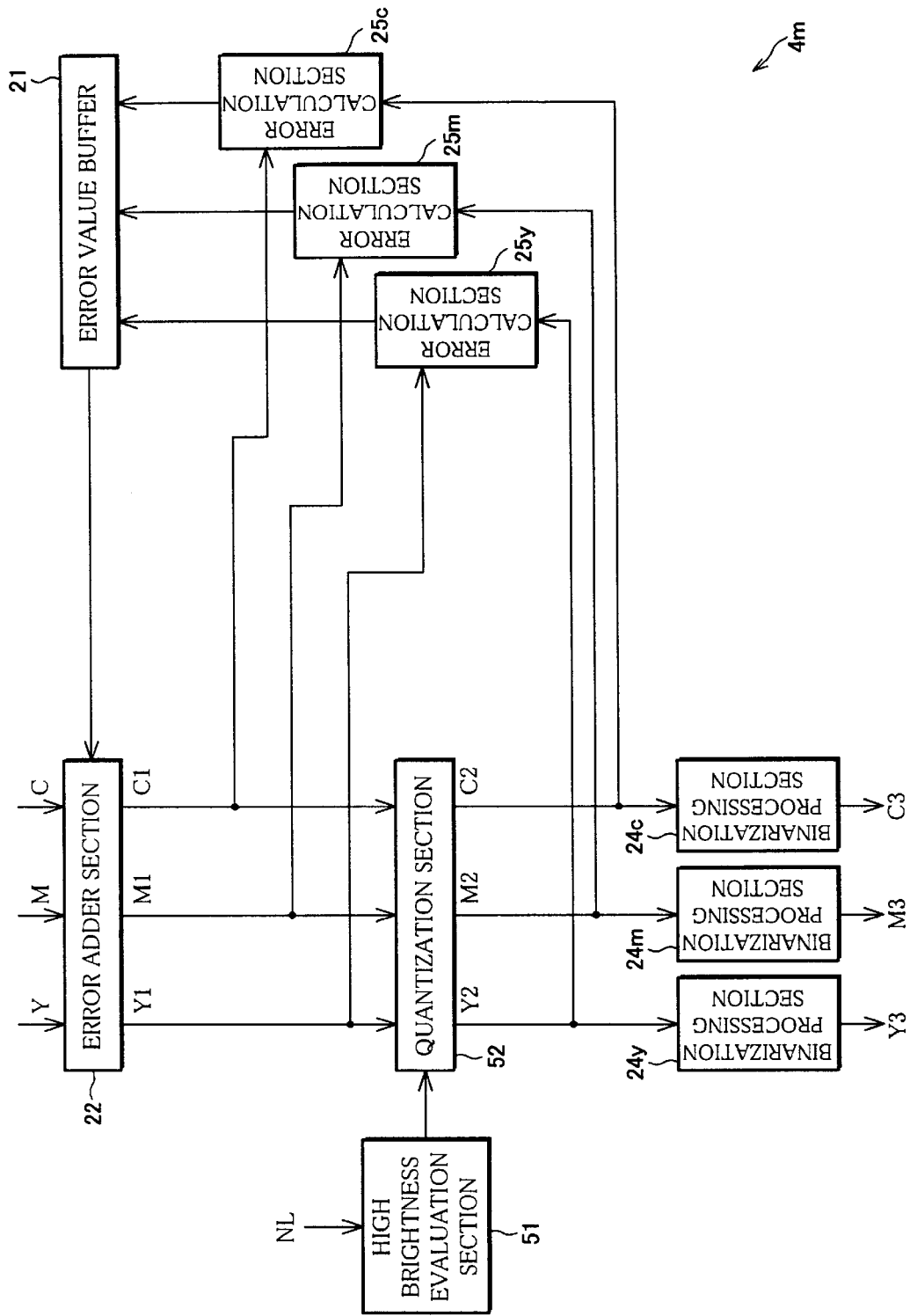
FIG. 34 is a block diagram showing an arrangement of a major part of a quasi-grayscale processing section in relation to another embodiment in accordance with the present invention.

Specifically, a quasi-grayscale processing section $4m$ of the present embodiment, for example, as shown in FIG. 34, is similar to the quasi-grayscale processing section 4 depicted in FIG. 5, but includes, in place of the quantization section 23, a high brightness evaluation section (brightness evaluation means) 51 for determining the brightness of a target pixel, and a quantization section 52 for quantizing the outputs C1, M1, and Y1 from the error adder section 22 and as well as adjusting the quantized values C2, M2, and Y2 to instruct for a dot to be formed for only one channel when the brightness is high.

The high brightness evaluation section 51 includes an arrangement substantially identical to that of the brightness evaluation section 41 of FIG. 9, and is capable of determining whether or not the brightness exceeds a predetermined brightness threshold value. The brightness threshold value may be fixed. However, the brightness threshold value is preferably varied at random below and above a predetermined reference value so as to prevent a boundary from developing around an output image, similarly to the second embodiment.

Figure 35:
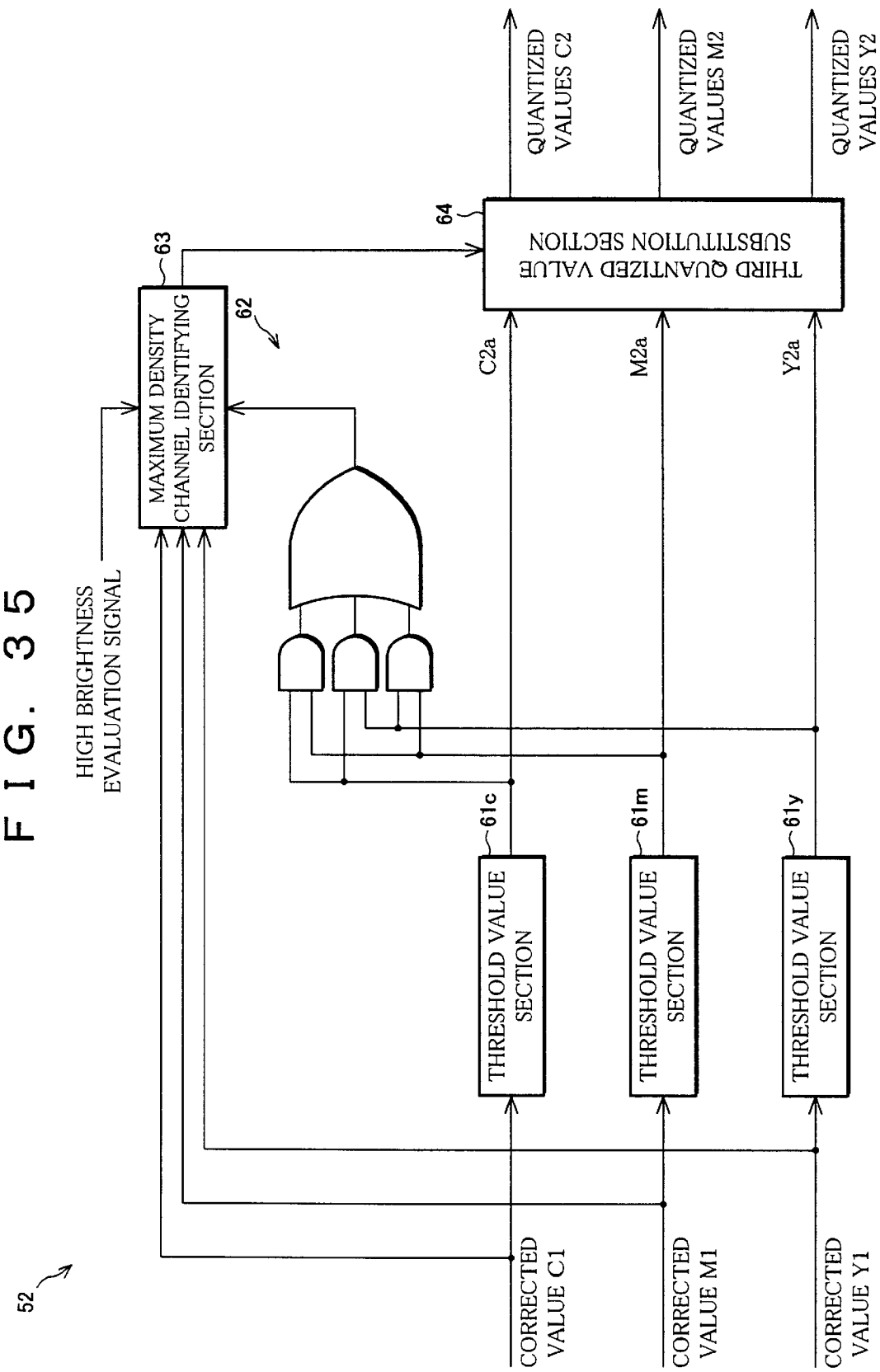
FIG. 35 is a block diagram showing a quantization section in the quasi-grayscale processing section.

The quantization section 52, as shown in FIG. 35, includes: threshold value sections (first comparison means) $61c$, $61m$, and $61y$ which are similar to the threshold value sections $31c$, $31m$, and $31y$ respectively shown in FIG. 1; an overlapping dot formation detector section 62 for detecting overlapping dot formation for at least two channels based on the outputs $C2a$, $M2a$, and $Y2a$ from the threshold value sections $61c$, $61m$, and $61y$; a maximum density channel identifying section (dark blotch prevention means) 63 for, upon detection of overlapping dot formation, comparing the corrected data C1, M1, and Y1 to identify the channel with the maximum density and instruct only dot formation for that channel; and a third quantized value substitution section 64 for adjusting the outputs $C2a$, $M2a$, and $Y2a$ according to an instruction.

In the present embodiment, the corrected values C1, M1, and Y1 are set in a range of 0 to 255 respectively as an example. The threshold values for the threshold value sections $61c$, $61m$, and $61y$ are all set to 127. The outputs $C2a$, $M2a$, and $Y2a$ is equal to "255" which is a value representative dot formation when the threshold value is exceeded, and "0" which is a value representative of non-dot formation when the threshold value is not reached. The overlapping dot formation detector section 62 is constituted by an AND circuit for computing AND of both MSBs of the outputs $C2a$ and $M2a$; an AND circuit for computing AND of both MSBs of the outputs $C2a$ and $Y2a$; an AND circuit for computing AND of both MSBs of the outputs $M2a$ and $Y2a$; and an OR circuit for computing logical OR of the AND circuits. When a high brightness evaluation signal represents high brightness and the output from an OR circuit is "true", the maximum density channel identifying section 63 instructs the maximum density channel identifying section 63 to identify the channel with a maximum density, allowing the third quantized value substitution section 64 to substitute a predetermined value (for example, "0") representative of non-dot formation for the output of those channels other than that with a maximum density.

Figure 36:
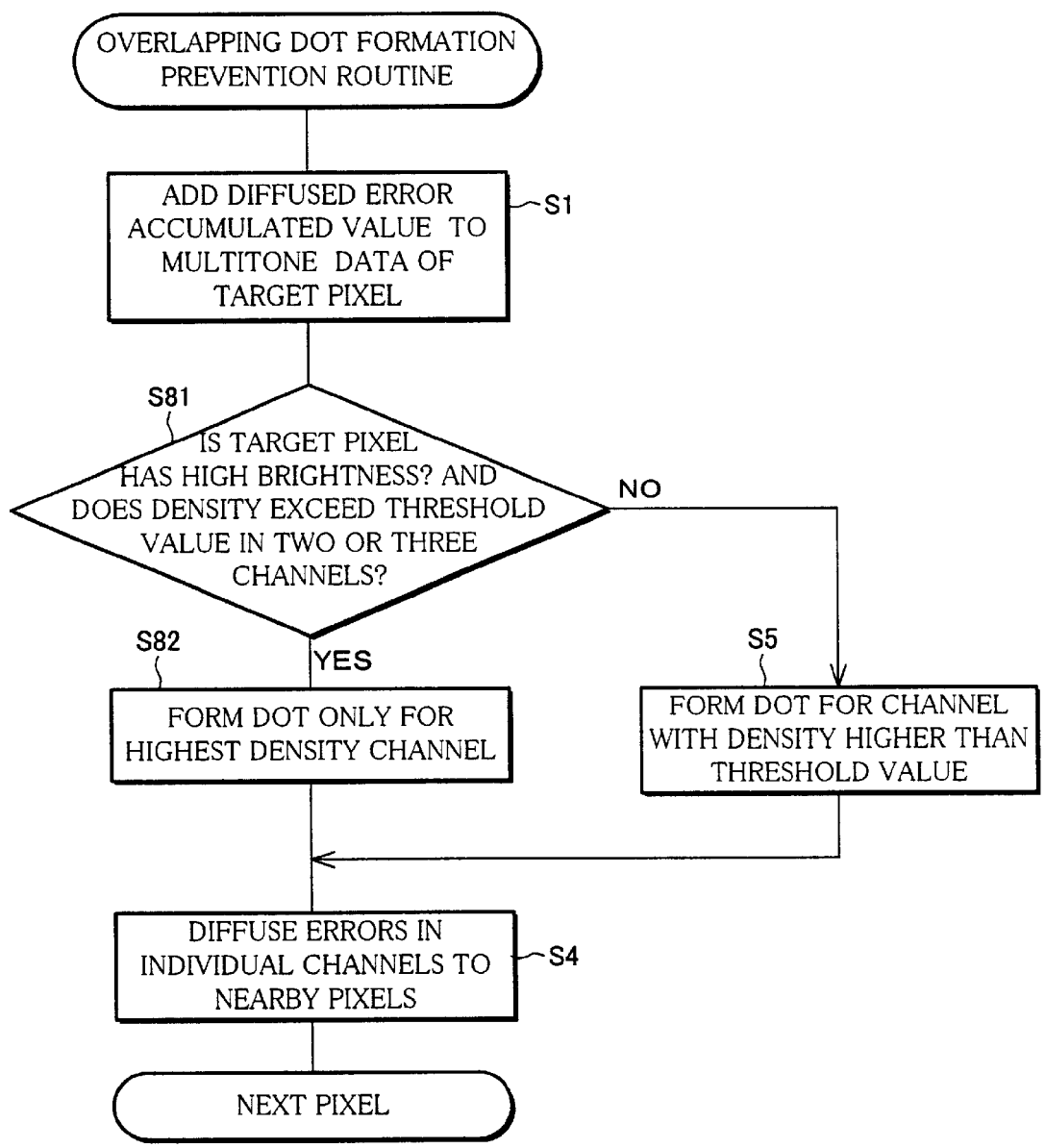
FIG. 36 is a flow chart showing an operation of the quasi-grayscale processing section.

In the foregoing arrangement, as shown in FIG. 36, multitone CMY data is subjected to a quasi-grayscale process by substantially the same steps as those shown in FIG. 6 to output multi-value data C3, M3, and Y3. It should be noted in the present embodiment, however, that S81 and S82 replace S2 and S3 and that the maximum density channel identifying section 63 sends an instruction to the third quantized value substitution section 64 to form a dot for the channel with a maximum density when two or more of the CMY channels have a density higher than a threshold and have the target pixel has a high brightness according to the high brightness evaluation signal from the high brightness evaluation section 51 and the output from the overlapping dot formation detector section 62 of FIG. 34 ("YES" path selected in S81), and the third quantized value substitution section 64, for example, adjusts the remaining channel to output the quantized values C2, M2, and Y2 that represent dot formation only for a channel with a maximum density among the outputs $C2a$, $M2a$, and $Y2a$ (S82).

Conversely, if either there occurs no overlapping dot formation or the brightness is low, the maximum density channel identifying section 63 does not instruct for an output replacement, and the third quantized value substitution section 64 outputs the outputs $C2a$, $M2a$, and $Y2a$ from the threshold value sections $61c$, $61m$, and $61y$ as quantized values C2, M2, and Y2 (S5).

According to the foregoing arrangement, performing a quasi-grayscale process for each channel by an error diffusion technique results in instruction for dot formation in two or more of the CMY channels, and if the brightness is high, a dot is formed only for the channel with a maximum density with the dot formation being interrupted for the remaining channels. Therefore, overlapping dot formation from a quasi-grayscale process is interrupted in an area with a high brightness in which supposedly no dots should be formed on top of each other at the same position. In such an area, formation of black spots due to overlapping dot formation for the three channels is also interrupted. As a result, the image forming device $1m$ can output an image with restrained decrease in brightness due to overlapping dot formation, less chances of occurrence of dark blotches, and restrained decrease in saturation due to overlapping CMY dot formation, while limiting errors diffused to nearby pixels to minimum.

Further, in the arrangement, the overlapping dot formation detector section 62 solely determines whether or not the quantized values $C2a$, $M2a$, and $Y2a$ need to be adjusted according to the quantized values $C2a$, $M2a$, and $Y2a$ for all the channels. Therefore, the channels will have a good dot balance unlike, for example, the conventional arrangement disclosed in Japanese Laid-Open Patent Application No. 10-81026/1998 (Tokukaihei 10-81026; published on Mar. 31, 1998), i.e., the need to form a dot is evaluated in a sequence of Bk, C, M, and Y channels.

[Embodiment 12]

Figure 37:
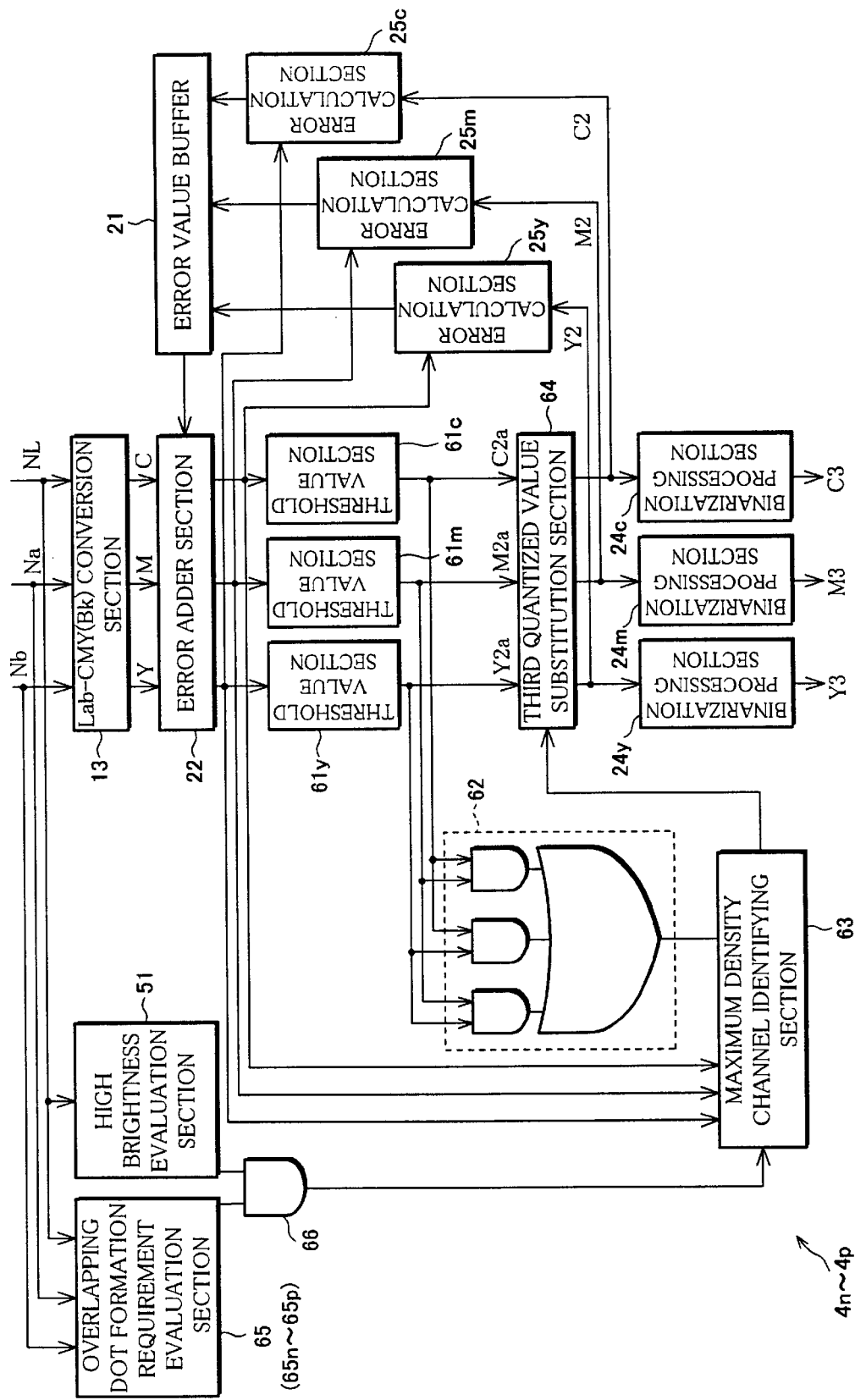
FIG. 37 is a block diagram showing a quasi-grayscale processing section including an overlapping dot formation requirement evaluation section in relation to another embodiment in accordance with the present invention.
Figure 38:
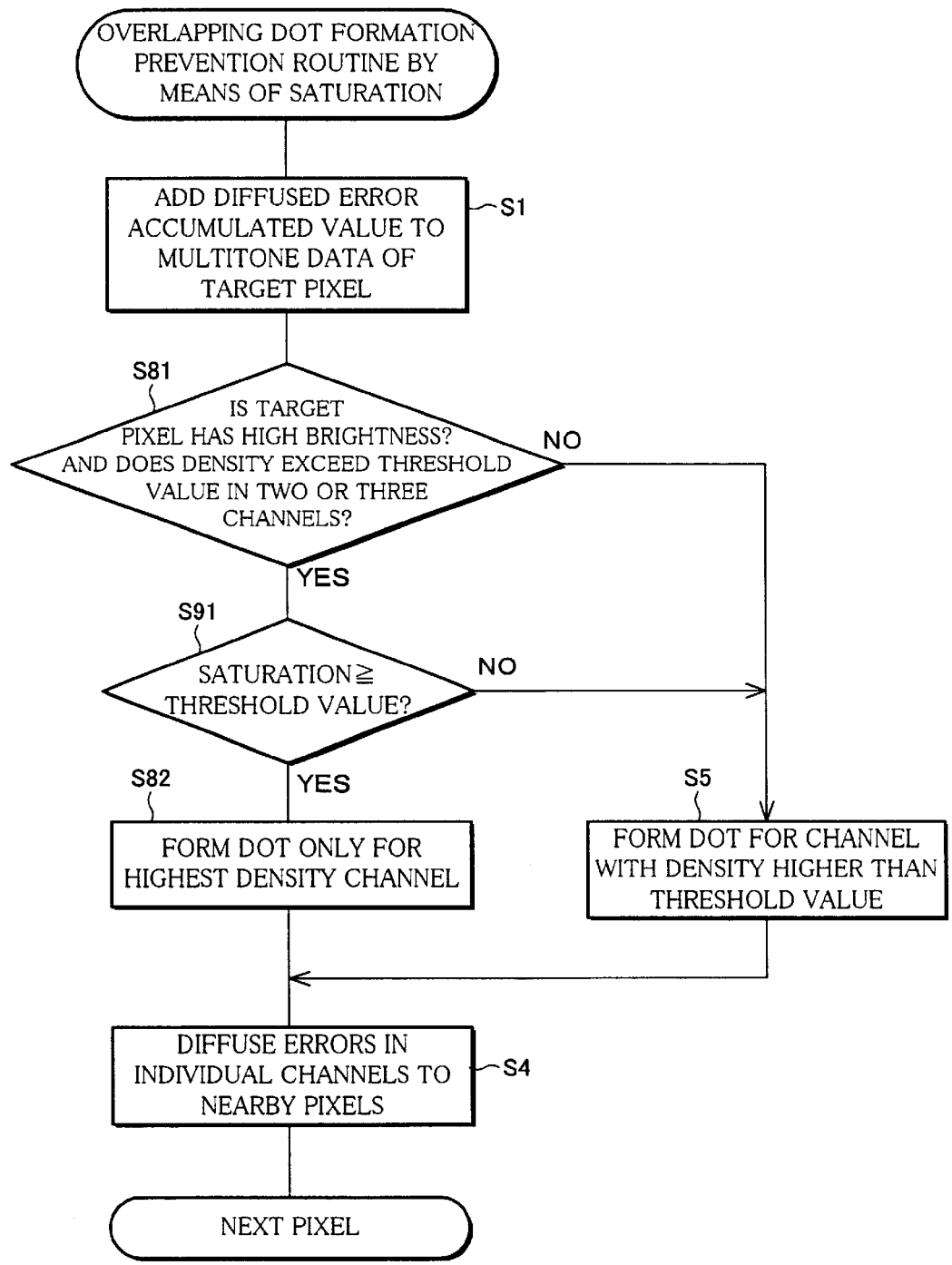
FIG. 38 is a flow chart showing an operation of a quasi-grayscale processing section including an overlapping dot formation requirement evaluation section for evaluation by means of a saturation.

Referring to FIG. 37 and FIG. 38, the description in the present embodiment will discuss a case where the need to perform an overlapping dot formation prevention process as introduced in the eleventh embodiment is evaluated according to saturation as in the third embodiment. A quasi-grayscale processing section 4n of the present embodiment, as shown in FIG. 37, includes the arrangements of FIG. 34 and FIG. 35, and further includes an overlapping dot formation requirement evaluation section (saturation evaluation means) 65n for evaluating a saturation. An AND circuit 66 causes the minimum density channel identifying section 33 to output a substitute instruction to the third quantized value substitution section 64, if the high brightness evaluation section 51 determines that the brightness is high and the overlapping dot formation requirement evaluation section 65n determines that an overlapping dot formation prevention process needs to be performed.

The overlapping dot formation requirement evaluation section 65n, arranged in the same fashion as is the saturation evaluation section 42 of FIG. 14 and FIG. 15 for example, outputs "true" when the target pixel has a saturation exceeding a predetermined saturation threshold value. The saturation threshold value may be fixed. However, the saturation threshold value is preferably varied at random below and above a predetermined reference value so as to prevent a boundary from developing around an output image, similarly to the third embodiment.

In the foregoing arrangement, as shown in FIG. 38, multitone CMY data is subjected to a quasi-grayscale process by substantially the same steps as those shown in FIG. 36 to output multi-value data C3, M3, and Y3. It should be noted in the present embodiment, however, that S91 is interposed between S81 and S82 and that the overlapping dot formation requirement evaluation section 65n sends an instruction to the maximum density channel identifying section 63 via the AND circuit 66 to prevent a substitute instruction from being transmitted to the third quantized value substitution section 64 if the saturation of a target pixel prior to the execution of a quasi-grayscale process does not reach a saturation threshold value ("NO" path selected in S91). As a result, if the saturation does not reach the saturation threshold value ("NO" path selected in S91), S5 is carried out to form a dot for a channel with a density higher than the threshold value in the same manner as in a case where no overlapping dot formation is detected.

In the foregoing arrangement, the overlapping dot formation requirement evaluation section 65n evaluates the need to perform an overlapping dot formation prevention process according to the saturation of the target pixel prior to the execution of a quasi-grayscale process. As a result, dots are formed overlapping at a pixel with a low saturation (a substantially zero saturation). Therefore, a black spot can be formed by those dots formed overlapping one another for the CMY channels where there is a lack in the black component. Conversely, a black spot should not be formed at a pixel with a high saturation, such as red, even if such an instruction is issued that dots be formed overlapping one another subsequent to correction and quantization. Such a pixel is regarded as being a point where a quasi-grayscale process resulted in an instruction to unnecessarily form overlapping dots, and the overlapping dot formation is interrupted. Consequently, originally black spots are allowed to be formed, which produces the same results as the eleventh embodiment.

[Embodiment 13]

Figure 39:
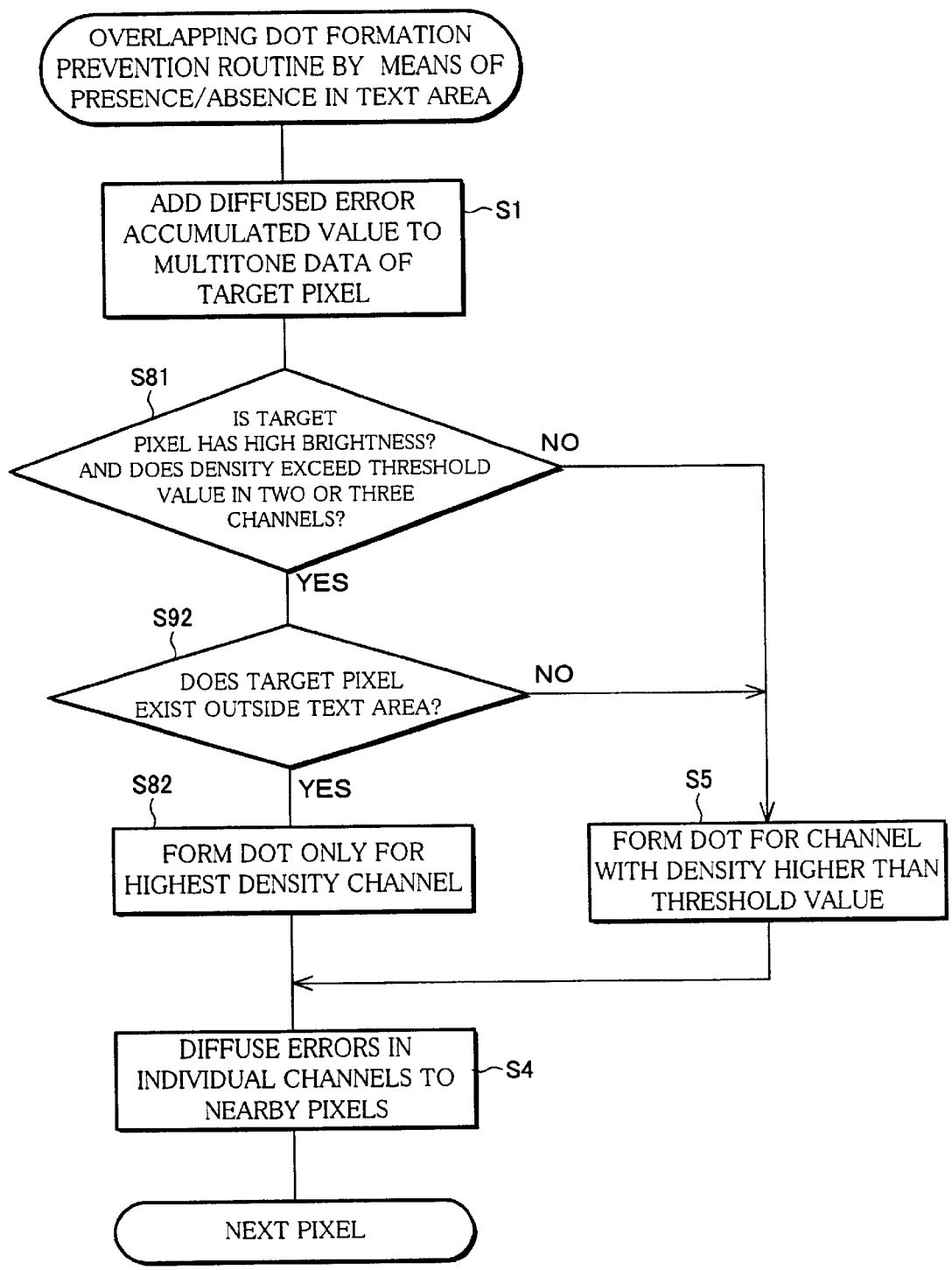
FIG. 39 is a flow chart showing an operation of a quasi-grayscale processing section including an overlapping dot formation requirement evaluation section for evaluation by means of a text area in relation to another embodiment in accordance with the present invention.

In the present embodiment, referring to FIG. 37 and FIG. 39, the description will discuss a case where the need to perform an overlapping dot formation prevention process as detailed in the eleventh embodiment is evaluated according to whether or not the target pixel exists in a text area as in the fifth embodiment. A quasi-grayscale processing section 4o of the present embodiment includes an overlapping dot formation requirement evaluation section 65o similar to the property evaluation section 44 of FIG. 20. Thus, the AND circuit 66 outputs "1" representing "true" if the target pixel has a high brightness and does not exist in a text area, and outputs a value representing "false" if the target pixel has a low brightness or exist in a text area, thereby preventing the maximum density channel identifying section 63 from sending a substitute instruction to the third quantized value substitution section 64.

In the foregoing arrangement, as shown in FIG. 39, multitone CMY data is subjected to a quasi-grayscale process by substantially the same steps as those shown in FIG. 38 to output multi-value data C3, M3, and Y3. It should be noted in the present embodiment, however, that S92 replaces S91 of FIG. 38 and that the overlapping dot formation requirement evaluation section 65o sends an instruction to the maximum density channel identifying section 63 via the AND circuit 66 to prevent a substitute instruction from being transmitted to the third quantized value substitution section 64 if the target pixel exists in a text area ("NO" path selected in S92). As a result, in a text area, S5 is carried out to form a dot for a channel with a density higher than the threshold value in the same manner as in a case where no overlapping dot formation is detected.

In the arrangement, the overlapping dot formation requirement evaluation section 65o evaluates the need to perform an overlapping dot formation prevention process according to whether or not the target pixel exists in a text area. Therefore, in a text area, black spots are formed, which prevents blurring of printed letters and characters. Conversely, overlapping dot formation is interrupted in graphics and other non-text areas in the same manner as in the eleventh embodiment. As a result, the same results will be produced as in the eleventh embodiment without blurring letters or characters.

[Embodiment 14]

Figure 40:
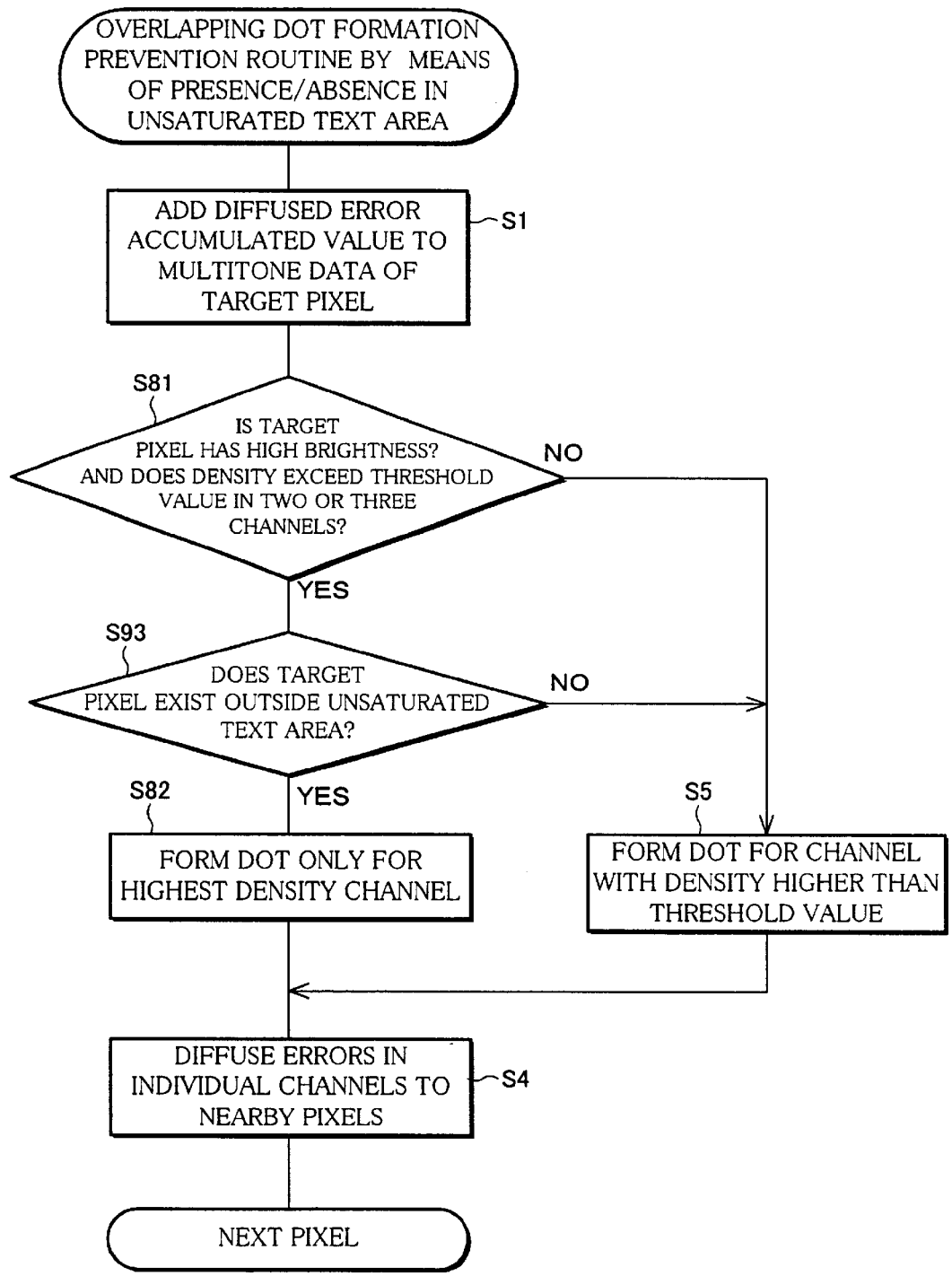
FIG. 40 is a flow chart showing an operation of a quasi-grayscale processing section including an overlapping dot formation requirement evaluation section for evaluation by means of a monochrome text area in relation to another embodiment in accordance with the present invention.

In the present embodiment, referring to FIG. 37 and FIG. 40, the description will discuss a case where the need to perform an overlapping dot formation prevention process as detailed in the eleventh embodiment is evaluated according to whether or not the target pixel exists in an unsaturated text area as in the sixth embodiment. A quasi-grayscale processing section 4p of the present embodiment includes an arrangement similar to that of the overlapping dot formation requirement evaluation section 37e of FIG. 22 as the overlapping dot formation requirement evaluation section (area evaluation means) 65p of FIG. 37. The AND circuit 66 outputs a value representing "false" if the target pixel exists in an unsaturated text area, thereby preventing the maximum density channel identifying section 63 from sending a substitute instruction to the third quantized value substitution section 64.

In the foregoing arrangement, as shown in FIG. 40, multitone CMY data is subjected to a quasi-grayscale process by substantially the same steps as those shown in FIG. 39 to output multi-value data C3, M3, and Y3. It should be noted in the present embodiment, however, that S93 replaces S92 of FIG. 39 and that the overlapping dot formation requirement evaluation section 65p sends an instruction to the maximum density channel identifying section 63 via the AND circuit 66 to prevent a substitute instruction from being transmitted to the third quantized value substitution section 64 if the target pixel exists in an unsaturated text area ("NO" path selected in S93). As a result, in an unsaturated text area, S5 is carried out to form a dot for a channel with a density higher than the threshold value in the same manner as in a case where no overlapping dot formation is detected.

In a text area, if the color saturation is high, "YES" path is selected in S93, and overlapping dot formation is prevented by varying the quantized values C2, M2, and Y2 (S82).

In the arrangement, the overlapping dot formation requirement evaluation section 65p evaluates the need to perform an overlapping dot formation prevention process according to whether or not the target pixel constitutes an unsaturated letter or character. Therefore, overlapping dot formation is interrupted even in a text area if the area has a high color saturation. As a result, the arrangement produces the same results as the eleventh embodiment, and additionally prevents highly color saturated letters and characters from being smeared with dark blotches.

[Embodiment 15]

Figure 41:
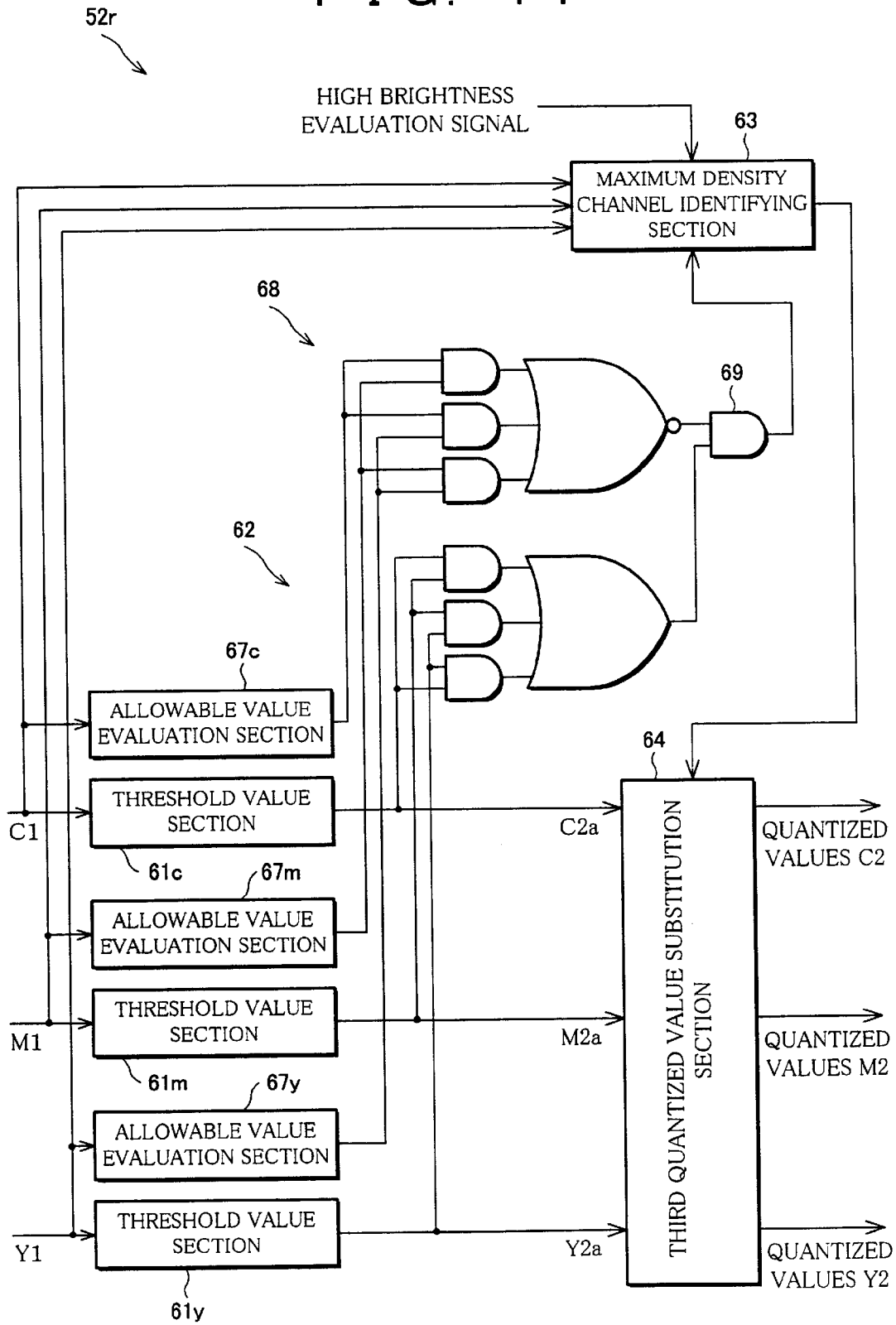
FIG. 41 is a block diagram showing an arrangement of a major part of a quantization section disposed in a quasi-grayscale processing section in relation to another embodiment in accordance with the present invention.
Figure 42:
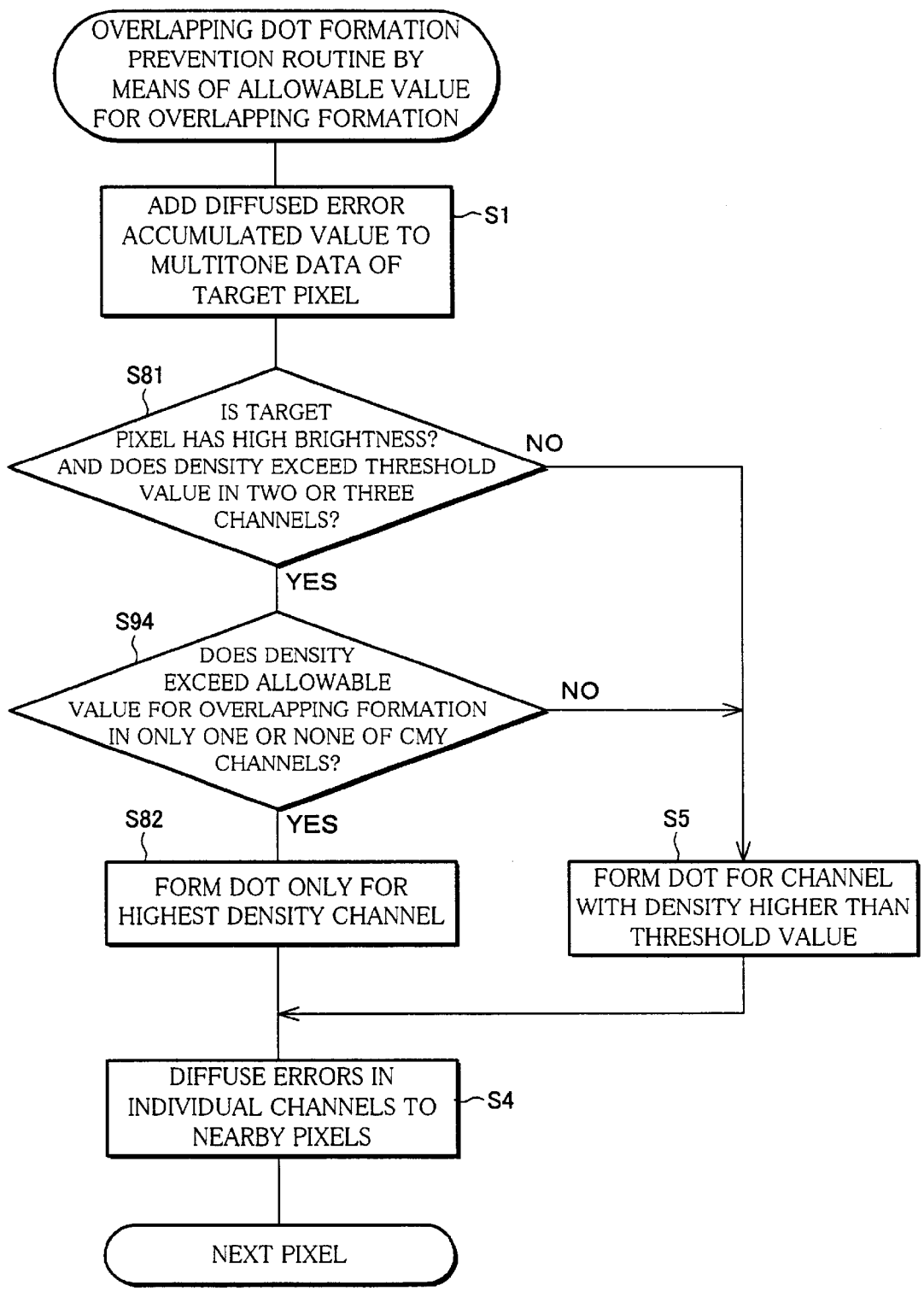
FIG. 42 is a flow chart showing an operation of the quasi-grayscale processing section.

In the present embodiment, referring to FIG. 41 and FIG. 42, the description will discuss a case where the need to perform an overlapping dot formation prevention process as detailed in the eleventh embodiment is evaluated according to the corrected values C1, M1, and Y1 as in the seventh embodiment.

A quantization section 52r of the present embodiment incorporates the arrangement shown in FIG. 35 and additionally includes: an allowable value evaluation sections (second comparator means) 67c, 67m, and 67y similar to the allowable value evaluation sections 38c, 36m, and 36y of FIG. 24; an allowable values identifying section 68 for determining that no overlapping dot formation prevention process is required, according to evaluations by the allowable value evaluation section 67c, 67m, and 67y, if the allowable value for overlapping dot formation is exceeded in two or more channels; and an instruction section 69 for sending an instruction to the maximum density channel identifying section 63 according to outputs from the overlapping dot formation detector section 62 and the allowable values identifying section 68.

The allowable values identifying section 68 includes: an AND circuit for computing the AND of outputs from the allowable value evaluation sections 67c and 67m; an AND circuit for computing the AND of outputs from the allowable value evaluation sections 67m and 67y; an AND circuit for computing the AND of outputs from the allowable value evaluation sections 67y and 67c; and a NOR circuit for outputting NOT the logical OR of the AND circuits, for example. The allowable values identifying section 68 can output a value ("0") representing "false" when an allowable value for overlapping dot formation is exceeded in two or more channels. The instruction section 69 is constituted by an AND circuit.

In the foregoing arrangement, as shown in FIG. 42, multitone CMY data is subjected to a quasi-grayscale process by substantially the same steps as those shown in FIG. 40 to output multi-value data C3, M3, and Y3. It should be noted in the present embodiment, however, that S94 replaces S93 of FIG. 40 and that if there is no or only one channel, among the CMY channels, where the density exceeds the allowable value for overlapping dot formation ("YES" path selected in S94), overlapping dot formation is prevented by varying the quantized values C2, M2, and Y2 (S82).

Conversely, if there are two or more channels where the density exceeds the allowable value for overlapping dot formation ("NO" path selected in S94), the allowable values identifying section 68 sends an instruction via the instruction section 69 to the maximum density channel identifying section 63 so as to prevent a substitute instruction from being transmitted to the third quantized value substitution section 64. As a result, if there are two or more channels, among the corrected values C1, M1, and Y1, where the density exceeds the allowable value, S5 is carried out to form a dot for a channel with a density higher than the threshold value in the same manner as in a case where no overlapping dot formation is detected.

According to the above arrangement, if the corrected values C1, M1, and Y1 exceed allowable values for overlapping dot formation in all the channels, the quantization section 52r sends an instruction to form overlapping dots to the color printer section 2 shown in FIG. 2. Therefore, even when error increases by reducing the number of dots formed overlapping one another in a high brightness area, if there are two or more channels where the allowable value for overlapping dot formation is exceeded, the overlapping dot formation in two or more channels corrects the error substantially. As a result, errors exceeding a predetermined value are prevented from occurring, enabling the image forming device 1r to output an image more faithfully to the input image.

[Embodiment 16]

In the eleventh to fifteenth embodiments an example has been taken where the image forming device is capable of forming dots in three CMY hues. Alternatively, the image forming device may form dots of other kinds as in the aforementioned eighth to tenth embodiments. The present invention is applicable where dots are formed in light cyan and other hues and also in black color, for example. The following description will discuss, referring to FIG. 43 to FIG. 45, such conditions applied to the eleventh embodiment. However, the same discussion holds true with any of the image forming devices in accordance with the twelfth to fifteenth embodiments.

Figure 43:
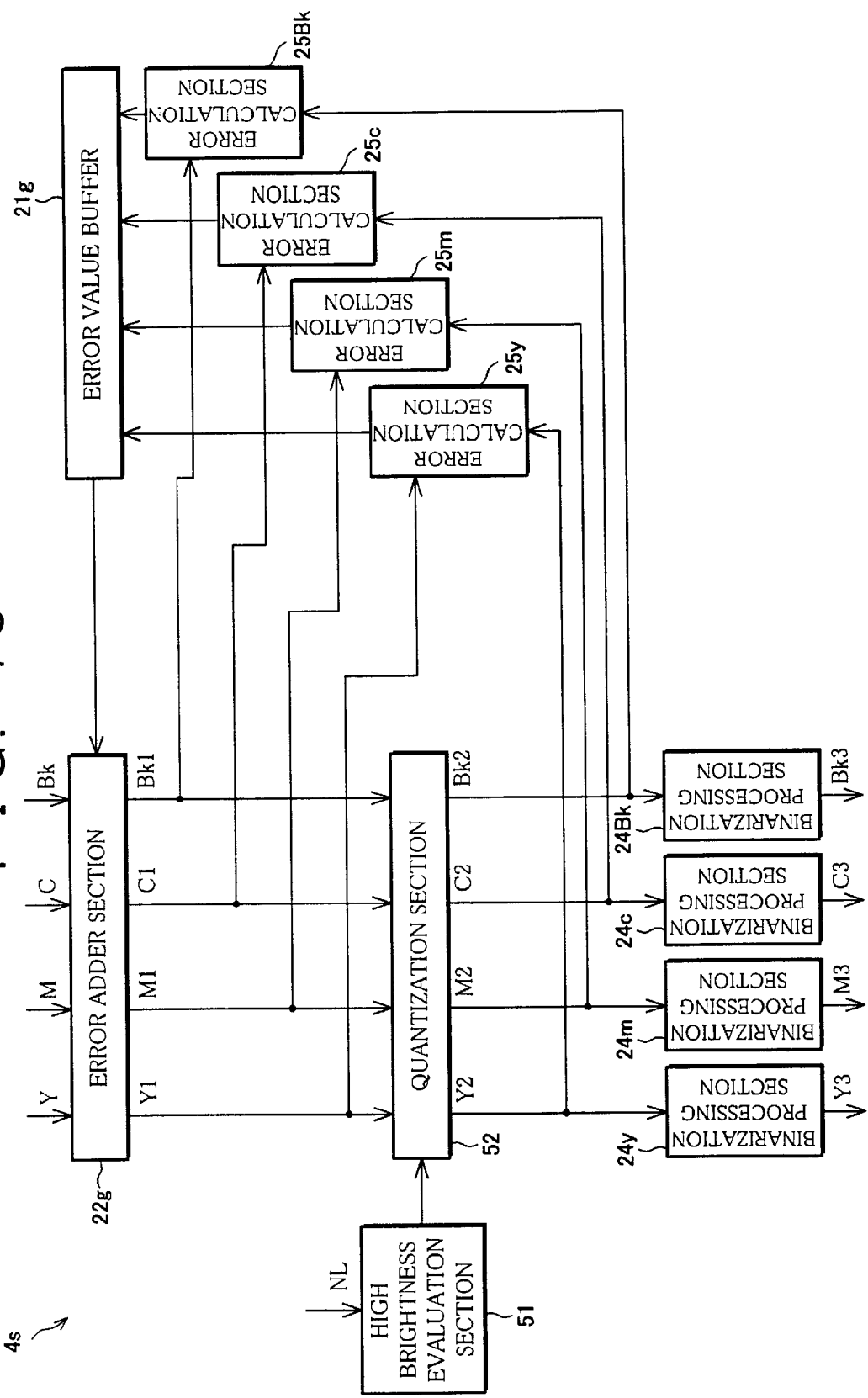
FIG. 43 is a block diagram showing an arrangement of a major part of a quasi-grayscale processing section for use in an image forming device that can form Bk dots in relation to another embodiment in accordance with the present invention.
Figure 44:
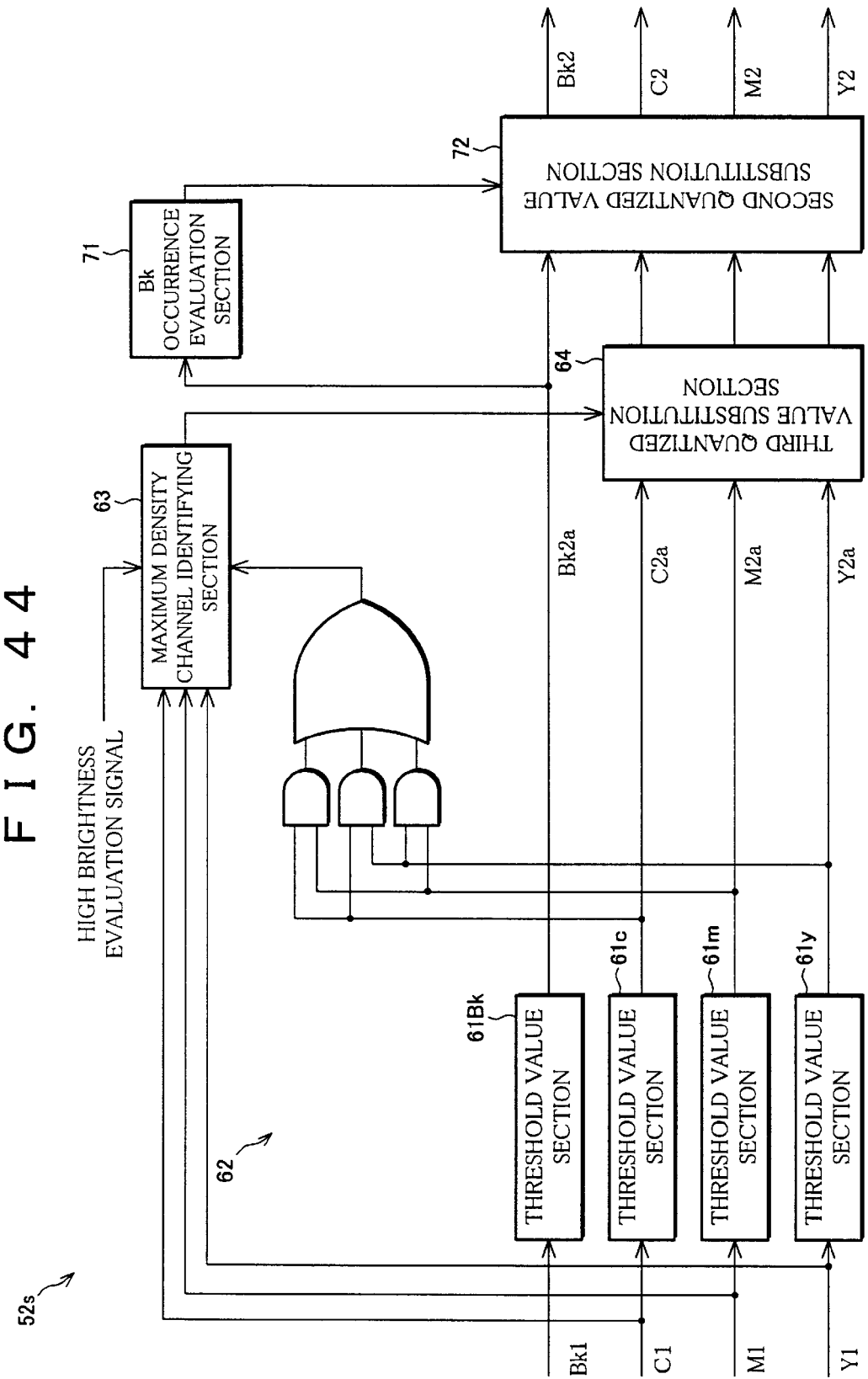
FIG. 44 is a block diagram showing a quantization section in the quasi-grayscale processing section.

An image forming device is of the present embodiment includes a color printer section 2g and a pre-process section 5g as in the eighth embodiment. Further, as shown in FIG. 43, the image forming device is incorporates the arrangement of FIG. 33, and additionally includes a binarization processing section 24Bk and an error calculation section 25Bk similarly to the arrangement shown in FIG. 26, and the remaining members 21 and 22 are also arranged so as to be capable of processing the Bk channel. The quantization section 52s of the present embodiment, as shown in FIG. 44, incorporates the arrangement of FIG. 35, and additionally includes a Bk occurrence evaluation section 71 and a second quantized value substitution section (output data adjusting means) 72 similarly to those shown in FIG. 27.

Figure 45:
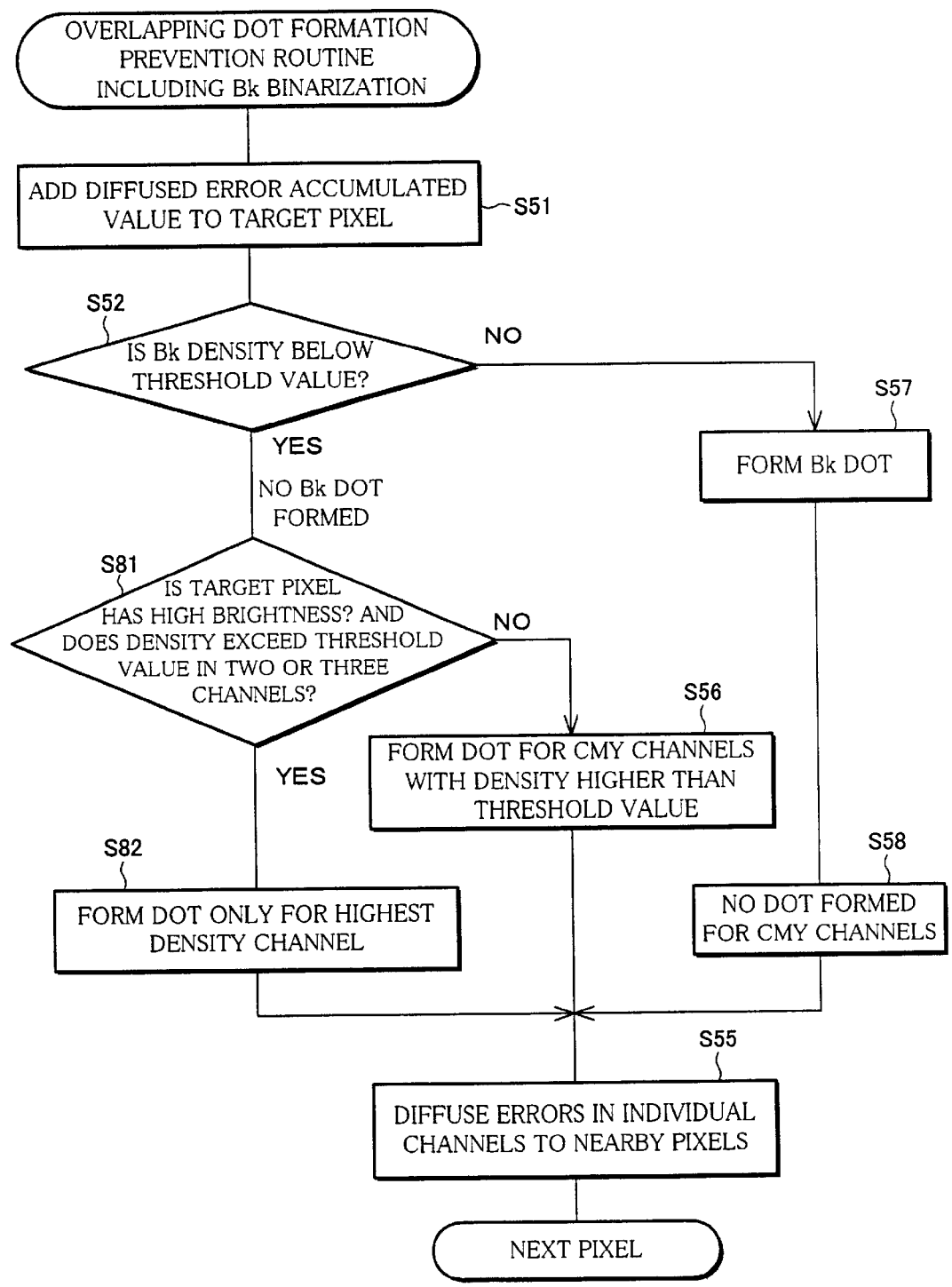
FIG. 45 is a flow chart showing an operation in the quasi-grayscale processing section.

In the foregoing arrangement, as shown in FIG. 45, multitone CMYBk data is subjected to a quasi-grayscale process by substantially the same steps as those shown in FIG. 29 to output multi-value data C3, M3, Y3, and Bk3. It should be noted in the present embodiment, however, that S81 and S82, which are identical to those of FIG. 36, replace S53 and S54 of FIG. 29 so as to form dots with densities higher than a threshold value for CMY in S56 if the target pixel has a low brightness or no instruction is issued for overlapping dot formation. ("NO" path selected in S81).

According to the arrangement, in an area where there is no instruction for Bk dot formation in the Bk channel, the output image carries less dark blotches and has an improved saturation as in the aforementioned eleventh embodiment, and the channels have a good dot balance.

Further, if there is an instruction for Bk dot formation in the Bk channel, the Bk occurrence evaluation section 71 and the second quantized value substitution section 72 interrupts the dot formation instruction for the CMY channels. Therefore, in the same manner as in the eighth embodiment, decreases of saturated components due to formation of Bk dots overlapping other dots can be restrained. As a result, although the color printer section 2g is able to form a Bk dot, and image quality, such as uniform black spots and quick drying due to differences between dyes and pigments, improves compared to a case where only CMY dots are formed, an output image has a higher saturation.

[Embodiment 17]

A Bk dot may be formed instead of overlapping dots for the three CMY channels as in the aforementioned tenth embodiment if overlapping dots are formed for the three CMY channels as in the eleventh to fifteenth embodiments, and the color printer section is capable of forming a Bk dot as in the sixteenth embodiment.

Figure 46:
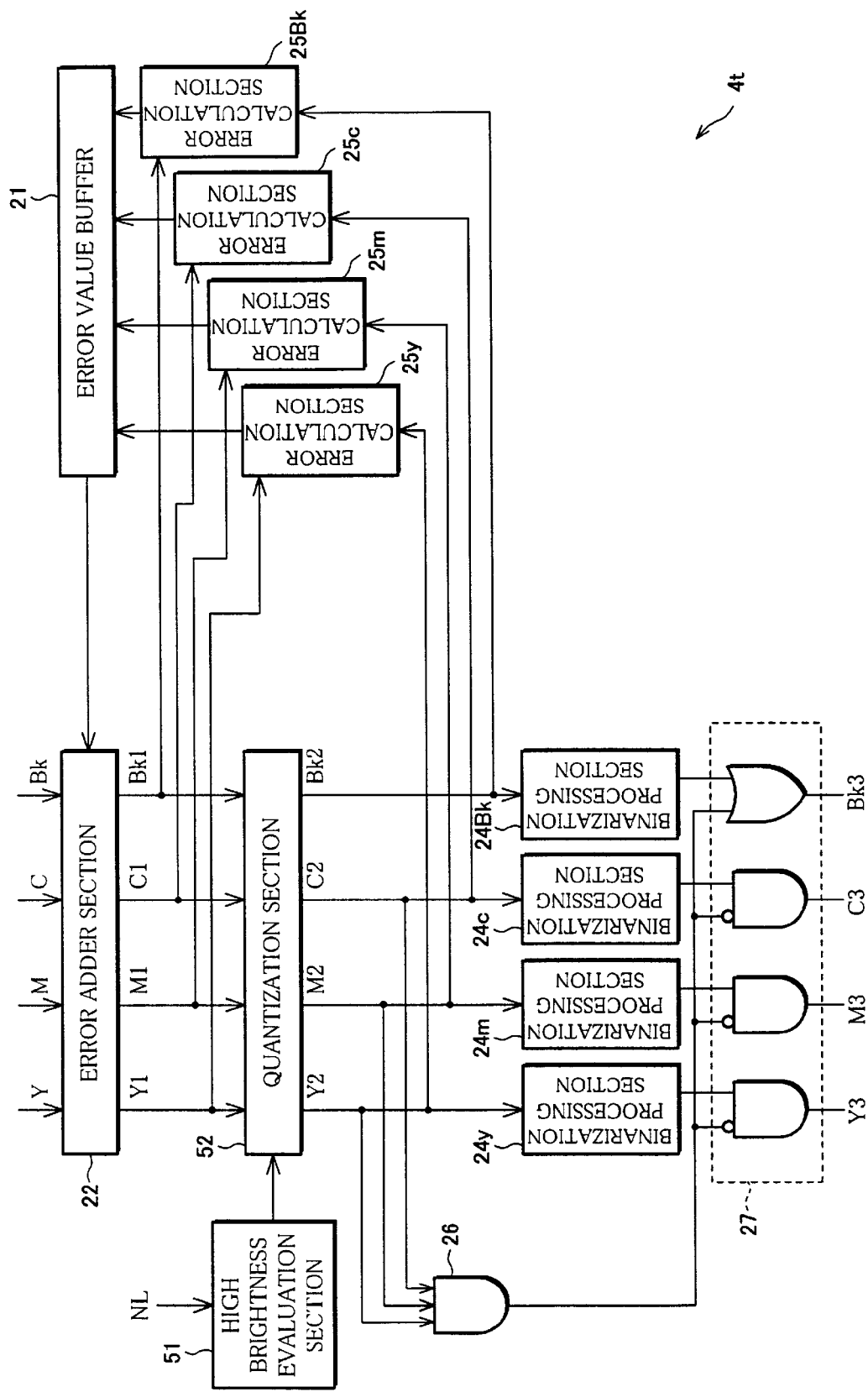
FIG. 46 is a block diagram showing a quasi-grayscale processing section including a Bk dot substitution section in relation to another embodiment in accordance with the present invention.

Specifically, a quasi-grayscale processing section 4t of the present embodiment, as shown in FIG. 46, incorporates the arrangement of FIG. 43, and further includes an overlapping CMY dot formation detector section 26 and a Bk dot substitution section 27 as shown in FIG. 32. If the quantization section 52 instructs to form an overlapping dot, a Bk dot formation instruction can replace an overlapping dot formation instruction for the three CMY channels. The same results can be substantially achieved, as explained earlier in the tenth embodiment, by the error calculation sections 25c, 25m, 25y, and 25Bk calculating errors based on the output from the Bk dot substitution section 27.

Figure 47:
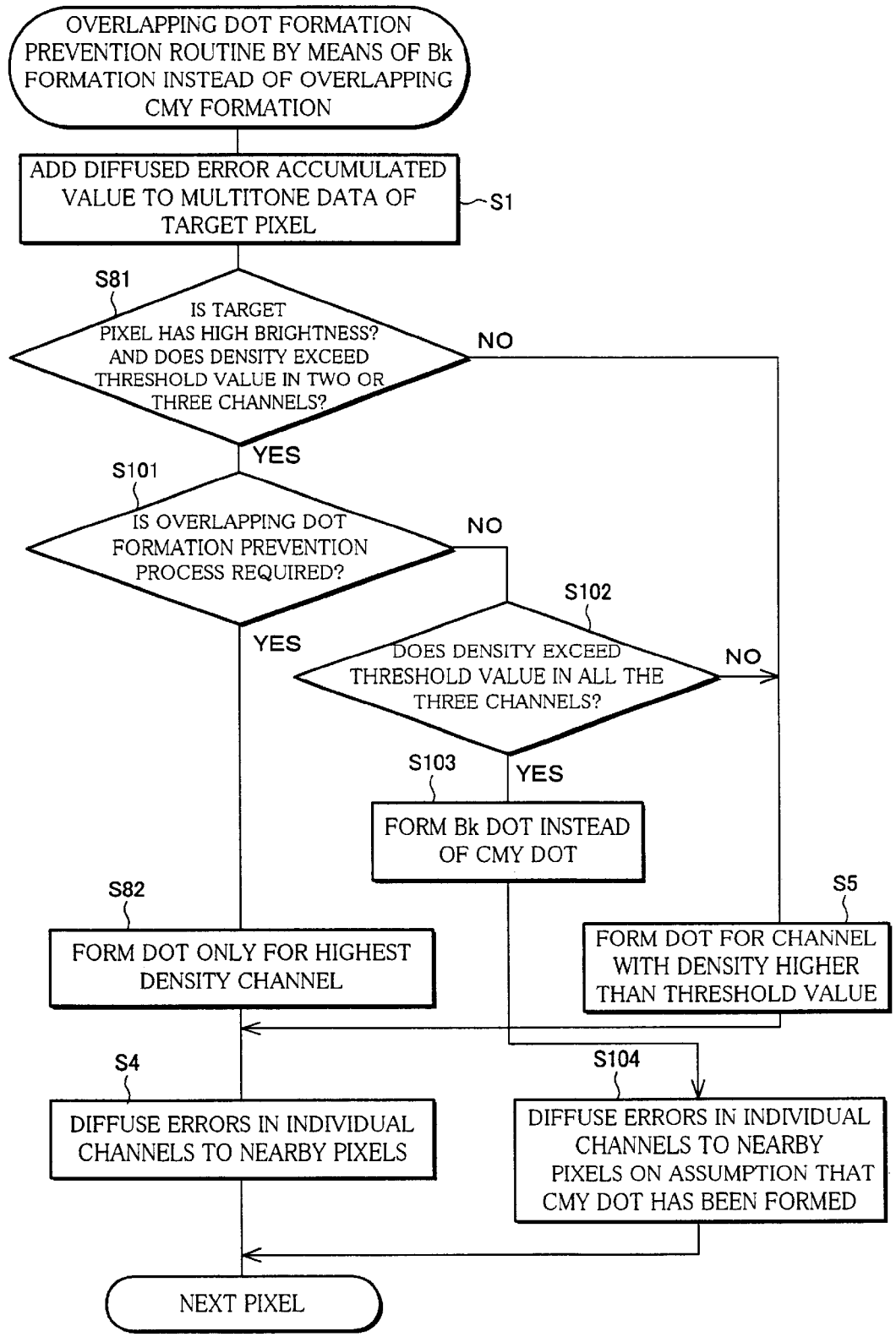
FIG. 47 is a flow chart showing an operation of the quasi-grayscale processing section.

In the foregoing arrangement, as shown in FIG. 47, multitone CMY data is subjected to a quasi-grayscale process by substantially the same steps as those shown in FIG. 36 to output multi-value data C3, M3, Y3, and Bk3. It should be noted in the present embodiment, however, that S101 is interposed between S81 and S82. If it is determined that no overlapping dot formation prevention process is required and the overlapping CMY dot formation detector section 26 have detected overlapping dot formation ("NO" path selected in S101, and "YES" path selected in S102), S103 and S104, which are similar to S72 and S73 of FIG. 33, are executed, and the quasi-grayscale processing section 4t instructs the color printer section 2g to form nothing but a Bk dot, which can be regarded as formation of CMY dots, and diffuses error to nearby pixels. Also, even when no overlapping dot formation prevention process is required, if no overlapping formation of three dots is detected ("NO" path selected in S102), S5 is carried out so as to form a dot for a channel with a density higher than a threshold value in the same manner as in a case where no overlapping dot formation is detected in two or more channels.

S101 here corresponds to a step of evaluating the need to perform an overlapping dot formation prevention process, more specifically, to S91 to S95 of the twelfth to sixteenth embodiments. If "NO" path is selected in these steps, S103 and S104 are carried out instead of an overlapping dot formation process (S5, S56).

In the above arrangement, the Bk dot substitution section 27 substitutes Bk dot formation for overlapping dot formation for the three CMY channels. Therefore, unlike dots for three channels are formed overlapping each other, the black spots are formed with uniform color. As a result, the image forming device 1t can output images with improved sharpness.

Further, since no errors occur due to non-uniform color, errors can be reduced that are beyond control of the quasi-grayscale processing section 4t. As a result, it is better ensured that the quasi-grayscale processing section 4t corrects errors, enabling the image forming device 1t to output an image faithfully to the input image.

In the first to tenth embodiments the minimum density channel identifying section 33 and the first quantized value substitution section 34 interrupt dot formation in the channel with the lowest density. Meanwhile, in the eleventh to seventeenth embodiments, the maximum density channel identifying section 63 and the third quantized value substitution section 64 allows dot formation in the channel with the highest density and interrupts dot formation in the remaining channels. There are alternatives to achieve this. If dot formation is interrupted in one of the channels when the first or third quantized value substitution section 34, 64 adjusts an output, unnecessary black spots are formed in smaller numbers, and the decrease of saturated components is restrained, achieving substantially the same results.

It should be noted however that when this is the case, there is a likelihood that errors due to non-dot formation grow and negatively affect colors of an output image, compared to a case where dot formation is interrupted for a channel (channels) with a lower density (densities) than the others, as in the aforementioned first to seventeenth embodiments. Therefore, to output images more faithfully, it is more preferable to interrupt dot formation for a channel (channels) with a lower density (densities) than the others.

In the first to seventeenth embodiments, an example was taken to illustrate the embodiments, where the quasi-grayscale processing section executes a quasi-grayscale process by means of error diffusion. Alternatively, dither and other techniques may be used to execute a quasi-grayscale process with the same results. Here, if each channel is subjected to error diffusion, an error is added that is accumulated in the quantization of the target pixel. Therefore, images are outputted more faithfully to the input image, whereas the prediction for overlapping dot formation becomes harder, rendering it more likely for the saturation to decrease and dark blotches to be caused. By contrast, in the present embodiment, overlapping dot formation is interrupted according to the data after the error addition section 22, for example, the quantized values C2, M2, and Y2 (including Bk2); therefore, even after error diffusion, it is ensured that overlapping dot formation is interrupted. Therefore, as described in these embodiments, an error diffusion technique is more effective, since the technique does not cause decreases in saturation or dark blotches, and reproduce more faithful images.

Further, in all the embodiments above, it was supposed for convenience in explanation that the multi-value data is binary. However, the embodiments are applicable to three-value data: for example, the threshold value is set to "64" and "192", the values from "0" to "64" are quantized to "0", the values from "64" to "192" are quantized to "128", and the values from "192" to "255" are quantized to "255". When data is quantized to three or greater values, the first to third quantized value substitution sections 34, 40, and 72 may adjust the multi-value data C3, M3, and Y3 (Bk3) not only to a value representing no dot formation ("0"), but also to a value representing decreased densities. In this arrangement, the decrease in brightness and of saturated components can restrained for the decrease in densities, therefore producing the same results as the embodiments.

In all the embodiments above, explanation was made taking an example where the color printer section 2 (2g) is capable of printing full-color images by overlapping dot formation. However, even in two color printing, for example, unnecessary overlapping dot formation due to a quasi-grayscale process for the channels undesirably decreases brightness. Especially, when black spots are formed by overlapping formation of dots in two colors, the black spots appear as dark blotches and decrease the saturation. Therefore, substantially the same results as in those discussed so far are achieved for two color printing, by adjust multi-value data so as to interrupt overlapping dot formation before it happens.

Further, in all the embodiments above, explanation was made taking an example where the image forming device includes a quasi-grayscale processing section and a color printer section. However, the embodiments are also applicable to a printer driver and other devices that have no internal color printer section and output multi-value data for channels to, for example, a color printer section in a color printer. The embodiments are also applicable to devices, such as image processing devices, that preform no quasi-grayscale process, but output multi-value data for channels according to quantized values which have already subjected to a quasi-grayscale process for each channel. In addition, the device may output data in a data format other than multi-value data for each channel: the device may output data in RGB or other formats that is can be converted to the aforementioned multi-value data and vice versa. The same results are obtainable as long as the device determines whether or not overlapping dots are to be formed by referring to a value for each channel quantized by a quasi-grayscale process for each channel, and adjusts the multi-value data output for each channel.

However, the threshold value for dot formation in many cases differs depending on properties of the color printer section. Therefore, wrong evaluation of overlapping dot formation is better prevented, enabling multi-value data to be adjusted more precisely, when the multi-value data is outputted to a specified color printer section, such as an image forming device or a driver device for a pre-specified color printer section, compared with when the existence or non-existence of dots formed overlapping each other is estimated based on comparison with a predetermined threshold value, and multi-value data is adjusted for use in an unspecified color printer section by a width determined by a predetermined method.

Naturally, these devices may be constituted either by means of hardware or by operation processing means, such as CPUs that execute programs stored in RAM or ROM and other storage means. If the devices are constituted by means of software as in the latter case, the device is constituted by delivering CD-ROMs and other storage media storing programs or distributing the programs via the Internet or other communication means, which cuts down labour in distribution.

In the discussion so far, the output means was a color printer section. However, the discussion holds true with a wide variety of devices incorporating other kind of output means and devices for outputting data to the output means, such as liquid crystal display including layers of color filters, as long as the output means forms pixels of an image by a subtractive process of colors using a plurality of dots.

As detailed so far, an image processing device (quasi-grayscale processing section 4, 4a to 4t) in accordance with the present invention includes a data output section (binarization processing section 24c, 24m, 24y, or 24Bk) for providing output data representative of an image constituted by pixels formed by a dot, overlapping dots, or no formation of dots at all in predetermined channels including channels for a plurality of hues, and is characterized in that it includes:

a first comparison section (threshold value section 31c, 31m, 31y, 31Bk, 61c, 61m, 61y, or 61Bk) for comparing a density in each of the hue channels with a predetermined threshold value for each pixel constituting a color input image; and a dark blotch prevention section (first quantized value substitution section 34 or third quantized value substitution section 64) for adjusting the output data so as to reduce the density in at least one of the channels with densities higher than the threshold values if the density is higher than the threshold value at least in a predetermined number of channels for a target pixel in the comparison.

In the arrangement, data representing a target pixel an d having been subjected to a quasi-grayscale process for each channel is inputted. Then, the first comparison section evaluates whether or not the input density exceeds a threshold value for each hue channel. If the density exceeds the threshold value at least in a predetermined number of channels, the dark blotch prevention section adjusts output data so as to reduce the density in at least one of those channels with threshold-value-exceeding densities. Therefore, the pixel formed according to the output data has brightness, saturation, and hue that are different from a black spot for the reduction in the densities. As a result, even when data having subjected to a quasi-grayscale process for each channel is inputted, the output data represents restrained occurrence of dark blotches due to unnecessary formation of overlapping dots.

Further, in the arrangement, the output data is adjusted after the density is evaluated in each hue channel; therefore, a better dot balance is achieved unlike in an arrangement disclosed in Japanese Laid-Open Patent Application No. 10-81026/1998 (Tokukaihei 10-81026; published on Mar. 31, 1998) where the densities are evaluated sequentially in one channel at a time.

In addition to the arrangement, preferably, the predetermined channels include cyan, magenta, and yellow channels, and the dark blotch prevention section (first quantized value substitution section 34) adjusts the output data so as to reduce the density in one of the three channels if the density is higher than the threshold value in all of the three channels of cyan, magenta, and yellow.

In the arrangement, the density is reduced in one of the channels when a black spot is supposed to be formed, i.e., dots are supposedly formed overlapping one another for the three channels. Therefore, the image processing device can provide output data with restrained occurrence of dark blotches and less decrease in saturation due to the quasi-grayscale processes.

Further, the dark blotch prevention section (first quantized value substitution section 34) of the aforementioned arrangement preferably selects a channel with a minimum density as the one channel in which the density is reduced. In such an arrangement, the output data is adjusted for the channel with the lowest density in dot formation, therefore reducing errors due to the adjustment of the output data to a minimum. As a result, the image processing device can provide output data that enables more faithful reproduction of the input image.

Further, in addition to the arrangement, the image processing device may further include a brightness evaluation section (overlapping dot formation requirement evaluation section 35a or brightness evaluation section 41) for comparing brightness of the target pixel with a predetermined brightness threshold value, and the dark blotch prevention section (first quantized value substitution section 34) may stop adjusting the output data if the brightness of the target pixel is lower than the brightness threshold value.

In the arrangement, black spots and other dark blotches become less prominent on the input image, as well as the pixel where a black spot is supposed to be formed will be identified as a pixel with a low brightness, enabling the dark blotch prevention section to stop adjusting the output data for this pixel. As a result, the image processing device can provide output data with restrained occurrence of dark blotches and improved saturation, without interrupting formation of originally black spots and formation of black spots in an area where there is a lack in the black component.

Alternatively, instead of detecting the overlapping dot formation in the three channels, the image processing device may include a brightness evaluation section (51) for comparing brightness of the target pixel with a predetermined brightness threshold value, the predetermined channels includes cyan, magenta, and yellow channels, and the dark blotch prevention section (third quantized value substitution section 64), if both the density is higher than the threshold value in two or more of the three channels of cyan, magenta, and yellow, and the brightness is higher than the threshold value, selects one of the channels with densities higher than the threshold values and adjusts the output data so as to reduce the densities in the remaining channels.

In the arrangement, if the target pixel has a high brightness, only one of the channels is selected, and the density is reduced in the other channels. As a result, overlapping dot formation is interrupted when the target pixel has a brightness and the decrease in brightness due to overlapping dot formation is readily identified. As a result, the image processing device can provide output data, while restraining the occurrence of dark blotches and the decrease in saturation and brightness caused by the quasi-grayscale processes.

Further, the dark blotch prevention section (third quantized value substitution section 64) in the arrangement above preferably selects a channel with a maximum density. In the arrangement, the density is adjusted in the channels other than the channel with the maximum density in dot formation, therefore reducing errors due to the adjustment of the output data to a minimum. As a result, the image processing device can provide output data that enables more faithful reproduction of the input image.

Regardless of whether there are two or three predetermined channels, preferably, the image processing device of the any of the foregoing arrangements includes a saturation evaluation section (overlapping dot formation requirement evaluation section 35$b$ or 65$n$ or saturation evaluation section 42) for comparing a saturation of the target pixel with a predetermined saturation threshold value, and the dark blotch prevention section (first quantized value substitution section 34 or third quantized value substitution section 64) stops adjusting the output data if the saturation of the target pixel is lower than the saturation threshold value.

In the arrangement, dark blotches become less prominent, as well as the pixel where a black spot is supposed to be formed will be identified as a pixel with a low saturation, enabling the dark blotch prevention section to stop adjusting the output data for this pixel. Therefore, output data can be provided without interrupting the formation of black spots where saturation is zero, while improving saturation in red and other high saturation areas. As a result, in the image reproduced according to the output data from the image processing device, saturation is enhanced where saturation is high, such as red, by the adjustment of the output data, whereas black spots are formed where saturation is zero.

Further, regardless of the inclusion of the saturation evaluation section, the image processing device of any of the foregoing arrangements, preferably, further includes an area evaluation section (overlapping dot formation requirement evaluation section 35$d$, 65$o$, or 65$p$ or property evaluation section 44) for evaluating whether or not the target pixel belongs to a text area according to the input image, and the dark blotch prevention section (first quantized value substitution section 34 or third quantized value substitution section 64) stops adjusting the output data if the target pixel belongs to a text area.

In the arrangement, the dark blotch prevention section adjusts the output data in a text area, and stops adjusting the output data in an image area. Therefore, in the image reproduced by the image processing device according to the output data, the occurrence of dark blotches is prevented in an image area, while the occurrence of blurring due to the adjustment of the output data is prevented in a text area.

Alternatively, instead of the area evaluation section, the image processing device may further include an area evaluation section (property evaluation section 44 or overlapping dot formation requirement evaluation section 65$p$) for evaluating whether or not the target pixel belongs to an unsaturated text area according to the input image, and the dark blotch prevention section (first quantized value substitution section 34 or third quantized value substitution section 64) may stop adjusting the output data if the target pixel belongs to an unsaturated text area.

In the arrangement, the dark blotch prevention section stops adjusting the output data if the target pixel belongs to an unsaturated text area. Therefore, in the image reproduced by the image processing device according to the output data, the occurrence of dark blotches is prevented in an image area and a highly saturated text area, while the occurrence of blurring due to the adjustment of the output data is prevented in an unsaturated text area.

Further, in an arrangement where the output data is adjusted when the density is higher than its threshold value in all of the three channels, preferably, in addition to the arrangement, the image processing device further includes a second comparator section (allowable value evaluation section 36$c$, 36$m$, or 36$y$) for comparing an input to the first comparison section (threshold value section 31$c$, 31$m$, or 31$y$) for each channel with an allowable value for density specified to be higher than the threshold value for the first comparison section, and the dark blotch prevention section (first quantized value substitution section 34) stops adjusting the output data if the density is higher than the allowable value in all of the three channels.

Alternatively, in an arrangement where the output data is adjusted if the density is higher than the respective threshold value in two channels and the brightness is high, preferably, in addition to the arrangement, the image processing device further includes second comparator section (allowable value evaluation section 67$c$, 67$m$, or 67$y$) for comparing an input to the first comparison section (threshold value section 61$c$, 61$m$, or 61$y$) for each channel with an allowable value for density specified to be higher than the threshold value for the first comparison section, and the dark blotch prevention section (third quantized value substitution section 64) stops adjusting the output data if the density is higher than the allowable value in two or more of the three channels.

In these arrangements, even if the first comparison section determines that the target pixel has a high density in a certain channel, the adjustment of the output data is stopped to allow a black spot to be formed for a pixel with a density higher than the allowable value, i.e., a pixel where large error is likely due to the adjustment of the output data. As a result, the maximum value of error due to the adjustment of the output data can be restrained. Thus, the image processing device can provide output data that enables more faithful reproduction of the input image.

Further, regardless of the inclusion of the second comparator section, the predetermined channels may include a black channel. In the arrangement, the output data can include an instruction for formation of black dots, facilitating control of formation of black dots by a high-quality image processing device that is able to form black dots. Therefore, the image processing device can provide output data that facilitates formation of good quality images.

The image processing device of the preceding arrangement, preferably, further includes an output data adjusting section (second quantized value substitution section 40 or 72) for adjusting the output data so as to, if the density is higher than a predetermined threshold value in the black channel, reduce the densities in the other channels.

In the arrangement, if the density is higher than a predetermined threshold value in the black channel, the output data is adjusted so as to reduce the densities in the other channels. This enables the decrease of saturated components to be restrained which is caused by the overlapping formation of a zero-saturation black dot and a saturated dot.

Further, in an arrangement where a black channel is included, the image processing device may further include an evaluation section (Bk buffer 47 or evaluation section 48) for evaluating whether a black dot has been formed in proximity to the target pixel, and the dark blotch prevention section (first quantized value substitution section 34 or third quantized value substitution section 64) may stop adjusting the output data if a black dot exists in proximity to the target pixel.

Here, if a black dot exists in proximity to the target pixel, even if a dot of other hue channel is formed on top thereof, dark blotches are difficult to perceive. In the arrangement, since the need to adjust the output data is evaluated according to whether a black dot exists in proximity, missing black components can be supplemented where dark blotches are difficult to perceive, by forming a dot of another hue channel on top thereof.

Further, in an arrangement where a black channel is included, the predetermined channels may include three channels of cyan, magenta, and yellow, and the image processing device may further include a black dot substitution section (27) for adjusting the output data so as to, if the output data represents overlapping formation of dots in the three channels, instruct formation of a dot in the black channel instead of the overlapping formation of dots in the three channels.

In the arrangement, when the output data represents overlapping dot formation for the three channels, for example, when the brightness evaluation section instructs the dark blotch prevention section to stop adjusting the output data, the black dot substitution section substitutes a black dot for overlapping dots. As a result, the image processing device can provide output data with more uniform black color compared with a case where black color is formed by overlapping dots.

Further, regardless of the inclusion of a black channel, the image processing device, preferably, includes a quasi-grayscale processing section (quasi-grayscale processing section 4, 4a to 4t) for performing a quasi-grayscale process for each of the predetermined channels according to the input image and inputting a result to the first comparison section (threshold value section 31c, 31m, 31y, 31Bk, 61c, 61m, 61y, or 61Bk).

In the arrangement, the image processing device includes a quasi-grayscale processing section; therefore, regardless of the input image, the occurrence of dark blotches are prevented that would be otherwise occur from the quasi-grayscale processes.

Further, in an arrangement where a brightness evaluation section, a saturation evaluation section, or an area evaluation section is included, each evaluation section can improve accuracy in evaluation by referring to the data both before and after a quasi-grayscale process. Therefore, the image processing device can provide output data that enables more faithful reproduction of the input image.

Further, the quasi-grayscale processing section of the preceding arrangement, preferably, includes an error addition section (22) for adding up errors of each channel density of the input image and each channel density contained in the output data in the quasi-grayscale process with a pixel in proximity to the target pixel as a target pixel.

In the arrangement, since the quasi-grayscale process is executed by way of an error diffusion technique, error due to the adjustment of the output data for a certain pixel can be supplemented by the quasi-grayscale processes for other pixels. As a result, the image processing device can provide output data that enables more faithful reproduction of the input image.

Further, when a quasi-grayscale processing section is included, in addition to the arrangement, the image processing device preferably, further includes a saturated black generation processing section (preprocess section 5g) for determining a density in the black channel by a saturated black generation method before the quasi-grayscale processing section performs the quasi-grayscale process. In the arrangement, since the black channel is formed by a saturated black generation method, the density decreases in each hue channel in an area where a black spot is supposed to be formed, compared with a case where a quasi-grayscale process is performed with no black channel being formed. As a result, the occurrence of dark blotches and the decrease in saturation can be prevented that would be otherwise occur from the quasi-grayscale processes, without interrupting the formation of originally black spots.

Further, in the foregoing arrangements, preferably, the brightness threshold value for the brightness evaluation section (overlapping dot formation requirement evaluation section 35a or brightness evaluation section 41 or 51) is a random value for which a predetermined value serves as a reference. Besides, in the foregoing, preferably, the saturation threshold value for the saturation evaluation section (overlapping dot formation requirement evaluation section 35b or 65n or saturation evaluation section 42) is a random value for which a predetermined value serves as a reference. If the brightness threshold value and saturation threshold value are fixed, an undesirable boundary is likely to develop surrounding the image represented by the output data. In the arrangement, however, these threshold value are variable, enabling the prevention of boundary development.

Further, regardless of the arrangement of the evaluation section, preferably, the data output section (binarization processing section 24c, 24m, 24y, or 24Bk) outputs the output data to a color image forming device (color printer section 2 or 2g) including a dot formation section (3c, 3m, 3y, or 3Bk) that can form dots for the channels overlapping one another on a printing material. More preferably, the dark blotch prevention section (first quantized value substitution section 34 or third quantized value substitution section 64) adjusts the output data so that the dot formation section does not form a dot in the channel in which the density is reduced.

In these arrangements, the dot formation means for providing output data is specified; therefore the threshold values for density and other various specified values are adjustable according to the dot formation means. Therefore, the image processing device can provide output data more accurately without losing dot balance, while restraining the occurrence of dark blotches due to unnecessary overlapping of dots.

Meanwhile, in order to solve the above problems, the image forming device (1, 1a to 1t) in accordance with the present invention is characterized in that it includes: the image processing device (4, 4a to 4t) as set forth in any one of the foregoing arrangements; and a dot formation section (3c, 3m, 3y, or 3Bk) capable of forming a dot in a channel on top of another dot in another channel on a printing material according to the output data from the image processing device.

In the arrangement, the dot formation section is controlled by means of the output data from the image processing device of any one of the foregoing arrangements; therefore, the image forming device can form images without losing dot balance, while restraining the occurrence of dark blotches due to unnecessary dot overlapping.

Incidentally, the image processing device may be constituted either by means of hardware or by means of software. Specifically, in order to solve the above problems, the storage medium in accordance with the present invention is a storage medium for storing a program for providing output data representative of an image constituted by pixels each formed by a dot, overlapping dots, or no formation of dots at all in predetermined channels including channels for a plurality of hues, and is characterized in that it stores a program that runs a computer so as to serve as: a first comparison section (threshold value section 31c, 31m, 31y, 31Bk, 61c, 61m, 61y, or 61Bk) for comparing a density in each hue channel with a predetermined threshold value for each pixel constituting a color input image; and a dark blotch prevention section (first quantized value substitution section 34 or third quantized value substitution section 64) for adjusting the output data so as to reduce the density in at least one of the channels with densities higher than the threshold values if the density is higher than the threshold value at least in a predetermined number of channels for a target pixel in the comparison.

In the arrangement, as the program is read from a storage medium and executed by a computer, the computer functions as the image processing device. As a result, even when data is inputted after being subjected to a quasi-grayscale process for each channel, the computer can provide output data without losing dot balance, while restraining the occurrence of dark blotches due to unnecessary overlapping of dots.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image processing device, comprising:
   data output means for providing output data representative of an image constituted by pixels formed by a dot, overlapping dots, or no formation of dots at all in predetermined channels including channels for a plurality of hues;
   first comparison means for comparing a density in each of the hue channels with a predetermined threshold value for each pixel constituting a color input image; and
   dark blotch prevention means for adjusting the output data so as to reduce the density in at least one of the channels with densities higher than the threshold values if the density is higher than the threshold value at least in a predetermined number of channels for a target pixel in the comparison.

2. The image processing device as set forth in claim 1, wherein
   the predetermined channels include cyan, magenta, and yellow channels, and
   the dark blotch prevention means adjusts the output data so as to reduce the density in one of the three channels if the density is higher than the threshold value in all of the three channels of cyan, magenta, and yellow.

3. The image processing device as set forth in claim 2, wherein
   the dark blotch prevention means selects a channel with a minimum density as the one channel in which the density is reduced.

4. The image processing device as set forth in claim 2, wherein
   said device further comprises second comparator means for comparing an input to the first comparison means for each channel with an allowable value for density specified to be higher than the threshold value for the first comparison means, and
   the dark blotch prevention means stops adjusting the output data if the density is higher than the allowable value in all of the three channels.

5. The image processing device as set forth in claim 1, wherein
   said device further comprises brightness evaluation means for comparing brightness of the target pixel with a predetermined brightness threshold value, and
   the dark blotch prevention means stops adjusting the output data if the brightness of the target pixel is lower than the brightness threshold value.

6. The image processing device as set forth in claim 5, wherein
   the brightness threshold value for the brightness evaluation means is a random value for which a predetermined value serves as a reference.

7. The image processing device as set forth in claim 1, wherein
   said device further comprises brightness evaluation means for comparing brightness of the target pixel with a predetermined brightness threshold value,
   the predetermined channels includes cyan, magenta, and yellow channels, and
   the dark blotch prevention means, if both the density is higher than the threshold value in two or more of the three channels of cyan, magenta, and yellow, and the brightness is higher than the threshold value, selects one of the channels with densities higher than the threshold values and adjusts the output data so as to reduce the densities in the remaining channels.

8. The image processing device as set forth in claim 7, wherein
   the dark blotch prevention means selects a channel with a maximum density.

9. The image processing device as set forth in claim 7, wherein
   said device further comprises second comparator means for comparing an input to the first comparison means for each channel with an allowable value for density specified to be higher than the threshold value for the first comparison means, and
   the dark blotch prevention means stops adjusting the output data if the density is higher than the allowable value in two or more of the three channels.

10. The image processing device as set forth in claim 7, wherein
    the brightness threshold value for the brightness evaluation means is a random value for which a predetermined value serves as a reference.

11. The image processing device as set forth in claim 1, wherein
   said device further comprises saturation evaluation means for comparing a saturation of the target pixel with a predetermined saturation threshold value, and
   the dark blotch prevention means stops adjusting the output data if the saturation of the target pixel is lower than the saturation threshold value.

12. The image processing device as set forth in claim 11, wherein
   the saturation threshold value for the saturation evaluation means is a random value for which a predetermined value serves as a reference.

13. The image processing device as set forth in claim 1, wherein
   said device further comprises area evaluation means for evaluating whether or not the target pixel belongs to a text area according to the input image, and
   the dark blotch prevention means stops adjusting the output data if the target pixel belongs to a text area.

14. The image processing device as set forth in claim 1, wherein
   said device further comprises area evaluation means for evaluating whether or not the target pixel belongs to an unsaturated text area according to the input image, and
   the dark blotch prevention means stops adjusting the output data if the target pixel belongs to an unsaturated text area.

15. The image processing device as set forth in claim 1, wherein
   the predetermined channels include a black channel.

16. The image processing device as set forth in claim 15, wherein
   said device further comprises output data adjusting means for adjusting the output data so as to, if the density is higher than a predetermined threshold value in the black channel, reduce the densities in the other channels.

17. The image processing device as set forth in claim 15, wherein
   said device further comprises evaluation means for evaluating whether a black dot has been formed in proximity to the target pixel, and
   the dark blotch prevention means stops adjusting the output data if a black dot exists in proximity to the target pixel.

18. The image processing device as set forth in claim 15, wherein
   the predetermined channels include three channels of cyan, magenta, and yellow, and
   said device further comprises black dot substitution means for adjusting the output data so as to, if the output data represents overlapping formation of dots in the three channels, instruct formation of a dot in the black channel instead of the overlapping formation of dots in the three channels.

19. The image processing device as set forth in claim 1, wherein
   said device further comprises quasi-greyscale processing means for performing a quasi-greyscale process for each of the predetermined channels according to the input image and inputting a result to the first comparison means.

20. The image processing device as set forth in claim 19, wherein
   the quasi-greyscale processing means includes error addition means for adding up errors of each channel density of the input image and each channel density contained in the output data in the quasi-greyscale process with a pixel in proximity to the target pixel as a target pixel.

21. The image processing device as set forth in claim 19, wherein
   the predetermined channels include the black channel, and
   said device further comprises saturated black generation processing means for determining a density in the black channel by a saturated black generation method before the quasi-greyscale processing means performs the quasi-greyscale process.

22. The image processing device as set forth in claim 1, wherein
   the data output means outputs the output data to a color image forming device including dot formation means that can form dots for the channels overlapping one another on a printing material.

23. The image processing device as set forth in claim 22, wherein
   the dark blotch prevention means adjusts the output data so that the dot formation means does not form a dot in the channel in which the density is reduced.

24. An image forming device, comprising:
   the image processing device as set forth in claim 1; and
   dot formation means capable of forming a dot in a channel on top of another dot in another channel on a printing material according to the output data from the image processing device.

25. An image forming device, comprising:
   the image processing device as set forth in claim 23; and
   dot formation means capable of forming a dot in a channel on top of another dot in another channel on a printing material according to the output data from the image processing device.

26. A storage medium for storing a program for providing output data representative of an image constituted by pixels each formed by a dot, overlapping dots, or no formation of dots at all in predetermined channels including channels for a plurality of hues, wherein
   said storage medium stores a program that runs a computer so as to serve as: first comparison means for comparing a density in each hue channel with a predetermined threshold value for each pixel constituting a color input image; and dark blotch prevention means for adjusting the output data so as to reduce the density in at least one of the channels with densities higher than the threshold values if the density is higher than the threshold value at least in a predetermined number of channels for a target pixel in the comparison.

* * * * *